US008889802B2

(12) United States Patent
Rappoport et al.

(10) Patent No.: US 8,889,802 B2
(45) Date of Patent: Nov. 18, 2014

(54) POLYMER COMPOSITIONS AND METHODS OF MAKING AND USING SAME

(75) Inventors: Leonid Rappoport, Mountain View, CA (US); Alexander Vainer, Fremont, CA (US); Aleksander Yam, Sunnyvale, CA (US)

(73) Assignee: POLYMERight, Inc., Fremont, CA (US)

( * ) Notice: Subject to any disclaimer, the term of this patent is extended or adjusted under 35 U.S.C. 154(b) by 0 days.

(21) Appl. No.: 13/362,836

(22) Filed: Jan. 31, 2012

(65) Prior Publication Data

US 2012/0130040 A1  May 24, 2012

Related U.S. Application Data

(62) Division of application No. 12/823,994, filed on Jun. 25, 2010, now Pat. No. 8,138,278.

(60) Provisional application No. 61/323,314, filed on Apr. 12, 2010, provisional application No. 61/269,740, filed on Jun. 29, 2009.

(51) Int. Cl.
| | |
|---|---|
| *C08L 63/00* | (2006.01) |
| *C08G 75/14* | (2006.01) |
| *C08L 81/04* | (2006.01) |
| *C08F 283/00* | (2006.01) |
| *C08G 59/18* | (2006.01) |
| *C08G 59/62* | (2006.01) |
| *C08G 59/50* | (2006.01) |
| *C08G 59/40* | (2006.01) |

(52) U.S. Cl.
CPC .............. *C08G 59/62* (2013.01); *C08G 59/184* (2013.01); *C08G 75/14* (2013.01); *C08L 81/04* (2013.01); *C08G 59/50* (2013.01); *C08L 63/00* (2013.01); *C08G 59/4064* (2013.01)
USPC ............ 525/523; 525/535; 525/540; 528/373

(58) Field of Classification Search
CPC . A61K 6/0023; A61K 6/0088; A61K 6/0073; A61K 6/083; A61K 6/0017; C08L 33/04
USPC .......................................... 525/523; 523/118
See application file for complete search history.

(56) References Cited

U.S. PATENT DOCUMENTS

| | | | |
|---|---|---|---|
| 3,386,963 A | 6/1968 | Santaniello | |
| 5,407,972 A | 4/1995 | Smith et al. | |
| 5,434,225 A | 7/1995 | Mathes et al. | |
| 6,632,860 B1 | 10/2003 | Hansen et al. | |
| 7,087,708 B2 | 8/2006 | Rappoport et al. | |
| 8,138,278 B2 | 3/2012 | Rappoport et al. | |
| 2004/0230030 A1 | 11/2004 | Rappoport et al. | |
| 2007/0015902 A1 | 1/2007 | Rappoport et al. | |

FOREIGN PATENT DOCUMENTS

| | | | | |
|---|---|---|---|---|
| CN | 1784453 A | 6/2006 | | |
| CN | 102498146 A | 6/2012 | | |
| EP | 2448990 A1 | 5/2012 | | |
| JP | 06116387 A | * 4/1994 | ............ | C08G 75/14 |
| WO | 2004094522 A2 | 11/2004 | | |
| WO | 2011008480 A1 | 1/2011 | | |

OTHER PUBLICATIONS

Kuramoto et al., Machine-generated English translation of JP 06-116387 A, Apr. 26, 1994.*
Provisional patent application entitled "Innovative Polysulfide-Containing Formuatlions," by Leonid Rappoport, et al., filed Jun. 29, 2009, as U.S. Appl. No. 61/269,740.
Provisional patent application entitled" Polymer Compositions and Methods of Making and Using Same," by Leonid Rappoport, et al., filed Apr. 12, 2010, as U.S. Appl. No. 61/323,314.
Foreign communication from a related counterpart application— International Search Report and Written Opinion, PCT/US2010/040078, Oct. 29, 2010, 13 pages.
Foreign communication from a related counterpart application— International Preliminary Report on Patentability, PCT/US2010/040078, Jan. 4, 2012, 6 pages.
Foreign communication from a related counterpart application— Chinese First Office Action, Chinese Application No. 201080029181.0, Apr. 9, 2013, 15 pages.
Foreign communication from a related counterpart application— Communication, European Application No. 10730311.7, Feb. 14, 2012, 2 pages.

* cited by examiner

*Primary Examiner* — Peter F Godenschwager
*Assistant Examiner* — David Karst
(74) *Attorney, Agent, or Firm* — Conley Rose, P.C.; Rodney B. Carroll; Lynda S. Jolly

(57) ABSTRACT

A composition comprising a reaction product of reactants comprising (a) a compound comprising (i) a polysulfide moiety and (ii) an oxygen atom in a β-position to a sulfur link having the formula:

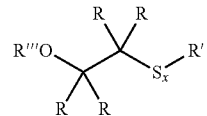

where each R is independently selected from H or a $C_1$ to $C_{20}$ organyl group, R' is independently selected from a $C_1$ to $C_{20}$ organyl group, R''' is independently selected from H or a $C_1$ to $C_{20}$ organyl group, and x has an average of greater than 2, (b) a compound comprising a nucleophilic moiety; and (c) a compound comprising a moiety reactive to active hydrogen.

18 Claims, No Drawings

POLYMER COMPOSITIONS AND METHODS OF MAKING AND USING SAME

CROSS-REFERENCE TO RELATED APPLICATIONS

This is a Divisional Application of U.S. patent application Ser. No. 12/823,994 filed Jun. 25, 2010, published as U.S. 2011/0152492 A1, which claims the benefit of and priority to U.S. Provisional Patent Application Nos. 61/269,740, filed Jun. 29, 2009 and entitled "Innovative Polysulfide-Containing Formulations," and 61/323,314, filed Apr. 12, 2010 and entitled "Polymer Compositions and Methods of Making and Using Same," each of which is hereby incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD

This disclosure relates to formulations for enhancing polymeric materials and methods of making and using same.

BACKGROUND

Polymers are employed in a wide variety of commercial and industrial applications. The physical properties of polymers vary widely—from thin liquids to hard, plastic-like materials. One method for altering the physical properties of a polymer involves inclusion in the polymeric material one or more compositions that beneficially affects one or more properties of the material. Thus, there is an ongoing need for compositions that enhance one or more physical properties of polymeric materials.

SUMMARY

Disclosed herein is a composition comprising a reaction product of reactants comprising (a) a compound comprising (i) a polysulfide moiety and (ii) an oxygen atom in a β-position to a sulfur link having the formula:

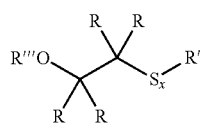

where each R is independently selected from H or a $C_1$ to $C_{20}$ organyl group, R' is independently selected from a $C_1$ to $C_{20}$ organyl group, R''' is independently selected from H or a $C_1$ to $C_{20}$ organyl group, and x has an average of greater than 2, (b) a compound comprising a nucleophilic moiety; and (c) a compound comprising a moiety reactive to active hydrogen.

Also disclosed herein is a composition comprising a reaction product of reactants comprising (a) a compound comprising (i) a polysulfide moiety and (ii) an oxygen atom in a β-position to a sulfur link having the formula:

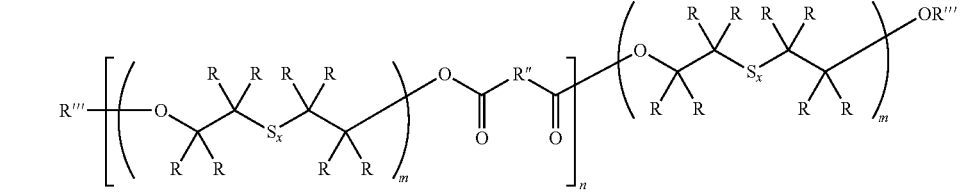

where each R is independently selected from H or a $C_1$ to $C_{20}$ organyl group, R''' is independently selected from H or a $C_1$ to $C_{20}$ organyl group, x has an average of greater than 2, and m is greater than or equal to one, (b) a compound comprising a nucleophilic moiety, and (c) a compound comprising a moiety reactive to active hydrogen.

Further disclosed herein is a composition comprising a reaction product of reactants comprising (a) a compound comprising (i) a polysulfide moiety and (ii) an oxygen atom in a β-position to a sulfur link has the formula:

where each R is independently selected from H or a $C_1$ to $C_{20}$ organyl group; each R'' is independently selected from independently selected from a $C_1$ to $C_{60}$ organylene group; R''' is independently selected from H or a $C_1$ to $C_{20}$ organyl group; each x independently has an average greater than 2; each m independently is greater than or equal to one; and n is greater than or equal to one, (b) a compound comprising a nucleophilic moiety, and (c) a compound comprising a moiety reactive to active hydrogen.

Further disclosed herein is a composition comprising a reaction product of reactants comprising (a) a compound comprising (i) a polysulfide moiety, wherein the number of connected sulfur atoms is greater than 2, and (ii) an oxygen atom in a β-position to a sulfur link, (b) a compound comprising a nucleophilic moiety, and (c) a compound comprising a moiety reactive to active hydrogen.

Notation and Nomenclature

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Regarding claim transitional terms or phrases, the transitional term "comprising", which is synonymous with "including," "containing," "having," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claimed invention. The term "consisting essentially of" occupies a middle ground between closed terms like "consisting of" and fully open terms like "comprising." Absent an indication to the contrary, when describing a compound or composition "consisting essentially of" is not to be construed as "comprising," but is intended to describe the recited component that includes materials which do not significantly alter composition or method to which the term is applied. For example, a feedstock consisting essentially of a material A can include impurities typically present in a commercially produced or commercially available sample of the recited compound or composition. When a claim includes different features and/or feature classes (for example, a method step, feedstock features, and/or product features, among other possibilities), the transitional terms comprising, consisting essentially of, and consisting of apply only to feature class to which is utilized and it is possible to have different transitional terms or phrases utilized with different features within a claim. For example a method can comprises several recited steps (and other non-recited steps) but utilize a catalyst system preparation consisting of specific or alternatively consisting essentially of specific steps but utilize a catalyst system comprising recited components and other non-recited components.

While compositions and methods are described in terms of "comprising" various components and/or steps, the compositions and methods can also "consist essentially of" or "consist of" the various components and/or steps.

The terms "a," "an," and "the" are intended, unless specifically indicated otherwise, to include plural alternatives, e.g., at least one. For instance, the disclosure of "a Component A," "a Component B," etc., is meant to encompass one, or mixtures or combinations of more than one Component A, Component B, etc., unless otherwise specified.

For any particular compound or group disclosed herein, any name or structure presented is intended to encompass all conformational isomers, regioisomers, and stereoisomers that may arise from a particular set of substituents, unless otherwise specified. For example, a general reference to pentane includes n-pentane, 2-methyl-butane, and 2,2-dimethyl-propane and a general reference to a butyl group includes an n-butyl group, a sec butyl group, an iso-butyl group, and t-butyl group. The name or structure also encompasses all enantiomers, diastereomers, and other optical isomers whether in enantiomeric or racemic forms, as well as mixtures of stereoisomers, as would be recognized by a skilled artisan, unless otherwise specified.

A chemical "group" can be defined or described according to how that group is formally derived from a reference or "parent" compound, for example, by the number of hydrogen atoms that are formally removed from the parent compound to generate the group, even if that group is not literally synthesized in this manner. These groups can be utilized as substituents or coordinated or bonded to metal atoms. By way of example, an "alkyl group" formally can be derived by removing one hydrogen atom from an alkane, an "alkenyl group" by removing one hydrogen atom from an alkene, or an alkynyl group by removing one hydrogen atom from an alkyne, while an "alkylene group" "alkenylene group" or "alkynylene group" formally can be derived by removing two hydrogen atoms from an alkane, alkene, or alkyne, respectively. Moreover, a more general term can be used to encompass a variety of groups that formally are derived by removing any number ("one or more") hydrogen atoms from a parent compound, which in this example can be described as an "alkane group," and which encompasses an "alkyl group," an "alkylene group," and material have three or more hydrogen atoms, as necessary for the situation, removed from and alkane. Throughout, the disclosure that a substituent, ligand, or other chemical moiety can constitute a particular "group" implies that the well-known rules of chemical structure and bonding are followed when that group is employed as described. When describing a group as being "derived by," "derived from," "formed by," or "formed from," such terms are used in a formal sense and are not intended to reflect any specific synthetic methods or procedure, unless specified otherwise or the context requires otherwise.

The term "substituted" when used to describe a group, for example, when referring to a substituted analog of a particular group, is intended to describe any non-hydrogen moiety that formally replaces a hydrogen in that group, and is intended to be non-limiting. A group or groups can also be referred to herein as "unsubstituted" or by equivalent terms such as "non-substituted," which refers to the original group in which a non-hydrogen moiety does not replace a hydrogen within that group. "Substituted" is intended to be non-limiting and include inorganic substituents or organic substituents as understood by one of ordinary skill in the art.

The term "organyl group" is used herein in accordance with the definition specified by IUPAC: an organic substituent group, regardless of functional type, having one free valence at a carbon atom. Similarly, an "organylene group" refers to an organic group, regardless of functional type, derived by removing two hydrogen atoms from an organic compound, either two hydrogen atoms from one carbon atom or one hydrogen atom from each of two different carbon atoms. An "organic group" refers to a generalized group formed by removing one or more hydrogen atoms from carbon atoms of an organic compound. Thus, an "organyl group," an "organylene group," and an "organic group" can contain organic functional group(s) and/or atom(s) other than carbon and hydrogen, that is, an organic group that can comprise functional groups and/or atoms in addition to carbon and hydrogen. For instance, non-limiting examples of atoms other than carbon and hydrogen include halogens, oxygen, nitrogen, phosphorus, and the like. Non-limiting examples of functional groups include ethers, aldehydes, ketones, esters, sulfides, amines, and phosphines, and so forth. In one aspect, the hydrogen atom(s) removed to form the "organyl group," "organylene group," or "organic group" can be attached to a carbon atom belonging to a functional group, for example, an acyl group (—C(O)R), a formyl group (—C(O)H), a carboxy group (—C(O)OH), a hydrocarboxycarbonyl group (—C(O) OR), a cyano group (—C≡N), a carbamoyl group (—C(O)

NH$_2$), a N-hydrocarbylcarbamoyl group (—C(O)NHR), or N,N'-dihydrocarbylcarbamoyl group (—C(O)NR$_2$), among other possibilities. In another aspect, the hydrogen atom(s) removed to form the "organyl group," "organylene group," or "organic group" can be attached to a carbon atom not belonging to, and remote from, a functional group, for example, —CH$_2$C(O)CH$_3$, —CH$_2$NR$_2$, and the like. An "organyl group," "organylene group," or "organic group" can be aliphatic, inclusive of being cyclic or acyclic, or can be aromatic. "Organyl groups," "organylene groups," and "organic groups" also encompass heteroatom-containing rings, heteroatom-containing ring systems, heteroaromatic rings, and heteroaromatic ring systems. "Organyl groups," "organylene groups," and "organic groups" can be linear or branched unless otherwise specified. Finally, it is noted that the "organyl group," "organylene group," or "organic group" definitions include "hydrocarbyl group," "hydrocarbylene group," "hydrocarbon group," respectively, and "alkyl group," "alkylene group," and "alkane group," respectively, as members.

The term "hydrocarbon" whenever used in this specification and claims refers to a compound containing only carbon and hydrogen. Other identifiers can be utilized to indicate the presence of particular groups in the hydrocarbon (e.g. halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include ethyl, phenyl, tolyl, propenyl, and the like. Similarly, a "hydrocarbylene group" refers to a group formed by removing two hydrogen atoms from a hydrocarbon, either two hydrogen atoms from one carbon atom or one hydrogen atom from each of two different carbon atoms. Therefore, in accordance with the terminology used herein, a "hydrocarbon group" refers to a generalized group formed by removing one or more hydrogen atoms (as necessary for the particular group) from a hydrocarbon. A "hydrocarbyl group," "hydrocarbylene group," and "hydrocarbon group" can be acyclic or cyclic groups, and/or can be linear or branched. A "hydrocarbyl group," "hydrocarbylene group," and "hydrocarbon group" can include rings, ring systems, aromatic rings, and aromatic ring systems, which contain only carbon and hydrogen. "Hydrocarbyl groups," "hydrocarbylene groups," and "hydrocarbon groups" include, by way of example, aryl, arylene, arene groups, alkyl, alkylene, alkane group, cycloalkyl, cycloalkylene, cycloalkane groups, aralkyl, aralkylene, and aralkane groups, respectively, among other groups as members.

The term "alkane" whenever used in this specification and claims refers to a saturated hydrocarbon compound. Other identifiers can be utilized to indicate the presence of particular groups in the alkane (e.g. halogenated alkane indicates the presence of one or more halogen atoms replacing an equivalent number of hydrogen atoms in the alkane). The term "alkyl group" is used herein in accordance with the definition specified by IUPAC: a univalent group formed by removing a hydrogen atom from an alkane. Similarly, an "alkylene group" refers to a group formed by removing two hydrogen atoms from an alkane (either two hydrogen atoms from one carbon atom or one hydrogen atom from two different carbon atoms). An "alkane group" is a general term that refers to a group formed by removing one or more hydrogen atoms (as necessary for the particular group) from an alkane. An "alkyl group," "alkylene group," and "alkane group" can be acyclic or cyclic groups, and/or can be linear or branched unless otherwise specified. Primary, secondary, and tertiary alkyl group are derived by removal of a hydrogen atom from a primary, secondary, tertiary carbon atom, respectively, of an alkane. The n-alkyl group derived by removal of a hydrogen atom from a terminal carbon atom of a linear alkane. The groups RCH$_2$ (R≠H), R$_2$CH(R≠H), and R$_3$C (R≠H) are primary, secondary, and tertiary alkyl groups, respectively.

A "cycloalkane" is a saturated cyclic hydrocarbon, with or without side chains, for example, cyclobutane. Other identifiers can be utilized to indicate the presence of particular groups in the cycloalkane (e.g. halogenated cycloalkane indicates the presence of one or more halogen atoms replacing an equivalent number of hydrogen atoms in the cycloalkane). Unsaturated cyclic hydrocarbons having one endocyclic double or one triple bond are called cycloalkenes and cycloalkynes, respectively. Those having more than one such multiple bond are cycloalkadienes, cycloalkatrienes, and so forth.

A "cycloalkyl group" is a univalent group derived by removing a hydrogen atom from a ring carbon atom from a cycloalkane. For example, a 1-methylcyclopropyl group and a 2-methylcyclopropyl group are illustrated as follows.

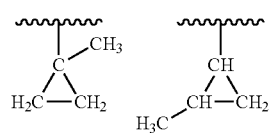

Similarly, a "cycloalkylene group" refers to a group derived by removing two hydrogen atoms from a cycloalkane, at least one of which is a ring carbon. Thus, a "cycloalkylene group" includes both a group derived from a cycloalkane in which two hydrogen atoms are formally removed from the same ring carbon, a group derived from a cycloalkane in which two hydrogen atoms are formally removed from two different ring carbons, and a group derived from a cycloalkane in which a first hydrogen atom is formally removed from a ring carbon and a second hydrogen atom is formally removed from a carbon atom that is not a ring carbon. A "cycloalkane group" refers to a generalized group formed by removing one or more hydrogen atoms (as necessary for the particular group and at least one of which is a ring carbon) from a cycloalkane.

An arene whenever used in this specification and claims refers to an aromatic hydrocarbon compound. Other identifiers can be utilized to indicate the presence of particular groups in the arene (e.g. halogenated arene indicates the presence of one or more halogen atoms replacing an equivalent number of hydrogen atoms in the arene). An "aryl group" is a group derived from the formal removal of a hydrogen atom from an aromatic ring carbon of an arene. It should be noted that the arene can contain a single aromatic hydrocarbon ring (e.g. benzene, or toluene), contain fused aromatic rings (e.g. naphthalene or anthracene), and contain one or more isolated aromatic rings covalently linked via a bond (e.g. biphenyl) or non-aromatic hydrocarbon group(s) (e.g. diphenylmethane). It should be noted that if a single hydrogen atom has been removed from aromatic hydrocarbon ring or aromatic hydrocarbon ring system from a compound containing isolated aromatic hydrocarbon ring(s) or ring system(s) and heteroaromatic ring(s) or ring system(s) the group is referred to as an "aryl group." One example of an "aryl group" is ortho-tolyl (o-tolyl), the structure of which is shown here.

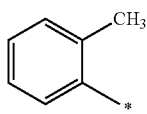

Similarly, an "arylene group" refers to a group formed by removing two hydrogen atoms (at least one of which is from an aromatic ring carbon) from an arene. An "arene group" refers to a generalized group formed by removing one or more hydrogen atoms (as necessary for the particular group and at least one of which is an aromatic ring carbon) from an arene.

A heteroarene whenever used in this specification and claims refers to an aromatic compound having a heteroatom in an aromatic ring or ring system. Other identifiers can be utilized to indicate the presence of particular groups in the heteroarene (e.g. halogenated heteroarene indicates the presence of one or more halogen atoms replacing an equivalent number of hydrogen atoms in the heteroarene). A "heteroaryl group" is a univalent group formed by removing a hydrogen atom from a heteroaromatic ring or ring system carbon atom of a heteroarene compound. By specifying that the hydrogen atom is removed from a ring carbon atom, a "heteroaryl group" is distinguished from an "arylheteryl group," in which a hydrogen atom is removed from a heteroaromatic ring or ring system heteroatom. For example, an indol-2-yl group is one example of a "heteroaryl group," and an indol-1-yl group is one example of an "arylheteryl" group." Similarly, a "heteroarylene group" refers to a group formed by removing two hydrogen atoms from a heteroarene compound, at least one of which is from a heteroarene ring or ring system carbon atom. Thus, in a "heteroarylene group," at least one hydrogen is removed from a heteroarene ring or ring system carbon atom, and the other hydrogen atom can be removed from any other carbon atom, including for example, a heteroarene ring or ring system carbon atom, or a non-heteroarene ring or ring system atom. A "heteroarene group" refers to a generalized group formed by removing one or more hydrogen atoms (as necessary for the particular group and at least one of which is a heteroarene ring or ring system carbon atom) from a heteroarene compound.

As used herein, a "polysulfide moiety" refers to a $S_X$ unit, where x is greater than or equal to 2. For instance, —S—S— and —S—S—S— moieties are considered to be polysulfide moieties in accordance with this disclosure; a disulfide moiety and a trisulfide moiety, respectively. Generally, compositions containing compounds having a polysulfide moiety typically contain compounds that have different values of x. Consequently, the compounds having a polysulfide moiety with a composition containing compounds having a polysulfide moiety can be described as having an average value for x which may be a non-integer.

DETAILED DESCRIPTION

Disclosed herein are compositions which can be used to create polymeric materials with enhanced or otherwise altered properties. The formulations disclosed herein are prepared by contacting reactants comprising, consisting essentially of, or consisting of, (a) a compound comprising (i) a polysulfide moiety and (ii) an oxygen atom in a β-position to the polysulfide moiety (b) a compound comprising a nucleophilic moiety, and (c) a compound comprising a moiety reactive to active hydrogen under conditions suitable to result in the formation of a reaction product. This reaction product is hereinafter designated the polymer enhancing formulation (PEF). Each of these compounds along with methods of preparing and using the PEF are described in greater detail herein.

In an embodiment, a reaction mixture for preparation of a PEF comprises, consists essentially of, or consists of, a compound comprising (i) a polysulfide moiety and (ii) an oxygen atom in β-position to the polysulfide moiety, hereinafter designated Component A. In some embodiments, Component A additionally comprises active hydrogen. Any compound comprising (i) a polysulfide moiety and (ii) an oxygen atom in β-position to the polysulfide moiety that is compatible with the other components of the reaction mixture and able to produce a PEF of the type described herein can be used.

In an embodiment, Component A can be a compound characterized by general Formula I or Formula Ia; alternatively, Formula I; alternatively, Formula Ia.

Formula I

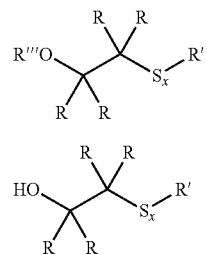

Formula Ia

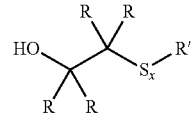

Generally, R, R', R''' and x are independent elements of the compound having Formula I or Formula Ia and are independently described herein. Compounds represented by Formula I or Formula Ia utilizing R, R', R''' and x can be described utilizing any combination of R described herein, R' described herein, R''' described herein, and x described herein.

In an embodiment, each R can be different. In some embodiments, each R can be the same. In other embodiments, at least two of the R groups are the same. In an embodiment, each R can be independently selected from the group consisting of hydrogen and an organyl group; or alternatively, hydrogen and a hydrocarbyl group. In other embodiments, each R can independently be H or a $C_1$ to $C_{20}$ organyl group; alternatively, H or a $C_1$ to $C_{10}$ organyl group; or alternatively, H or a $C_1$ to $C_5$ organyl group. In other embodiments, each R can independently be H or a $C_1$ to $C_{20}$ hydrocarbyl group; alternatively, H or a $C_1$ to $C_{10}$ hydrocarbyl group; or alternatively, H or a $C_1$ to $C_5$ hydrocarbyl group or alternatively H.

In some embodiments, each non-hydrogen R group can be independently selected from the group consisting of an alkyl group, a substituted alkyl group, a cycloalkyl group, a substituted cycloalkyl group, an aryl group, a substituted aryl group, a heteroaryl group, and a substituted heteroaryl group. In other embodiments, each non-hydrogen R group can independently be an alkyl group, a substituted alkyl group, a cycloalkyl group, a substituted cycloalkyl group, an aryl group, or a substituted aryl group; alternatively, a cycloalkyl group or a substituted cycloalkyl group; alternatively, an alkyl group, or substituted alkyl group; alternatively, an aryl group or a substituted aryl group; or alternatively, a heteroaryl group or a substitute heteroaryl group. In yet other embodiments, each R can independently be an alkyl group; alternatively, a substituted alkyl group; alternatively, a cycloalkyl group; alternatively, a substituted cycloalkyl group; alternatively, an aryl group; alternatively, a substituted aryl group; alternatively, a heteroaryl group; or alternatively, a substituted heteroaryl group. Generally, the alkyl group, substituted alkyl group, cycloalkyl group, substituted cycloalkyl group, aryl group, substituted aryl group, heteroaryl group, and substituted heteroaryl group which can be utilized as R can have the same number of carbon atoms as any organyl group or hydrocarbyl group of which it is a member.

In an embodiment, R' can be an organyl group; or alternatively, a hydrocarbyl group. In embodiments, R' can be a $C_1$ to $C_{20}$ organyl group; alternatively, a $C_1$ to $C_{10}$ organyl group; or alternatively, a $C_1$ to $C_5$ organyl group. In other embodiments, R' can be a $C_1$ to $C_{20}$ hydrocarbyl group; alternatively, a $C_1$ to $C_{10}$ hydrocarbyl group; or alternatively, a $C_1$ to $C_5$ hydrocarbyl group. In some embodiments, R' can be selected from the group consisting of an alkyl group, a substituted alkyl group, a cycloalkyl group, a substituted cycloalkyl group, an aryl group, a substituted aryl group, a heteroaryl group, and a substituted heteroaryl group. In other embodiments, R' can be an alkyl group, a substituted alkyl group, a cycloalkyl group, a substituted cycloalkyl group, an aryl group, or a substituted aryl group; alternatively, an alkyl group, or substituted alkyl group; alternatively, a cycloalkyl group or a substituted cycloalkyl group; alternatively, an aryl group or a substituted aryl group; or alternatively, a heteroaryl group or a substitute heteroaryl group. In other embodiments, R' can be an alkyl group; alternatively, a cycloalkyl group; alternatively, a substituted alkyl group; alternatively, a substituted cycloalkyl group; alternatively, an aryl group; alternatively, a substituted aryl group; alternatively, a heteroaryl group; or alternatively, a substituted heteroaryl group. Generally, the alkyl group, substituted alkyl group, cycloalkyl group, substituted cycloalkyl group, aryl group, substituted aryl group, heteroaryl group, and substituted heteroaryl group which can be utilized as R' can have the same number of carbon atoms as any organyl group or hydrocarbyl group of which it is a member.

In an embodiment, R''' can be an organyl group; or alternatively, a hydrocarbyl group. In embodiments, R''' can be a $C_1$ to $C_{20}$ organyl group; alternatively, a $C_1$ to $C_{10}$ organyl group; or alternatively, a $C_1$ to $C_5$ organyl group. In other embodiments, R''' can be a $C_1$ to $C_{20}$ hydrocarbyl group; alternatively, a $C_1$ to $C_{10}$ hydrocarbyl group; or alternatively, a $C_1$ to $C_5$ hydrocarbyl group. In some embodiments, R''' can be selected from the group consisting of an alkyl group, a substituted alkyl group, a cycloalkyl group, a substituted cycloalkyl group, an aryl group, a substituted aryl group, a heteroaryl group, and a substituted heteroaryl group. In other embodiments, R''' can be an alkyl group, a substituted alkyl group, a cycloalkyl group, a substituted cycloalkyl group, an aryl group, or a substituted aryl group; alternatively, an alkyl group, or substituted alkyl group; alternatively, a cycloalkyl group or a substituted cycloalkyl group; alternatively, an aryl group or a substituted aryl group; or alternatively, a heteroaryl group or a substitute heteroaryl group. In other embodiments, R''' can be an alkyl group; alternatively, a cycloalkyl group; alternatively, a substituted alkyl group; alternatively, a substituted cycloalkyl group; alternatively, an aryl group; alternatively, a substituted aryl group; alternatively, a heteroaryl group; or alternatively, a substituted heteroaryl group. Generally, the alkyl group, substituted alkyl group, cycloalkyl group, substituted cycloalkyl group, aryl group, substituted aryl group, heteroaryl group, and substituted heteroaryl group which can be utilized as R''' can have the same number of carbon atoms as any organyl group or hydrocarbyl group of which it is a member.

In an embodiment, the non-hydrogen R, R' or R''' group can be a methyl group, an ethyl group, a propyl group, a butyl group, a pentyl group, a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, an octadecyl group, or a nonadecyl group; or alternatively, a methyl group, an ethyl group, a propyl group, a butyl group, a pentyl group, a hexyl group, a heptyl group, an octyl group, a nonyl group, or a decyl group. In some embodiments, the alkyl group which can be utilized as a non-hydrogen R, R' or R''' group can be a methyl group, an ethyl group, a n-propyl group, an iso-propyl group, a n-butyl group, an iso-butyl group, a sec-butyl group, a tert-butyl group, an n-pentyl group, an iso-pentyl group, a sec-pentyl group, or a neopentyl group; alternatively, a methyl group, an ethyl group, an iso-propyl group, a tert-butyl group, or a neopentyl group; alternatively, a methyl group; alternatively, an ethyl group; alternatively, a n-propyl group; alternatively, an iso-propyl group; alternatively, a tert-butyl group; or alternatively, a neopentyl group. In some embodiments, any of the disclosed alkyl groups may be substituted. Substituents for the substituted alkyl group are independently disclosed herein and can be utilized without limitation to further describe the substituted alkyl group which can be utilized as a non-hydrogen R, R' or R''' group.

In an embodiment, the non-hydrogen R, R' or R''' group can be a cyclobutyl group, a substituted cyclobutyl group, a cyclopentyl group, a substituted cyclopentyl group, a cyclohexyl group, a substituted cyclohexyl group, a cycloheptyl group, a substituted cycloheptyl group, a cyclooctyl group, or a substituted cyclooctyl group. In some embodiments, the cycloalkyl group which can be utilized as a non-hydrogen R, R' or R''' group can be a cyclopentyl group, a substituted cyclopentyl group, a cyclohexyl group, or a substituted cyclohexyl group. In other embodiments, the cycloalkyl group which can be utilized as a non-hydrogen R, R' or R''' group can be a cyclobutyl group or a substituted cyclobutyl group; alternatively, a cyclopentyl group or a substituted cyclopentyl group; alternatively, a cyclohexyl group or a substituted cyclohexyl group; alternatively, a cycloheptyl group or a substituted cycloheptyl group; or alternatively, a cyclooctyl group, or a substituted cyclooctyl group. In further embodiments, the cycloalkyl group which can be utilized as a non-hydrogen R, R' or R''' group can be a cyclopentyl group; alternatively, a substituted cyclopentyl group; a cyclohexyl group; or alternatively, a substituted cyclohexyl group. Substituents for the substituted cycloalkyl group are independently disclosed herein and can be utilized without limitation to further describe the substituted cycloalkyl group which can be utilized as a non-hydrogen R, R' or R''' group. Substituents for the substituted cycloalkyl groups (general or specific) are independently disclosed herein and can be utilized without limitation to further describe the substituted cycloalkyl groups which can be utilized as a non-hydrogen R, R' or R''' group.

In an aspect, the non-hydrogen R, R' or R''' group can be a phenyl group, a substituted phenyl group, a naphthyl group, or a substituted naphthyl group. In an embodiment, the aryl group(s) which can be utilized as a non-hydrogen R, R' or R''' group can be a phenyl group or a substituted phenyl group; alternatively, a naphthyl group or a substituted naphthyl group; alternatively, a phenyl group or a naphthyl group; or alternatively, a substituted phenyl group or a substituted naphthyl group.

In an embodiment, the non-hydrogen R, R' or R''' group can be a 2-substituted phenyl group, a 3-substituted phenyl group, a 4-substituted phenyl group, a 2,4-disubstituted phenyl group, a 2,6-disubstituted phenyl group, a 3,5-disubstituted phenyl group, or a 2,4,6-trisubstituted phenyl group. In other embodiments, the substituted phenyl group which can be utilized as a non-hydrogen R, R' or R''' group can be a 2-substituted phenyl group, a 4-substituted phenyl group, a 2,4-disubstituted phenyl group, or a 2,6-disubstituted phenyl group; alternatively, a 3-substituted phenyl group or a 3,5-disubstituted phenyl group; alternatively, a 2-substituted phenyl group or a 4-substituted phenyl group; alternatively, a 2,4-disubstituted phenyl group or a 2,6-disubstituted phenyl group; alternatively, a 2-substituted phenyl group; alternatively, a 3-substituted phenyl group; alternatively, a 4-substituted phenyl group; alternatively, a 2,4-disubstituted phenyl group; alternatively, a 2,6-disubstituted phenyl group; alternatively, 3,5-disubstituted phenyl group; or alternatively, a 2,4,6-trisubstituted phenyl group. Substituents for the substituted phenyl groups (general or specific) are independently disclosed herein and can be utilized without limitation to further describe the substituted phenyl groups which can be utilized as a non-hydrogen R, R' or R''' group.

In an embodiment, each non-hydrogen substituent(s) for the substituted alkyl group which can be utilized as a non-hydrogen R, R' or R''' group can be independently selected from a halide or a $C_1$ to $C_{10}$ hydrocarboxy group; alternatively, a halide; or alternatively, a $C_1$ to $C_{10}$ hydrocarboxy group. In some embodiments, each non-hydrogen substituent(s) for the substituted alkyl group which can be utilized as a non-hydrogen R, R' or R''' group can be independently selected from a halide or a $C_1$ to $C_5$ hydrocarboxy group; alternatively, a halide; or alternatively, a $C_1$ to $C_5$ hydrocarboxy group. Specific substituent halides, and hydrocarboxy groups are independently disclosed herein and can be utilized without limitation to further describe the substituents for the substituted alkyl group which can be utilized as a non-hydrogen R, R' or R''' group.

In an embodiment, each non-hydrogen substituent(s) for the substituted cycloalkyl group, substituted aryl group, or substituted heteroaryl group which can be utilized as a non-hydrogen R, R' or R''' group can be independently selected from a halide, a $C_1$ to $C_{10}$ hydrocarbyl group, or a $C_1$ to $C_{10}$ hydrocarboxy group; alternatively, a halide or a $C_1$ to $C_{10}$ hydrocarbyl group; alternatively, a halide or a $C_1$ to $C_{10}$ hydrocarboxy group; alternatively, a $C_1$ to $C_{10}$ hydrocarbyl group or a $C_1$ to $C_{10}$ hydrocarboxy group; alternatively, a halide; alternatively, a $C_1$ to $C_{10}$ hydrocarbyl group; or alternatively, a $C_1$ to $C_{10}$ hydrocarboxy group. In some embodiments, each non-hydrogen substituent(s) for the substituted cycloalkyl group, substituted aryl group, or substituted heteroaryl group which can be utilized as a non-hydrogen R, R' or R''' group can be independently selected from a halide, a $C_1$ to $C_5$ hydrocarbyl group, or a $C_1$ to $C_5$ hydrocarboxy group; alternatively, a halide or a $C_1$ to $C_5$ hydrocarbyl group; alternatively, a halide or a $C_1$ to $C_5$ hydrocarboxy group; alternatively, a $C_1$ to $C_5$ hydrocarbyl group or a $C_1$ to $C_5$ hydrocarboxy group; alternatively, a halide; alternatively, a $C_1$ to $C_5$ hydrocarbyl group; or alternatively, a $C_1$ to $C_5$ hydrocarboxy group. Specific substituent halides, hydrocarbyl groups, and hydrocarboxy groups are independently disclosed herein and can be utilized without limitation to further describe the substituents for the substituted cycloalkyl group, substituted aryl group, or substituted heteroaryl group which can be utilized as a non-hydrogen R, R' or R''' group.

In an embodiment, any halide substituent of a substituted alkyl group (general or specific), substituted cycloalkyl group (general or specific), substituted aryl group (general or specific), substituted heteroaryl (general or specific) can be a fluoride, chloride, bromide, or iodide; alternatively, a fluoride or chloride. In some embodiments, any halide substituent of a substituted alkyl group (general or specific), substituted cycloalkyl group (general or specific), substituted aryl group (general or specific), substituted heteroaryl (general or specific) can be a fluoride; alternatively, a chloride; alternatively, a bromide; or alternatively, an iodide.

In an embodiment, any hydrocarbyl substituent of a substituted cycloalkyl group (general or specific), substituted aryl group (general or specific), substituted heteroaryl (general or specific) can be an alkyl group, an aryl group, or an aralkyl group; alternatively, an alkyl group; alternatively, an aryl group, or an aralkyl group. Generally, the alkyl, aryl, and aralkyl substituent groups can have the same number of carbon atoms as the hydrocarbyl substituent group disclosed herein. In an embodiment, any alkyl substituent of a substituted cycloalkyl group (general or specific), substituted aryl group (general or specific), substituted heteroaryl (general or specific) can be a methyl group, an ethyl group, an n-propyl group, an isopropyl group, an n-butyl group, a sec-butyl group, an isobutyl group, a tert-butyl group, an n-pentyl group, a 2-pentyl group, a 3-pentyl group, a 2-methyl-1-butyl group, a tert-pentyl group, a 3-methyl-1-butyl group, a 3-methyl-2-butyl group, or a neo-pentyl group; alternatively, a methyl group, an ethyl group, an isopropyl group, a tert-butyl group, or a neo-pentyl group; alternatively, a methyl group; alternatively, an ethyl group; alternatively, an isopropyl group; alternatively, a tert-butyl group; or alternatively, a neo-pentyl group. In an embodiment, any aryl substituent of a substituted cycloalkyl group (general or specific), substituted aryl group (general or specific), substituted heteroaryl (general or specific) can be a phenyl group, a tolyl group, a xylyl group, or a 2,4,6-trimethylphenyl group; alternatively, a phenyl group; alternatively, a tolyl group, alternatively, a xylyl group; or alternatively, a 2,4,6-trimethylphenyl group. In an embodiment, any aralkyl substituent of a substituted cycloalkyl group (general or specific), substituted aryl group (general or specific), substituted heteroaryl (general or specific) can be benzyl group.

In an embodiment, any hydrocarboxy substituent of a substituted alkyl group (general or specific), substituted cycloalkyl group (general or specific), substituted aryl group (general or specific), substituted heteroaryl (general or specific) can be an alkoxy group, an aryloxy group, or and aralkoxy group; alternatively, an alkoxy group; alternatively, an aryloxy group, or an aralkoxy group. Generally, the alkoxy, aryloxy, and aralkoxy substituent groups can have the same number of carbon atoms as the hydrocarboxy substituent group disclosed herein. In an embodiment, any alkoxy substituent of a substituted alkyl group (general or specific), substituted cycloalkyl group (general or specific), substituted aryl group (general or specific), substituted heteroaryl (general or specific) can be a methoxy group, an ethoxy group, an n-propoxy group, an isopropoxy group, an n-butoxy group, a sec-butoxy group, an isobutoxy group, a tert-butoxy group, an n-pentoxy group, a 2-pentoxy group, a 3-pentoxy group, a 2-methyl-1-butoxy group, a tert-pentoxy group, a 3-methyl-1-butoxy group, a 3-methyl-2-butoxy group, or a neo-pentoxy group; alternatively, a methoxy group, an ethoxy group, an isopropoxy group, a tert-butoxy group, or a neo-pentoxy group; alternatively, a methoxy group; alternatively, an ethoxy group; alternatively, an isopropoxy group; alternatively, a tert-butoxy group; or alternatively, a neo-pentoxy group. In an embodiment, any aroxy substituent of a substituted alkyl group (general or specific), substituted cycloalkyl group (general or specific), substituted aryl group (general or specific), substituted heteroaryl (general or specific) can be a phenoxy group, a toloxy group, a xyloxy group, or a 2,4,6-trimethylphenoxy group; alternatively, a phenoxy group; alternatively, a toloxy group, alternatively, a xyloxy group; or alternatively, a 2,4,6-trimethylphenoxy group. In an embodiment, any aralkoxy substituent of a substituted alkyl group (general or specific), substituted cycloalkyl group (general or specific), substituted aryl group (general or specific), substituted heteroaryl (general or specific) can be benzoxy group.

In an embodiment, R''' may be acyl group (thus forming an ester group) having the structure —C(=O)R$^{11}$. In another embodiment, R''' may be a N-hydrocarbylcarbamoyl group (thus forming a urethane group) having the structure —C(=O)NHR$^{12}$. In an embodiment, R$^{11}$ of the acyl group and/or R$^{12}$ of the N-hydrocarbylcarbamoyl group can be an organyl group; or alternatively, a hydrocarbyl group. In embodiments, R$^{11}$ and/or R$^{12}$ can be a $C_1$ to $C_{20}$ organyl group; alternatively, a $C_1$ to $C_{10}$ organyl group; or alternatively, a $C_1$ to $C_5$ organyl group. In other embodiments, R$^{11}$ and/or R$^{12}$ can be a $C_1$ to $C_{20}$ hydrocarbyl group; alternatively, a $C_1$ to $C_{10}$ hydrocarbyl group; or alternatively, a $C_1$ to $C_5$ hydrocarbyl group. In some embodiments, R$^{11}$ and/or R$^{12}$ can be selected from the group consisting of an alkyl group, a substituted alkyl group, a cycloalkyl group, a substituted cycloalkyl group, an aryl group, a substituted aryl group, a heteroaryl group, and a substituted heteroaryl group. In other embodiments, R$^{11}$ and/or R$^{12}$ can be an alkyl group, a substituted alkyl group, a cycloalkyl group, a substituted cycloalkyl group, an aryl group, or a substituted aryl group; alternatively, an alkyl group, or substituted alkyl group; alternatively, a cycloalkyl group or a substituted cycloalkyl group; alternatively, an aryl group or a substituted aryl group; or alternatively, a heteroaryl group or a substituted heteroaryl group. In other embodiments, R$^{11}$ and/or R$^{12}$ can be an alkyl group; alternatively, a cycloalkyl group; alternatively, a substituted alkyl group; alternatively, a substituted cycloalkyl group; alternatively, an aryl group; alternatively, a substituted aryl group; alternatively, a heteroaryl group; or alternatively, a substituted heteroaryl group. Generally, the alkyl group, substituted alkyl group, cycloalkyl group, substituted cycloalkyl group, aryl group, substituted aryl group, heteroaryl group, and substituted heteroaryl group which can be utilized as R$^{11}$ and/or R$^{12}$ can have the same number of carbon atoms as any organyl group or hydrocarbyl group of which it is a member. Organyl groups, hydrocarbyl group, alkyl groups, substituted alkyl groups, cycloalkyl groups, substituted cycloalkyl groups, aryl groups, substituted aryl groups, heteroaryl groups, and substituted heteroaryl groups have been described herein as potential R', R'', or R''' groups and these groups may be utilized without limitation to further describe the acyl group or N-hydrocarbylcarbamoyl group which may be utilized as R'''.

In an embodiment, x of the polysulfide moiety can be a number ranging from 2 to 6; alternatively, 3 to 6; or alternatively, 3 to 4. In other embodiments, the polysulfide moiety can be 2; alternatively, 3; alternatively, 4; alternatively, 5; or alternatively, 6. One having ordinary skill in the art recognizes that compositions containing compounds having a polysulfide moiety can typically contain compounds having different values of x. For example, commercially available dithiodiglycol contains the polysulfide having the formula $HOC_2H_4S_2C_2H_4OH$ and some polysulfide having the formula $HOC_2H_4S_3C_2H_4OH$. Consequently, the value x for compounds having a polysulfide moiety within a composition containing compounds having a polysulfide moiety can be described as having an average value of x. Generally, x can have an average of greater than 2. In some embodiments, x can have an average of greater than 2.03; alternatively, greater than 2.25; alternatively, greater than 2.5; alternatively, greater than 3; alternatively, greater than 3.5; or alternatively, greater than 4. In some other embodiments, x can have an average value ranging from 2.03 to 6; alternatively, from 2.03 to 5; alternatively, from 2.03 to 4.5; alternatively, from 2.03 to 2.15; alternatively from 2.5 to 3.5; alternatively, 3.5 to 4.5. In other embodiments, the average value of x for the sulfides of the composition comprising, consisting essentially of, or consisting of, polysulfides can be about 2.03; alternatively, about 2.25; alternatively; about 2.5; alternatively, about 3; alternatively, about 3.5; or alternatively, about 4.

In another embodiment, component A can be a compound represented by general Formula II or Formula IIa; alternatively, Formula II; or alternatively, Formula IIa.

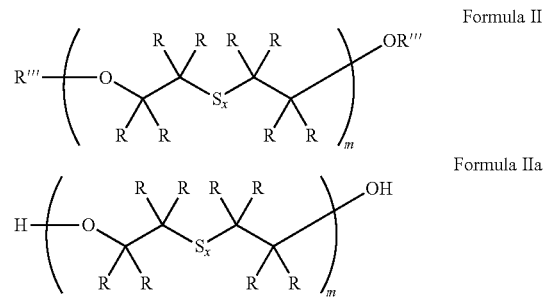

Generally, R, R''', x, and m are independent elements of the compound represented by general Formula II or Formula IIa and are independently described herein. Compounds represented by Formula II or Formula IIa utilizing R, R''', x, and m can be described utilizing any combination of R and R''' described herein, x described herein, and m described herein. R, R''' and x have been previously described herein and these descriptions can be utilized without limitation to describe compounds represented by general Formula II or Formula IIa. In an embodiment, m can be greater than or equal to 1; alternatively greater than or equal to 2; or alternatively, greater than or equal to 3. In some embodiments, m can range from 1 to 10; alternatively from 1 to 6; alternatively, 1 to 4; alternatively, from 1 to 3; or alternatively, from 1 to 2. One having ordinary skill in the art recognizes that compositions containing compounds having Formula II or Formula IIa (or compounds having similar repeating units) will typically contain compounds having different values of m. Consequently, the value m of compounds having a Formula II or Formula IIa (or compound having similar repeating units) within a composition containing compounds having Formula II or Formula IIa (or compound having similar repeating units) can be described as having an average value of m. Generally, m can have an average of greater than or equal to 1. In some embodiments, m can have an average of greater than or equal to 1.25; alternatively, greater than or equal to 1.5; alternately, greater than or equal to 2; alternatively greater than or equal to 2.5; or alternatively, greater than or equal to 3. In some other embodiments, m can have an average value ranging from 1 to 10; alternatively, from 1 to 8; alternatively, from 1.25 to 7; alternatively, from 1.5 to 6; or alternatively, from 2 to 5.

In an embodiment, Component A can be represented by Formula III or Formula IIIa; alternatively, Formula III; or alternatively, Formula IIIa.

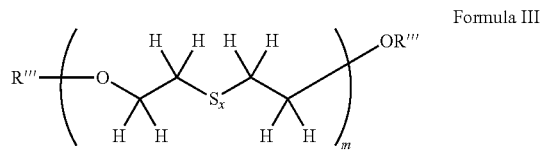

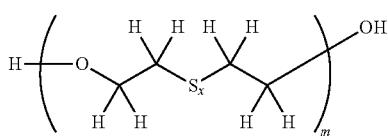

Formula IIIa

Generally, x and m are independent elements of the compound represented by Formula III or Formula IIIa and are independently described herein. Compounds represented by Formula III or Formula IIIa utilizing x and m can be described utilizing any combination of x described herein and m described herein. Elements x and m have been previously described herein and these descriptions can be utilized without limitation to describe compounds represented by Formula III or Formula IIIa.

In an embodiment, Component A can be represented by Formula IIIb or Formula IIIc; alternatively, Formula IIIb; or alternatively, Formula IIIc.

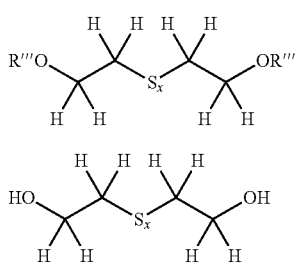

Formula IIIb

Formula IIIc

Generally, R''' and x are independent elements of the compound represented by Formula IIIb or Formula IIIc and are independently described herein. Compounds represented by Formula IIIb or Formula IIIc utilizing R''' and x can be described utilizing any combination of R''' described herein and x described herein. Elements R''' and x have been previously described herein and these descriptions can be utilized without limitation to describe compounds represented by Formula IIIb or Formula IIIc.

In another embodiment, Component A can be a compound represented by Formula IV or Formula Iva; alternatively, Formula IV; or alternatively, Formula IVa.

Generally, R, R'', R''', x, m, and n are independent elements of the compound represented by Formula IV or Formula IVa and are independently described herein. Compounds represented by Formula IV or Formula IVa utilizing R, R'', R''', x, m and n can be described utilizing any combination of R described herein, R'' described herein, R''', x described herein, m described herein, and n described herein. Elements R, R''', x, and m have been previously described herein and these descriptions can be utilized without limitation to describe compounds represented by Formula IV or Formula IVa. Additionally, each m and each x of Formula IV and Formula IVa can independently be any m described herein and any x described herein.

In an embodiment, each R'' can independently be a $C_1$ to $C_{60}$ organylene group; alternatively, a $C_1$ to $C_{50}$ organylene group; alternatively, $C_1$ to $C_{40}$ organylene group; alternatively, a $C_1$ to $C_{30}$ organylene group; or alternatively, a $C_1$ to $C_{20}$ organylene group. In other embodiments, each R'' can independently be a $C_1$ to $C_{60}$ hydrocarbylene group; alternatively, a $C_1$ to $C_{50}$ hydrocarbylene group; alternatively, a $C_1$ to $C_{40}$ hydrocarbylene group; alternatively, a $C_1$ to $C_{30}$ hydrocarbylene group; alternatively, a $C_1$ to $C_{20}$ hydrocarbylene group. In an aspect, each R'' can independently be an organylene group that can be found between two carbonyl groups of a dicarboxylic or multicarboxylic acid, such as, for example, $-(CH_2)_2-$ for succinic acid, $-(CH)_2-$ for maleic and fumaric acids, $-(CH_2)_4-$ for adipic acid, $-(C_6H_4)-$ for phthallic acid, $-(CH_2)_8-$ for azelaic or cebasic acid, $-C_{34}H_{62}-$ for the dimer of octadecadienoic acid, etc. . . . . In an embodiment, each R'' can independently be an organylene group or a hydrocarbylene group derived from an unsaturated fatty acid dimer. In such an embodiment, each R'' can independently be the organylene group portion or the hydrocarbylene group portion of the unsaturated fatty acid dimer that is located between the carboxyl carbon atoms of the unsaturated fatty acid dimer. In these embodiments, the organylene group portion or hydrocarbylene group portion of the unsaturated fatty acid dimer includes all the carbon atoms between the two carboxyl carbon atoms and excludes the two carbons in the $-C(=O)OH$ of the fatty acid dimer. It should be understood that while the dimer of an unsaturated fatty acid carboxylic acid is mentioned, it is also contemplated that these materials can also include the dimers of the simple esters or anhydrides of the fatty acids.

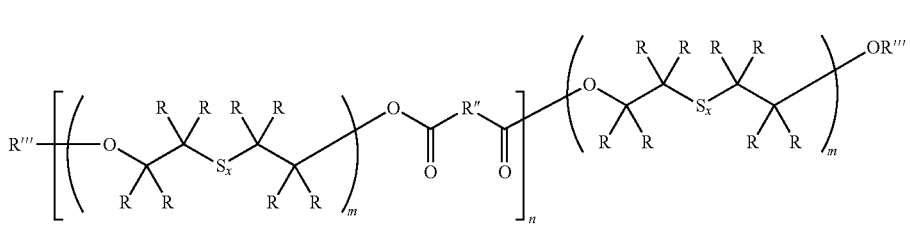

Formula IV

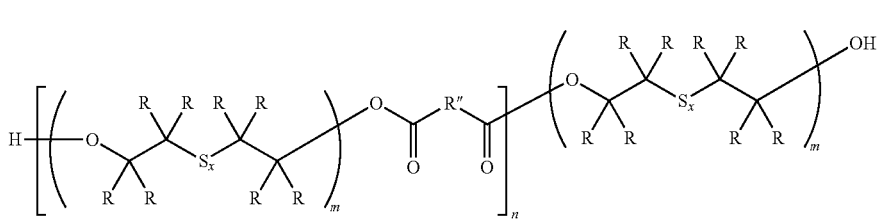

Formula IVa

In an aspect, each R" can independently be an alkylene group, a substituted alkylene group, an alkenylene group, a substituted alkenylene group, a cycloalkylene group, a substituted cycloalkylene group, an arylene group, or a substituted arylene group; alternatively, an alkylene group; alternatively, a substituted alkylene group; alternatively, an alkenylene group; alternatively, a substituted alkenylene group; alternatively, a cycloalkylene group; alternatively, a substituted cycloalkylene group; alternatively, an arylene group; or alternatively, a substituted arylene group alternatively, an alkylene group; alternatively, a substituted alkylene group; alternatively, an alkenylene group; alternatively, a substituted alkenylene group; alternatively, a cycloalkylene group; alternatively, a substituted cycloalkylene group; alternatively, an arylene group; or alternatively, a substituted arylene group. Generally, the alkylene group, substituted alkylene group, alkenylene group, substituted alkenylene group, cycloalkylene group, substituted cycloalkylene group, arylene group, or substituted arylene group which can be utilized as R" can have the same number of carbon atoms as the organylene or hydrocarbylene groups which can be utilized as R".

In an embodiment, each R" can independently be a methylene group, an ethylene group, a propylene group, a butylene group, a pentylene group, a hexylene group, a heptylene group, an octylene group, a nonylene group, a decylene group, a undecylene group, a dodecylene group, a tridecylene group, a tetradecylene group, a pentadecylene group, a hexadecylene group, a heptadecylene group, an octadecylene group, or a nonadecylene group; or alternatively, a methylene group, an ethylene group, a propylene group, a butylene group, a pentylene group, a hexylene group, a heptylene group, an octylene group, a nonylene group, a decylene group. In some embodiments, each R" can independently be a methylene group, an ethylene group, a propylene group, a butylene group, or a pentylene group. In other embodiments, each R" can independently be a methylene group; alternatively, an ethylene group; alternatively, a propylene group; alternatively, a butylene group; alternatively, a pentylene group; alternatively, a hexylene group; alternatively, a heptylene group; alternatively, an octylene group; alternatively, a nonylene group; alternatively, a decylene group; alternatively, a undecylene group; alternatively, a dodecylene group; alternatively, a tridecylene group; alternatively, a tetradecylene group; alternatively, a pentadecylene group; alternatively, a hexadecylene group; alternatively, a heptadecylene group; alternatively, an octadecylene group; or alternatively, a nonadecylene group. In some embodiments, each R" can independently be a eth-1,2-ylene group, a prop-1,3-ylene group, a but-1,4-ylene group, a but-2,3-ylene group, a pent-1,5-ylene group, a 2,2-dimethylprop-1,3-ylene group, a hex-1,6-ylene group, or a 2,3-dimethylbut-2,3-ylene group; alternatively, eth-1,2-ylene group, a prop-1,3-ylene group, a but-1,4-ylene group, a pent-1,5-ylene group, or a hex-1,6-ylene group; alternatively, a eth-1,2-ylene group; alternatively, a prop-1,3-ylene group; alternatively, a but-1,4-ylene group; alternatively, a but-2,3-ylene group; alternatively, a pent-1,5-ylene group; alternatively, a 2,2-dimethylprop-1,3-ylene group; alternatively, a hex-1,6-ylene group; or alternatively, a 2,3-dimethylbut-2,3-ylene group. In some embodiments, any of the disclosed alkylene groups may be substituted. Substituents for the substituted alkylene group are independently disclosed herein and can be utilized without limitation to further describe the substituted alkylene group which can be utilized as an R" group.

In an embodiment, each R" can independently be an ethenylene group, a propenylene group, a butenylene group, a pentenylene group, a hexenylene group, a heptenylene group, an octenylene group, a nonenylene group, a decenylene group, a undecenylene group, a dodecenylene group, a tridecenylene group, a tetradecenylene group, a pentadecenylene group, a hexadecenylene group, a heptadecenylene group, an octadecenylene group, or a nonadecenylene group; or alternatively, an ethenylene group, a propenylene group, a butenylene group, a pentenylene group, a hexenylene group, a heptenylene group, an octenylene group, a nonenylene group, a decenylene group. In some embodiments, each R" can independently be an ethenylene group, a propenylene group, a butenylene group, or a pentenylene group. In other embodiments, R" can independently be an ethenylene group; alternatively, a propenylene group; alternatively, a butenylene group; alternatively, a pentenylene group; alternatively, a hexenylene group; alternatively, a heptenylene group; alternatively, an octenylene group; alternatively, a nonenylene group; alternatively, a decenylene group; alternatively, a undecenylene group; alternatively, a dodecenylene group; alternatively, a tridecenylene group; alternatively, a tetradecenylene group; alternatively, a pentadecenylene group; alternatively, a hexadecenylene group; alternatively, a heptadecenylene group; alternatively, an octadecenylene group; or alternatively, a nonadecenylene group. Generally, the carbon-carbon double bond(s) of any alkenylene group disclosed herein can be located at any position within the alkenylene group. In a particular non-limiting embodiment, the alkenylene group can be ethen-1,2-ylene. In some embodiments, any of the disclosed alkenylene groups may be substituted. Substituents for the substituted alkenylene group are independently disclosed herein and can be utilized without limitation to further describe the substituted alkenylene group which can be utilized as an R" group.

In an embodiment, each R" can independently be a cyclobutylene group, a substituted cyclobutylene group, a cyclopentylene group, a substituted cyclopentylene group, a cyclohexylene group, a substituted cyclohexylene group, a cycloheptylene group, a substituted cycloheptylene group, a cyclooctylene group, or a substituted cyclooctylene group. In some embodiments, each R" can independently be a cyclopentylene group, a substituted cyclopentylene group, a cyclohexylene group, a substituted cyclohexylene group. In other embodiments, each R" can independently be a cyclobutylene group or a substituted cyclobutylene group; alternatively, a cyclopentylene group or a substituted cyclopentylene group; alternatively, a cyclohexylene group or a substituted cyclohexylene group; alternatively, a cycloheptylene group or a substituted cycloheptylene group; or alternatively, a cyclooctylene group, or a substituted cyclooctylene group. In further embodiments, each R" can be independently a cyclopentylene group; alternatively, a substituted cyclopentylene group; a cyclohexylene group; or alternatively, a substituted cyclohexylene group. Substituents for the substituted cycloalkylene groups (general or specific) are independently disclosed herein and can be utilized without limitation to further describe the substituted cycloalkylene groups which can be utilized as an R" group.

In an embodiment, each R" can independently be a phenylene group, a substituted phenylene group, a naphthylene group, or a substituted naphthylene group; alternatively, a phenylene group or a substituted phenylene group; or alternatively, a naphthylene group or a substituted naphthylene group. In some embodiments, each R" can independently be a phenylene group; alternatively, a substituted phenylene group; alternatively, a naphthylene group; or alternatively, a substituted naphthylene group. In other embodiments, each R" can independently be a phen-1,2-ylene group or a substituted phen-1,2-ylene group; alternatively, a phen-1,2-ylene group; or alternatively, a substituted phen-1,2-ylene group. In other embodiments, each R" can independently be a phen-1,3-ylene group or a substituted phen-1,3-ylene group; alternatively, a phen-1,3-ylene group; or alternatively, a substituted phen-1,3-ylene group. In yet other embodiments, each R" can independently be a phen-1,4-ylene group or a substituted phen-1,4-ylene group; alternatively, a phen-1,4-ylene group; or alternatively, a substituted phen-1,4-ylene group. In further embodiments, each R" can independently be a phen-1,2-ylene group, a phen-1,3-ylene group, or a phen-1,4-ylene group; alternatively, a phen-1,3-ylene group or a phen-1,4-ylene group. In other embodiments, each R" can independently be a substituted phen-1,2-ylene group, a substituted phen-1,3-ylene group, or a substituted phen-1,4-ylene group; alternatively, a substituted phen-1,3-ylene group, or a substituted phen-1,4-ylene group. Substituents for the substituted phenylene groups (general or specific) or naphthylene groups (general or specific) are independently disclosed herein and can be utilized without limitation to further describe the substituted phenyl groups or naphthylene groups which can be utilized as a non-hydrogen R, R' or R'" group.

Non-hydrogen substituent groups have been described herein for substituted alkyl groups, substituted cycloalkyl groups, substituted aryl groups, or substituted heteroaryl groups which could be utilized as a substituent of a R, R' or R'" group. These non-hydrogen substituent groups can be utilized, without limitation, as non-hydrogen substituents for any substituted organylene, substituted hydrocarbylene group, substituted alkylene group, substituted alkenylene group, substituted cycloalkylene group, substituted arylene, substituted phenylene groups, or substituted naphthylene described herein.

Generally, n is at least one. In an embodiment, n is equal to or greater than 1, alternatively, greater than or equal to 2, alternatively greater than or equal to 3; or alternatively greater than or equal to 4. In some embodiments, n can range from 1 to 12; alternatively, from 1 to 10; alternatively, from 2 to 9; or alternatively from 3 to 8. One having ordinary skill in the art recognizes that compositions containing compounds Formula IV or Formula IVa (or other compound having similar repeating units) will typically contain compounds having different values of n. Consequently, the value n of compounds having Formula IV or Formula IVa (or other compounds having similar repeating units) within a composition containing compounds having Formula IV or Formula IVa (or other compounds having similar repeating units) can be described as having an average value of n. Generally, n can have an average of greater than or equal to 1; alternatively greater than or equal to 1.5; alternatively, greater than or equal to 2; alternatively, greater than or equal to 2.5; or alternatively, greater than or equal to 3. In some other embodiments, n can have an average value ranging from 1 to 12; alternatively, from 1.5 to 10; alternatively, from 2 to 9; alternatively, from 2 to 6; or alternatively from 3 to 5; alternatively, from about 4 to 8; or alternatively, from 5 to 7. In yet other embodiments, n can have an average value of about 2; alternatively, of about 2.5; alternatively, of about 3; alternatively, of about 4; alternatively, of about 5; or alternatively, of about 6.

In an embodiment, Component A can be a compound represented by Formula IVb or Formula IVc; alternatively, Formula IVb; alternatively, Formula IVc.

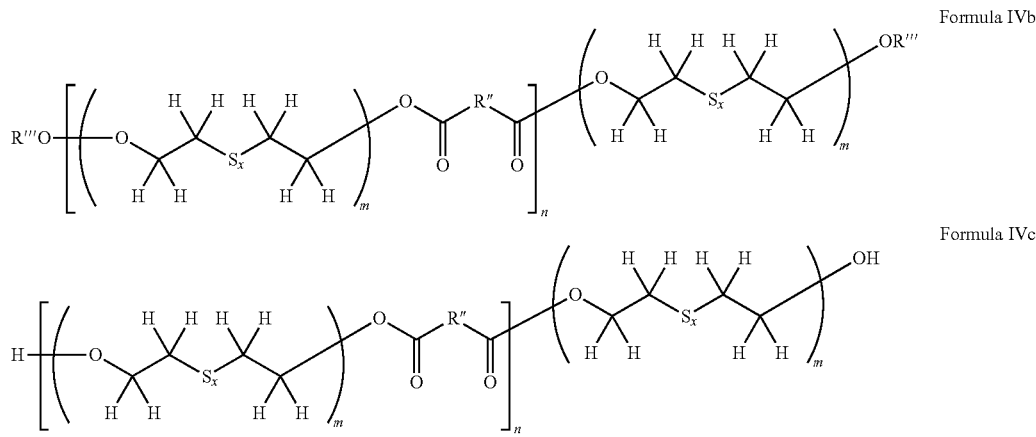

Formula IVb

Formula IVc

Generally, R", R'", x, m, and n are independent elements of the compounds represented by Formula IVb or Formula IVc and are independently described herein. Compounds represented by Formula IVb or Formula IVc utilizing R", R'", x, m and n can be described utilizing any combination of R" described herein, R'" described herein, x described herein, m described herein, and n described herein. Elements R", R'", x, m, and n have been previously described herein and these descriptions can be utilized without limitation to describe compounds represented by Formula IVb or Formula IVc. Additionally, each m and each x of Formula IVb and Formula IVc can independently be any m described herein and any x described herein.

In an embodiment, Component A can be a compound represented by Formula IVd or Formula IVe; alternatively, Formula IVd; or alternatively, Formula IVe.

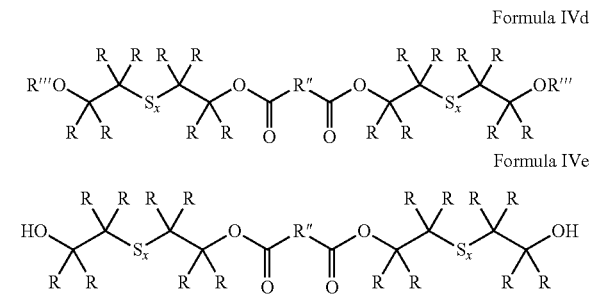

Formula IVd

Formula IVe

Generally, R, R", R'", and x are independent elements of the compounds represented by Formula IVd or Formula IVe and are independently described herein. Compounds represented by Formula IVd or Formula IVe utilizing R, R", R'", and x can be described utilizing any combination of R, described herein, R" described herein, R'" described herein, and x described herein. Elements R, R", R'", and x have been previously described herein and these descriptions can be utilized without limitation to describe compounds represented by Formula IVd or Formula IVe. Additionally each x of Formula IVd and Formula IVe can independently be any x described herein.

In an embodiment, Component A can be a compound represented by Formula IVf or Formula IVg; alternatively, Formula IVf; or alternatively, Formula IVg.

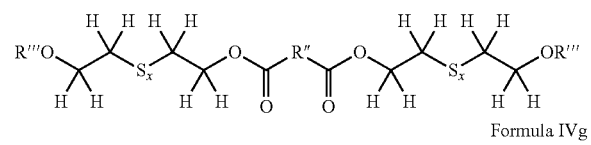

Formula IVf

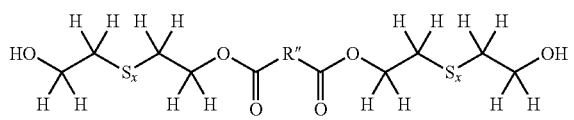

Formula IVg

Generally, R", R'", and x are independent elements of the compounds represented by Formula IVf or Formula IVg and are independently described herein. Compounds represented by Formula IVf or Formula IVg utilizing R", R'", and x can be described utilizing any combination of R" described herein, R'" described herein, and x described herein. Elements R", R'", and x have been previously described herein and these descriptions can be utilized without limitation to describe compounds represented by Formula IVf or Formula IVg. Additionally each x of Formula IVf and Formula IVg can independently be any x described herein.

In an embodiment, Component A can be a compound represented by Formula V.

Generally, each of x, m, and n are independent elements of the compound represented by Formula V and are independently described herein. Compounds represented by Formula V utilizing x, m, and n can be described utilizing any combination of x described herein, m described herein, and n described herein. Elements x, m, and n have been previously described herein and these descriptions can be utilized without limitation to describe compounds represented by Formula V. Additionally, each m and each x of Formula V can independently be any m described herein and any x described herein.

Alternatively, Component A can be a compound represented by Formula VII.

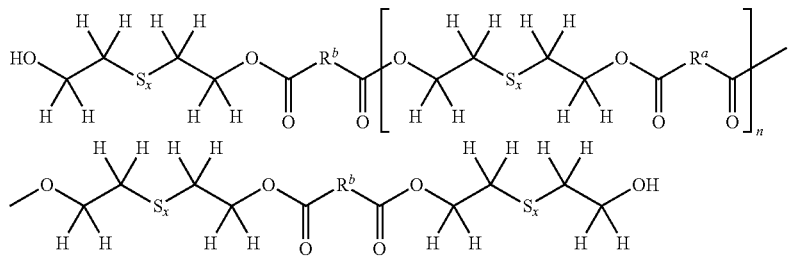

Formula VII

Generally, $R^a$, $R^b$, x, and n are independent elements of the compound represented by Formula VII and are independently described herein. Compounds represented by Formula VII utilizing $R^a$, $R^b$, x, and n can be described utilizing any combination of $R^a$ described herein, $R^b$, described herein, x described herein, and n described herein. Elements x and n have been previously described herein and these descriptions can be utilized without limitation to describe compounds represented by Formula VII. Within Formula VII each $R^a$ and $R^b$ are independently selected from any R" group described herein (e.g. a $C_1$ to $C_{60}$ organylene group). Additionally, each m and each x of Formula VII can independently be any m described herein and any x described herein. In a non-limiting example, Component A can have Formula VII where n has an average value of from 2 to 6. In a non-limiting example, Component A can have Formula VII where x has an average greater than 2; and n is greater than or equal to one. Alternatively, Component A can be a compound represented by Formula VIII.

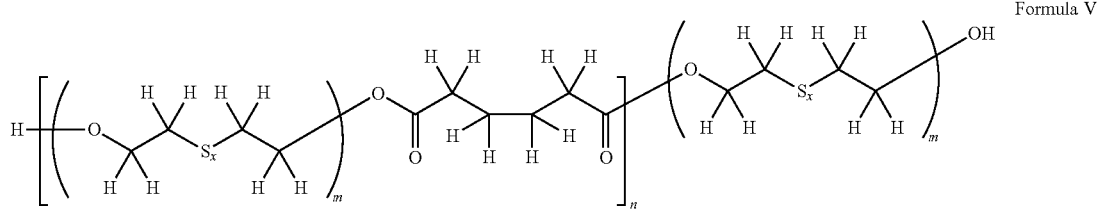

Formula V

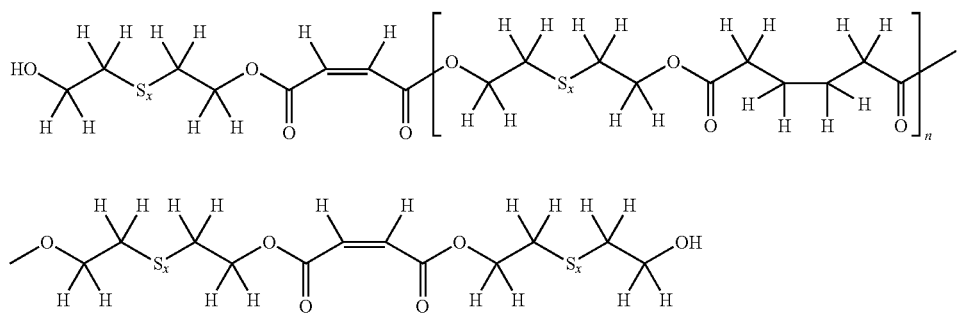

Formula VIII

Generally, x and n are independent elements of the compound represented by Formula VIII and are independently described herein. Compounds represented by Formula VIII utilizing x and n can be described utilizing any combination of x and n described herein. Additionally each x of Formula VIII can independently be any x described herein. In some nonlimiting embodiments, n can have an average of from 2 to 6.

In some non-limiting examples, Component A can have Formula IX

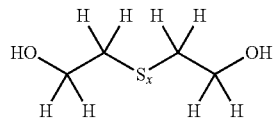

Formula IX where x is about 2.03 (Formula II where m is 1 and x is about 2.03); alternatively, Formula IX where x is about 3 (Formula II where m is 1 and x is about 3—sometimes referred to as dihydroxyethyltrisulfide or DIHETS); or alternatively, Formula IX where x is about 4 (Formula II where m is 1 and x is about 4). In other non-limiting embodiments, Component A can have the Formula II

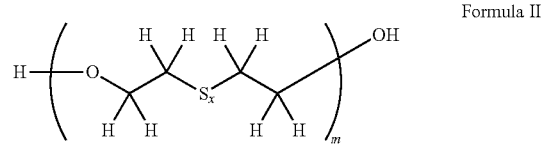

Formula II where x is has an average value of ranging from 2.03 to 2.15; or alternatively, Formula II where x has an average value of about 3. In another non-limiting embodiment, Component A can have Formula VIb

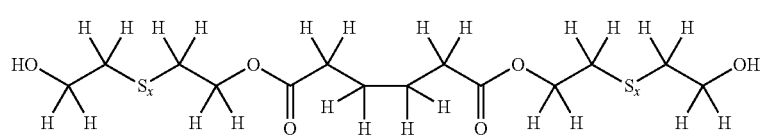

Formula VIb where x is has an average value of ranging from 2.03 to 2.15; alternatively, Formula VIb where x has an average value of about 3; or alternatively, Formula VIb where x has an average value of about 4. In another non-limiting embodiment, Component A can have Formula VIc

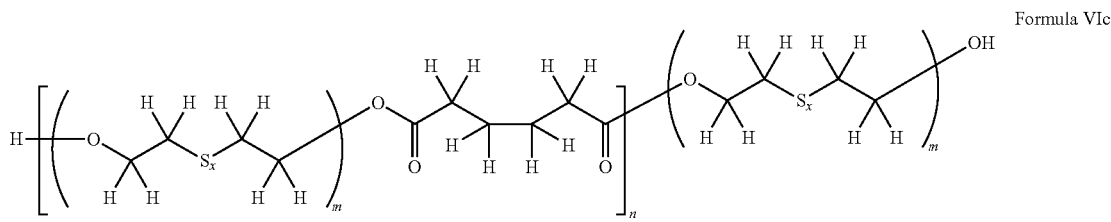

Formula VIc where m is 1, n has an average of about 6, and x has an average ranging from 2.03 to 2.15; or alternatively, where m is 1, n has an average of about 6, and x has an average ranging of about 3. In yet another non-limiting embodiment, Component A can have Formula VIII

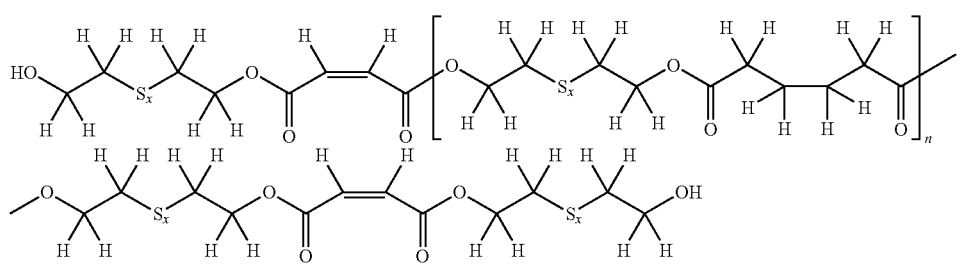

Formula VIII where n has an average of about 4, and x has an average of about 3. Other exemplary materials are readily apparent by reading this disclosure.

Materials that can be suitable for use as component A can be prepared using any suitable methodology and/or can be commercially available. Methods of preparing compounds comprising a polysulfide-containing moiety that can function as Component A are disclosed for example in U.S. Patent Publication No. 2007/0015902 entitled "Poly(thioesters), their Applications and Derivatives" which is incorporated by reference herein in its entirety.

In an embodiment, a reaction mixture for preparation of a PEF comprises a compound comprising a nucleophilic moiety, hereinafter designated Component B. In some embodiments, component B additionally comprises active hydrogen. Herein a nucleophilic moiety refers to an electron donating functional group; for example a compound which can donate an electron pair to an electrophile to form a bond. In an embodiment, Component B can comprise, consist essentially of, or consist of, an amine, a phosphine, guanidine, urea, amides, derivatives thereof, or combinations thereof; alternatively, an amine; or alternatively, a phosphine; or alternatively a guanidine, or alternatively urea; or alternatively amides. In an embodiment, the amine which can be utilized as component B can be a primary amine, a secondary amine, a tertiary amine, or combinations thereof; alternatively a primary amine; alternatively, a secondary amine; or alternatively, a tertiary amine. In some embodiments, the compound utilized as component B can comprise more than one electron donating group (which can be the same or different).

In an embodiment, Component B can comprise, consist essentially of, or consist of, a primary amine. The primary amine(s) can be any primary amine compatible with the other components of the reaction mixture and able to form a PEF of the type described herein. The primary amine can comprise a compound of the general formula

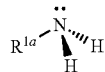

where $R^{1a}$ can be selected from the group consisting of an organyl group, and a hydrocarbyl group. In other embodiments, $R^{1a}$ can be an organyl group; or alternatively, a hydrocarbyl group. Organyl and hydrocarbyl groups have been previously described herein and can be utilized, without limitation, to further describe the primary amine which can be utilized as component B.

In an embodiment, Component B can comprise, consist essentially of, or consist of, a secondary amine. The secondary amine(s) can be any secondary amine compatible with the other components of the reaction mixture and able to form a PEF of the type described herein. The secondary amine can comprise a compound of the general formula

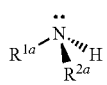

where $R^{1a}$ and $R^{2a}$ can be the same or different. In an embodiment, $R^{1a}$ and/or $R^{2a}$ can independently be an organyl group or a hydrocarbyl group; alternatively an organyl group; or alternatively, a hydrocarbyl group. Organyl and hydrocarbyl groups have been previously described herein and can be utilized to further describe the secondary amine which can be utilized as component B.

In an embodiment, Component B can comprise, consist essentially of, or consist of, a tertiary amine. The tertiary amine(s) can be any tertiary amine compatible with the other components of the reaction mixture and able to form a PEF of the type described herein. The tertiary amine can comprise a compound of the general formula

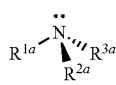

where $R^{1a}$, $R^{2a}$, and $R^{3a}$ can be the same or different. In an embodiment, $R^{1a}$, $R^{2a}$, and $R^{3a}$ can independently be an organyl group or a hydrocarbyl group; alternatively an organyl group; or alternatively, a hydrocarbyl group. Organyl and hydrocarbyl groups have been previously described herein and can be utilized to further describe the tertiary amine which can be utilized as component B.

In an embodiment, Component B comprises a phosphine. The phosphine can be any phosphine compatible with the other components of the reaction mixture and able to form a PEF of the type described herein.

In an embodiment, Component B can comprise, consist essentially of, or consist of, guanidine or a derivative thereof; alternatively guanidine; or alternatively, a guanidine derivative. Guanidines suitable for use as Component B can be represented by the general formula: $R^{61}R^{62}N)(R^{63}R^{64}N)C=N-R^{65}$. Generally, $R^{61}$, $R^{62}$, $R^{63}$, $R^{64}$ and $R^{65}$ can be the same or different. In an embodiment, $R^{61}$, $R^{62}$, $R^{63}$, $R^{64}$, and $R^{65}$ can independently be H, an organyl group, or a hydrocarbyl group; alternatively, H or an organyl group; alternatively, H or a hydrocarbyl group; alternatively, H; alternatively, a organyl group, or alternatively, an hydrocarbyl group. Organyl and hydrocarbyl groups have been previously described herein and can be utilized, without limitation, to further describe the guanidines or guanidine derivative which can be utilized as Component B. Nonlimiting examples of guanidines or guanidine derivatives suitable for use in this disclosure include arginine, triazabicyclodecene, biguanidine, saxitoxin, creatine, creatinine, s-cyanoguanidine, cycloguanidine, methylarginine, methyl nitrosoguanidine, ditolylguanidine, succinic acid, nitroguanidine, nitroarginine, or combinations thereof.

In an embodiment, Component B can comprise, consist essentially of, or consist of, urea or a derivative thereof represented by the general formula $(NHR^{71})(NH_2)CO$. Generally, $R^{71}$ can be a hydrogen, or an organyl group or a hydrocarbyl group; alternatively, H or an organyl group; alternatively, H or a hydrocarbyl group; alternatively, a hydrogen; alternatively, an organyl group; or alternatively, a hydrocarbyl group. Organyl and hydrocarbyl groups have been previously described herein and can be utilized, without limitation, to further describe the ureas which can be utilized as component B. Nonlimiting examples of urea or urea derivatives suitable for use in this disclosure include allantoin, hydantoin, xanthine, pyrimidinenes, benzoyl urea, diphenylurea, or combinations thereof.

In an embodiment, Component B can comprise, consist essentially of, or consist of, an amide. Amides suitable for use as Component B can be represented by the general formula: $R^{81}$—CO—$NR^{82}R^{83}$. Generally, $R^{82}$, $R^{83}$, $R^{84}$ can be the same or different. In an embodiment, $R^{82}$, $R^{83}$, $R^{84}$ can independently be an H, an organyl group, or a hydrocarbyl group; alternatively, H or an organyl group; alternatively, H or a hydrocarbyl group; alternatively, a hydrogen; alternatively, an organyl group; or alternatively, a hydrocarbyl group. Organyl and hydrocarbyl groups have been previously described herein and can be utilized, without limitation, to further describe the amides which can be utilized as component B.

In an embodiment, compounds having a single amino group which can be suitable for use as component B can include, but are not limited to monohydrocarbylamines, dihydrocarbylamines, trihydrocarbylamines, monoethanolamine (HO—$(CH_2)_2$—$NH_2$), derivatives of monoethanol amine, diethanolamine ((HO—$(CH_2)_2)_2$—NH), derivatives of diethanol amine, triethanolamine ((HO—$(CH_2)_2)_3$—N), δ-aminopropyl(trihydrocarboxy)silane, derivatives of a δ-aminopropyl(trihydrocarboxy)silane, or combinations thereof; alternatively, monohydrocarbylamines, dihydrocarbylamines, trihydrocarbylamines, or combinations thereof; alternatively, monoethanolamine, derivatives of monoethanol amine, diethanolamine, derivatives of diethanol amine, triethanolamine, or combinations thereof; or alternatively, δ-aminopropyl(trihydrocarboxy)silane, derivatives of a δ-aminopropyl(trihydrocarboxy)silane. In some embodiments, monoamine compounds suitable for use as component B can include but are not limited to, monohydrocarbylamines, dihydrocarbylamines, trihydrocarbylamines, monoethanolamine, diethanolamine, triethanolamine, δ-aminopropyl(trihydrocarboxy)silane, or combinations thereof; alternatively, monohydrocarbylamines; alternatively, dihydrocarbylamines; alternatively, trihydrocarbylamines; alternatively, monoethanolamine; alternatively, diethanolamine; alternatively, triethanolamine; or alternatively, δ-aminopropyl(trihydrocarboxy)silane. Hydrocarbyl groups have been described herein and can be utilized without limitation to further describe the monohydrocarbylamines, dihydrocarbylamines, and trihydrocarbylamines which can be utilized as component B. Hydrocarboxy groups have been described herein and can be utilized without limitation to further describe the δ-aminopropyl(trihydrocarboxy)silanes which can be utilized as component B. In a non-limiting embodiment, the δ-aminopropyl(trihydrocarboxy)silane which can be utilized as component B can be δ-aminopropyl(trimethoxycarboxy)silane.

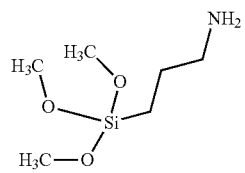

In an embodiment, compounds having a multiple amino groups which can be suitable for use as component B can include, but are not limited to, polyethylene polyamines, piperazine, a derivative of piperazine (piperazine ring substituted and/or singly or multiply N-substituted), diaminocyclohexane, a derivative of diaminocyclohexane (cyclohexane ring substituted and/or singly or multiply N-substituted), bi(cyclohexylamine), a derivative of bi(cyclohexylamine) (cyclohexyl ring substituted and/or singly or multiply N-substituted), bis(aminocyclohexyl)methane, a derivative of bis(aminocyclohexyl)methane (cyclohexyl ring substituted and/or singly or multiply N-substituted), bis(aminocycohexyl)ethane, a derivative of bis(aminocyclohexyl)ethane (cyclohexyl ring substituted and/or singly or multiply N-substituted), diaminobenzene, a derivative of diaminobenzene (benzene ring substituted and/or singly or multiply N-substituted), di(aminomethyl)benzene, a derivative of di(aminomethyl)benzene (benzene ring substituted and/or singly or multiply N-substituted), bianiline, a derivative of bianiline (benzene ring substituted and/or singly or multiply N-substituted), bis(aminophenyl)methane, a derivative of bis(aminophenyl)methane (benzene ring substituted and/or singly or multiply N-substituted), bis(aminophenyl)ethane, a derivative of bis(aminophenyl)ethane (benzene ring substituted and/or singly or multiply N-substituted), tris(aminomethyl)phenol, a derivative of tris(aminomethyl)phenol (benzene ring substituted and/or singly or multiply N-substituted), diazabicycloalkenes, or combinations thereof. In some embodiments, Component B can be piperazine or a derivative of piperazine (piperazine ring substituted and/or singly or multiply N-substituted); alternatively, diaminocyclohexane or a derivative of diaminocyclohexane (cyclohexane ring substituted and/or singly or multiply N-substituted); alternatively, bi(cyclohexylamine), a derivative of bi(cyclohexylamine) (cyclohexyl ring substituted and/or singly or multiply N-substituted), bis(aminocyclohexyl)methane, a derivative of bis(aminocyclohexyl)methane (cyclohexyl ring substituted and/or singly or multiply N-substituted), bis(aminocohexyl)ethane, or a derivative of bis(aminocyclohexyl)ethane (cyclohexyl ring substituted and/or singly or multiply N-substituted); alternatively, diaminobenzene or a derivative of diaminobenzene (benzene ring substituted and/or singly or multiply N-substituted); alternatively, di(aminomethyl)benzene or a derivative of di(aminomethyl)benzene (benzene ring substituted and/or singly or multiply N-substituted); alternatively, bianiline, a derivative of bianiline (benzene ring substituted and/or singly or multiply N-substituted), bis(aminophenyl)methane, a derivative of bis(aminophenyl)methane (benzene ring substituted and/or singly or multiply N-substituted), bis(aminophenyl)ethane, or a derivative of bis(aminophenyl)ethane (benzene ring substituted and/or singly or multiply N-substituted); or alternatively, tris(aminomethyl) phenol or a derivative of tris(aminomethyl)phenol (benzene ring substituted and/or singly or multiply N-substituted). In some embodiments, Component B can be a polyethylene polyamine; alternatively, a bi(cyclohexylamine) or a substituted bi(cyclohexylamine) (cyclohexyl ring substituted and/or singly or multiply N-substituted); alternatively, a bis(aminocyclohexyl)methane or a substituted bis(aminocyclohexyl) methane (cyclohexyl ring substituted and/or singly or multiply N-substituted); alternatively, a bis(aminocycohexyl) ethane or a substituted bis(aminocyclohexyl)ethane (cyclohexyl ring substituted and/or singly or multiply N-substituted); alternatively, a bianiline or a derivative of bianiline (benzene ring substituted and/or singly or multiply N-substituted); alternatively, bis(aminophenyl)methane or a derivative of bis(aminophenyl)methane (benzene ring substituted and/or singly or multiply N-substituted); alternatively, bis (aminophenyl)ethane or a derivative of bis(aminophenyl)ethane (benzene ring substituted and/or singly or multiply N-substituted); alternatively, tris(aminomethyl)phenol or tris (aminomethyl)phenol or a derivative of tris(aminomethyl) phenol; or alternatively, a diazabicycloalkene.

In an embodiment, representative polyethylene polyamines which can be utilized as Component B include, but are not limited to, diethylenetriamine, triethylenetetraamine, tetraethylenepentamine, pentaethylenehexamine, or a combination thereof; alternatively, diethylenetriamine; alternatively, triethylenetetraamine; alternatively, tetraethylenepentamine; alternatively, pentaethylenehexamine; or alternatively 1,4-diazabicyclo[2.2.2]octane. In an embodiment, representative examples of piperazine or a derivative of piperazine which can be utilized as Component B include, but is not limited to, piperazine, 1-(2-aminoethyl)piperazine, or combinations thereof; alternatively, piperazine; or alternatively, 2-(piperazin-1-yl)ethanamine. In an embodiment, representative examples of bi(cyclohexylamine), a derivative of bi(cyclohexylamine), bis(aminocyclohexyl)methane, a derivative of bis(aminocyclohexyl)methane, bis(aminocycohexyl)ethane, or a derivative of bis(aminocyclohexyl)ethane which can be utilized as Component B include, but are not limited to, bis(4-aminocyclohexyl)methane, bis(2-methyl-4-aminocyclohexyl)methane, bis(3-methyl-4-aminocyclohexyl)methane, or combinations thereof; alternatively, bis(4-aminocyclohexyl)methane; alternatively, bis(2-methyl-4-aminocyclohexyl)methane; or alternatively, a bis(3-methyl-4-aminocyclohexyl)methane. In an embodiment, representative examples of diaminobenzene or a derivative of diaminobenzene which can be utilized as Component B include, but are not limited to, 1,3-diamino-2,4-diethyl-6-methylbenzene, 1,3-diamino-4,6-diethyl-2-methylbenzene, 1,3-diamino-2-thiomethyl-4-diethyl-6-methylbenzene, or combinations thereof; alternatively, 1,3-diamino-2,4-diethyl-6-methylbenzene; alternatively, 1,3-diamino-4,6-diethyl-2-methylbenzene; alternatively, 1,3-diamino-2-thiomethyl-4-diethyl-6-methylbenzene. In an embodiment, representative examples of di(aminomethyl)benzene or a derivative of di(aminomethyl)benzene which can be utilized as Component B include, but are not limited to, di(aminomethyl)benzene, N,N,N',N'-tetramethyldi(aminemethyl)benzene, or combinations thereof; alternatively, di(aminomethyl)benzene; or alternatively, N,N,N',N'-tetramethyldi(aminemethyl)benzene.

In an embodiment, a representative example of a diazabicycloalkene which can be utilized as Component B is, but is not limited to, 1,8-diazabicyclo(5.4.0)undec-7-ene. In an embodiment, representative examples of tris(aminomethyl) phenol or derivatives of a tris(aminomethyl)phenol which can be utilized as Component B include, but are not limited to, 2,4,6-tri(aminemethy)phenol, N,N,N',N',N'',N''-hexamethyl-2,4,6-tri(aminemethy)phenol, or a combination thereof; alternatively, 2,4,6-tri(aminemethy)phenol; or alternatively, N,N,N',N',N'',N''-hexamethyl-2,4,6-tri(aminemethy)phenol.

Additional compounds that can provide the functionality of component B can include, polyetheramines, polyetheramines with repeating oxypropylene units in the backbone, polyfunctional polyoxypropylene-based oligomers with primary amino-groups, cardanol-based phenylalkylamines, cardanol-based phenylalkylamines derivatives, or combinations thereof. In some embodiments, Component B can be polyetheramines or polyetheramines with repeating oxypropylene units in the backbone; alternatively, polyfunctional polyoxypropylene-based oligomers with primary amino-groups; or alternatively, cardanol-based phenylalkylamines or cardanol-based phenylalkylamines derivatives.

Other non-limiting examples of commercially-available compounds that can be utilized as Component B include: ANCAMINE® 2049 curing agent produced by Air Products and Chemicals, Inc.; alternatively, JEFFAMINE® T-403 polyetheramine produced by Huntsman; alternatively, JEFFAMINE® D-230 polyetheramine produced by Huntsman; alternatively, AMICURE® PACM curing agent produced by Air Products and Chemicals, Inc.; alternatively, ANCAMINE® AEP (a cycloaliphatic amine produced by Air Products and Chemicals, Inc.; alternatively, ANCAMINE® TEPA curing agent produced by Air Products and Chemicals, Inc.; alternatively, CARDOLITE® LITE 2002 curing agent produced by Cardolite; alternatively, ANCAMINE® 1856 curing agent produced by Air Products and Chemicals, Inc.; alternatively, ANCAMINE® 2143 curing agent produced by Air Products and Chemicals, Inc.; alternatively, ANCAMINE® 2432 curing agent produced by Air Products and Chemicals, Inc.; alternatively, ETHACURE® 100 curative produced by Albermarle; alternatively, ETHACURE® 300 curative produced by Albermarle; alternatively, AMICURE® DBU-E curing agent produced by Air Products and Chemicals, Inc.; alternatively, DABCO® CRYSTALLINE catalyst produced by Air Products and Chemicals, Inc.; alternatively, DMP-30 curing accelerator produced by BRIXCHEM; or alternatively, Dynasylane AMMO.

Component B can be prepared by any suitable methodology and/or can be obtained commercially.

In an embodiment, a reaction mixture for preparation of a PEF comprises a compound comprising a moiety reactive to active hydrogen, hereinafter designated Component C. In an embodiment, the moiety reactive to active hydrogen is an epoxy group, an isocyanate group, a cyclocarbonate group, a double bond, or any combination thereof. In some embodiments, the compound comprising the moiety reactive to active hydrogen can comprise, consist essentially of, or consist of, an epoxide, an isocyanate, or a compound having a carbon-carbon double-bond; alternatively, an epoxide; alternatively, an isocyanate; or alternatively, a compound having a carbon-carbon double-bond. It is contemplated that in some embodiments, Component C comprises an isolated double bond. In an embodiment, the epoxide which can be utilized as Component C can be an aliphatic epoxide, an aromatic epoxide, or any combination thereof; alternatively, an aliphatic epoxide; or alternatively, an aromatic epoxide. In an embodiment, the isocyanate which can be utilized as Component C can be an aliphatic isocyanate, an aromatic isocyanate, or any combination thereof; alternatively, an aliphatic isocyanate; or alternatively, an aromatic isocyanate. In an embodiment, the compound having a double bond which can be utilized as Component C is selected from an α,β-unsaturated ester, an α,β-unsaturated amide, a conjugated diene group, a conjugated diene oligomer, a conjugated diene polymer, or any combination thereof. In some embodiments, Component C can be an α,β-unsaturated ester, an α,β-unsaturated amide, or any combination thereof; alternatively, a conjugated diene group, a conjugated diene oligomer, a conjugated diene polymer, or any combination thereof; alternatively, an α,β-unsaturated ester; alternatively, an α,β-unsaturated amide; alternatively, a conjugated diene group; alternatively, a conjugated diene oligomer; or alternatively, a conjugated diene polymer. The reactivity of the functional group to active hydrogen can be increased by choice of the appropriate reaction conditions. For example, Component C can comprise a compound comprising a moiety reactive to active hydrogen at elevated temperature and/or in the presence of catalyst. In addition, substances that comprise the functionality of the Component C include but are not limited to compounds that are reactive to a mercaptan or that undergo a transformation in the presence of a mercaptan group. Generally, the compounds that are reactive to a mercaptan or that undergo a transformation in the presence of a mercaptan group are the same compounds that are reactive to an active hydrogen.

In an embodiment, Component C comprises, consists essentially of, or consists of, a compound comprising an isocyanate group. In embodiments, Component C comprises, consists essentially of, or consists of, a compound having multiple isocyanate groups. In some embodiments, Component C comprises, consists essentially of, or consists of, a composition having a mixture of isocyanate molecules. When Component C comprises, consists essentially of, or consists of, a composition having a mixture of isocyanate molecules, the isocyanate molecules can have an average of at least 1.5 isocyanate groups per isocyanate molecule; alternatively, an average of at least 2 isocyanate groups per isocyanate molecule; alternatively, an average of at least 2.5 isocyanate groups per isocyanate molecule; or alternatively, an average of at least 3 isocyanate groups per isocyanate molecule. In embodiments, the isocyanate molecules can have an average of from 1.5 to 12 isocyanate groups per isocyanate molecule; alternatively, an average of from 1.5 to 9 isocyanate groups per isocyanate molecule; alternatively, an average of from 2 to 7 isocyanate groups per isocyanate molecule; alternatively, an average of from 2 to 5 isocyanate groups per isocyanate molecule; or alternatively, an average of from 2 to 4 isocyanate groups per isocyanate molecule. In embodiments, Component C can comprise, consist essentially of, or consist of, aliphatic isocyanates, cycloaliphatic isocyanates, aromatic isocyanates, as well as their dimer, trimers and homopolymers or any combination thereof. In some embodiments, Component C comprises, consists essentially of, or consists of, aliphatic isocyanates; alternatively, cycloaliphatic isocyanates; or alternatively, aromatic isocyanates.

In embodiments, the aliphatic isocyanates of Component C can comprise, consist essentially of, or consist of, ethylene diisocyanate, 1,3-trimethylene diisocyanate, 1,4-tetramethylene diisocyanate, 1,6-hexamethylene diisocyanate, 1,7-heptamethylene isocyanate, 1,8-octamethylene diisocyanate, 1,9-nonamethylene diisocyanate, 1,10-decamethylene diisocyanate, 1,11-undecamethylene diisocyanate, 1,12-dodecamethylene diisocyanate, 2,2'-dimethylpentane diisocyanate, 2,2,4-trimethyl-1,6-hexamethylene diisocyanate, 2,4,4-trimethylhexamethylene diisocyanate, 1,6,11-undecane triisocyanate, 1,3,6-hexamethylene triisocyanate, 1,8-diisocyanato-4-(isocyanatomethyl)octane, 2,5,7-trimethyl-1,8-diisocyanato-5-(isocyanatomethyl)octane, or any combination thereof. In some embodiments, the aliphatic isocyanates of the isocyanate composition can comprise, consist essentially of, or consist of, ethylene diisocyanate, 1,3-trimethylene diisocyanate, 1,4-tetramethylene diisocyanate, 1,6-hexamethylene diisocyanate, 1,12-dodecamethylene diisocyanate, 2,2,4-trimethyl-1,6-hexamethylene diisocyanate, 2,4,4-trimethylhexamethylene diisocyanate, 1,6,11-undecane triisocyanate, 1,3,6-hexamethylene triisocyanate, or any combination thereof. In other embodiments, the aliphatic isocyanates of the isocyanate composition can comprise, consist essentially of, or consist of, 1,4-tetra-methylene diisocyanate, 1,6-hexamethylene, or any combination thereof. In yet other embodiments, the aliphatic isocyanate of Component C comprises 1,6-hexa-methylene.

In embodiments, the cycloaliphatic isocyanates of Component C can comprise, consist essentially of, or consist of, 1-isocyanato-2-isocyanatomethyl cyclopentane, 1,3-cyclohexane diisocyanate, 1,4-cyclohexane diisocyanate, 2,4-methylcyclohexane diisocyanate, 2,6-methylcyclohexane diisocyanate, 1,2-dimethylcyclohexane diisocyanate, 1,4-dimethylcyclohexane diisocyanate, isophorone diisocyanate (IPDI), 1-isocyanato-1-methyl-4(3)-isocyanatomethyl cyclohexane, 1,3-bis-(isocyanato-methyl)cyclohexane, 1,4-bis(isocyanato-methyl)cyclohexane, 2,4'-dicyclohexylmethane diisocyanate, 4,4'-dicyclohexylmethane diisocyanate (hydrogenated MDI, HMDI), 2,2'-dimethyldicyclohexylmethane diisocyanate, 4,4'-bis(3-methylcyclohexyl)methane diisocyanate, or any combination thereof. In some embodiments, the cyclic aliphatic isocyanates of Component C can comprise, consist essentially of, or consist of, 1,3-cyclohexane diisocyanate, 1,4-cyclohexane diisocyanate, 2,4-methylcyclohexane diisocyanate, 2,6-methylcyclohexane diisocyanate, 1,2-dimethylcyclohexane diisocyanate, 1,4-dimethylcyclohexane diisocyanate, isophorone diisocyanate, 2,4'-dicyclohexylmethane diisocyanate, 4,4'-dicyclohexylmethane diisocyanate, or any combination thereof. In other embodiments, the cyclic aliphatic isocyanates of Component C can comprise, consist essentially of, or consist of, 1,3-cyclohexane diisocyanate; alternatively, 1,4-cyclohexane diisocyanate; alternatively, 2,4-methylcyclohexane diisocyanate; alternatively, 2,6-methylcyclohexane diisocyanate; alternatively, isophorone diisocyanate; alternatively, 2,4'-dicyclohexylmethane diisocyanate; or alternatively, 4,4'-dicyclohexylmethane diisocyanate.

In embodiments, the aromatic isocyanates of Component C can comprise, consist essentially of, or consist of, 1,3-phenylene diisocyanate, 1,4-phenylene diisocyanate, 2,4-tolylene diisocyanate (TDI), 2,5-toluene diisocyanate, 2,6-tolylene diisocyanate, tolylene-α,4-diisocyante, 1,3-xylylene diisocyanate, 1,4-xylylene diisocyanate, diethylphenylene diisocyanate, diisopropylphenylene diisocyanate, trimethylbenzene triisocyanate, α,α,α',α'-tetramethyl-1,3-xylylene diisocyanate, α,α,α',α'-tetramethyl-1,4-xylylene diisocyanate, mesitylene triisocyanate, benzene triisocyanate, 1,5-diisocyanato naphthalene, methylnaphthalene diisocyanate, bis-(isocyanatomethyl)naphthalene, biphenyl diisocyanate, 2,4'-diphenylmethane diisocyanate, 4,4'-diphenylmethane diisocyanate (MDI), polymeric 4,4'-diphenylmethane diisocyanate (polymeric MDI, PMDI), 3,3'-dimethyl-diphenylmethane-4,4'-diisocyanate, bibenzyl-4,4'-diisocyanate, bis(isocyanatophenyl)ethylene, triphenylmethane triisocyanate, bis(isocyanatoethyl)benzene, bis-(isocyanatopropyl)benzene, bis(isocyanatobutyl)benzene, naphthalene triisocyanate, diphenylmethane-2,4,4'-triisocyanate, 3-methyldiphenylmethane-4,6,4'-triisocyanate, 4-methyldiphenylmethane-3,5,2',4',6'-pentaisocyanate, tetrahydronaphthylene diisocyanate, or any combination thereof. In some embodiments, the aromatic isocyanates of Component C can comprise, consist essentially of, or consist of, 1,3-phenylene diisocyanate, 1,4-phenylene diisocyanate, 2,4-tolylene diisocyanate, 2,6-tolylene diisocyanate, 1,3-xylylene diisocyanate, 1,4-xylylene diisocyanate, trimethylbenzene triisocyanate, benzene triisocyanate, biphenyl diisocyanate, 2,4'-diphenylmethane diisocyanate, 4,4'-diphenylmethane diisocyanate, polymeric 4,4'-diphenylmethane diisocyanate, 3,3'-dimethyl-diphenylmethane-4,4'-diisocyanate, bibenzyl-4,4'-diisocyanate, triphenylmethane triisocyanate, polymeric MDI, naphthalene triisocyanate, or any combination thereof. In other embodiments, the aliphatic isocyanates of Component C comprises 1,3-phenylene diisocyanate, 1,4-phenylene diisocyanate, 2,4-tolylene diisocyanate, 2,6-tolylene diisocyanate, 1,3-xylylene diisocyanate, 1,4-xylylene diisocyanate, 2,4'-diphenylmethane diisocyanate, 4,4'-diphenylmethane diisocyanate, polymeric 4,4'-diphenylmethane diisocyanate, 3,3'-dimethyl-diphenylmethane-4,4'-diisocyanate, polymeric 4,4'-diphenylmethane diisocyanate, or any combination thereof. In yet other embodiments, the aromatic isocyanates of Component C can comprise, consist essentially of, or consist of, 2,4-tolylene diisocyanate; alternatively, 2,6-tolylene diisocyanate; alternatively, 2,4- and 2,6-tolylene diisocyanate; alternatively, 4,4'-diphenylmethane diisocyanate; alternatively, polymeric 4,4'-diphenylmethane diisocyanate; or alternatively, mixtures of 2,4'-diphenylmethane diisocyanate and 4,4'-diphenylmethane diisocyanate.

In an embodiment, Component C can comprise, consist essentially of, or consist of, a compound comprising an epoxide group. Component C can comprise, consist essentially of, or consist of, an epoxide having at least one epoxide group. In embodiments, Component C can comprise, consist essentially of, or consist of, an epoxide having at least 2 epoxide groups. In embodiments, the Component C can comprise, consist essentially of, or consist of, an epoxide having at least 3 epoxide groups. In some embodiments, Component C can comprise, consist essentially of, or consist of, a mixture of epoxide molecules. When Component C comprises, consists essentially of, or consists of, a mixture of epoxide molecules, the epoxide molecules can have an average of at least 1.5 epoxide groups per epoxide molecule; alternatively, an average of at least 2 epoxide groups per epoxide molecule; alternatively, an average of at least 2.5 epoxide groups per epoxide molecule; or alternatively, an average of at least 3 epoxide groups per epoxide molecule. In other embodiments, the epoxide molecules can have an average of from 1.5 to 16 epoxide groups per epoxide molecule; alternatively, an average of from 1.5 to 12 epoxide groups per epoxide molecule; alternatively, an average of from 1.5 to 9 epoxide groups per epoxide molecule; alternatively, an average of from 2 to 7 epoxide groups per epoxide molecule; alternatively, an average of from 2 to 5 epoxide groups per epoxide molecule; or alternatively, an average of from 2 to 4 epoxide groups per epoxide molecule.

Generally, the epoxides that can be utilized in Component C can comprise, consist essentially of, or consist of, molecules having multiple groups having structure E2:

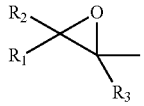

where the undesignated valency represents the remainder of the structure of the epoxide molecule. In an aspect, $R^1$, $R^2$, and $R^3$ of group E2 can independently be H or an organyl group; or alternatively, H, or a hydrocarbyl group. Organyl and hydrocarbyl group have been previously described herein and can be utilized, without limitation, to further describe $R^1$, $R^2$, and $R^3$ of the epoxide group E2 which can be present in the epoxides which can be utilized as Component C. In some particular non-limiting embodiments, $R^1$, $R^2$, and $R^3$ are H, or $R^1$ and $R^2$ are H and $R^3$ is a methyl group, or a combination thereof; alternatively, $R^1$, $R^2$, and $R^3$ are H; or alternatively, $R^1$ and $R^2$ are H and $R^3$ is a methyl group. When an epoxide molecule comprises two or more E2 groups, the additional E2 can be located within $R^1$, $R^2$, $R^3$ or the undesignated epoxide valency. In an embodiment when the epoxide molecule comprises, consists essentially of, or consists of, two or more E2 groups, $R^1$, $R^2$, and $R^3$ can be any group described herein and the additional E2 groups are located in the undesignated epoxide valency.

In an embodiment, Component C can comprise, consist essentially of, or consist of, an epoxide having at least 2 epoxide groups having structure E2. In some embodiments, Component C can comprise, consist essentially of, or consist of, an epoxide having at least 3 epoxide groups having structure E2. In some embodiments, Component C can comprise, consist essentially of, or consist of, a mixture of epoxide molecules having structure E2. When Component C comprises a mixture of epoxide molecules, the epoxide molecules can have an average of at least 1.5 epoxide groups having structure E2 per epoxide molecule; alternatively, an average of at least 2 epoxide groups having structure E2 per epoxide molecule; alternatively, an average of at least 2.5 epoxide groups having structure E2 per epoxide molecule; or alternatively, an average of at least 3 epoxide groups having structure E2 per epoxide molecule. In embodiments, the epoxide molecules can have an average of from 1.5 to 16 epoxide groups having structure E2 per epoxide molecule; alternatively, an average of from 1.5 to 12 epoxide groups having structure E2 per epoxide molecule; alternatively, an average of from 1.5 to 9 epoxide groups having structure E2 per epoxide molecule; alternatively, an average of from 2 to 7 epoxide groups having structure E2 per epoxide molecule; alternatively, an average of from 2 to 5 epoxide groups having structure E2 per epoxide molecule; or alternatively, an average of from 2 to 4 epoxide groups having structure E2 per epoxide molecule.

A class of epoxides that can be utilized in Component C can be a polyol glycidylether. Generally, the polyol glycidylether composition that can be utilized in Component C can be comprised of molecules having multiple glycidylether groups having structure E3:

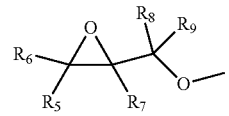

where the undesignated valency represents the remainder of the structure of the polyol glycidylether molecule. In an embodiment, $R^5$, $R^6$, $R^7$, $R^8$, and $R^9$ can independently be H or an organyl group; or alternatively, H or a hydrocarbyl group. Organyl and hydrocarbyl group have been previously described herein and can be utilized, without limitation, to further describe $R^5$, $R^6$, $R^7$, $R^8$, and $R^9$ of the group E3 which can be present in the epoxides which can be utilized as Component C. In a particular non-limiting embodiment, $R^5$, $R^6$, $R^8$, and $R^9$ are H and $R^7$ is a methyl group, $R^5$, $R^6$, $R^7$, $R^8$, and $R^9$ are H, or a combination thereof; alternatively, $R^5$, $R^6$, $R^8$, and $R^9$ are H and $R^7$ is a methyl group; or alternatively, $R^5$, $R^6$, $R^7$, $R^8$, and $R^9$ are H. In an embodiment when the epoxide molecule comprises two or more E3 groups, $R^5$, $R^6$, $R^7$, $R^8$, and $R^9$ can be any group described herein and the additional E3 group(s) are located in the undesignated epoxide valency.

In embodiments, Component C can comprise, consist essentially of, or consist of, a glycidylether molecule having at least 2 glycidylether groups having structure E3. In embodiments, the glycidylether composition can comprise, consist essentially of, or consist of, a glycidylether having at least 3 glycidylether groups having structure E3. In some embodiments, the glycidylether composition can comprise, consist essentially of, or consist of, a mixture of glycidylether molecules having structure E3. When the glycidylether composition comprises, consists essentially of, or consists of, a mixture of glycidylether molecules, the glycidylether molecules can have an average of at least 1.5 glycidylether groups having structure E3 per glycidylether molecule; alternatively, an average of at least 2 glycidylether groups having structure E3 per glycidylether molecule; alternatively, an average of at least 2.5 glycidylether groups having structure E3 per glycidylether molecule; or alternatively, an average of at least 3 glycidylether groups having structure E3 per glycidylether molecule. In embodiments, the glycidylether molecules can have an average of from 1.5 to 16 glycidylether groups having structure E3 per glycidylether molecule; alternatively, an average of from 1.5 to 12 glycidylether groups having structure E3 per glycidylether molecule; alternatively, an average of from 1.5 to 9 glycidylether groups having structure E3 per glycidylether molecule; alternatively, an average of from 2 to 7 glycidylether groups having structure E3 per glycidylether molecule; alternatively, an average of from 2 to 5 glycidylether groups having structure E3 per glycidylether molecule; or alternatively, an average of from 2 to 4 glycidylether groups having structure E3 per glycidylether molecule.

In an embodiment, the polyol glycidylether can be described as a glycidylether product of contacting a polyhydric alcohol (or polyol) with an epichlorohydrin (herein referred to as "poly glycidylether product"). While this description appears to imply that the polyol glycidylether is prepared by contacting a polyol with an epichlorohydrin, this is not the intent of the description. The intent of the description is to describe the polyol glycidylether. The polyol glycidylether product can be prepared using any suitable methodology. For example, the polyol glycidylether product can be prepared by contacting a polyol with an epihalohydrin (chloro, bromo or iodo) or by contacting a metal salt of a polyol with an epihalohydrin (chloro, bromo, or iodo) among other methods. The polyol component can be any aliphatic, cycloaliphatic, or aromatic polyol.

In some embodiments, the polyol of the polyol glycidylether product can comprise, consist essentially of, or consist of, at least 2 alcohol groups (or alternatively called hydroxy groups); alternatively, at least 3 alcohol groups; or alternatively, at least 4 alcohol groups. In some embodiments, the polyol can comprise, consist essentially of, or consist of, a mixture of alcohols having an average of at least 1.5 alcohol groups per alcohol molecule; alternatively, an average of at least 2 alcohol groups per alcohol molecule; alternatively, an average of at least 2.5 alcohol groups per alcohol molecule; alternatively, an average of at least 3 alcohol groups per alcohol molecule; alternatively, an average of from 1.5 to 16 alcohol groups per alcohol molecule; alternatively, an average of from 1.5 to 12 alcohol groups per alcohol molecule; alternatively, an average of from 1.5 to 9 alcohol groups per alcohol molecule; alternatively, an average of from 2 to 7 alcohol groups per alcohol molecule; alternatively, an average of from 2 to 5 alcohol groups per alcohol molecule; or alternatively, an average of from 2 to 4 alcohol groups per alcohol molecule.

In an aspect, the polyol of the polyol glycidylether product can be an aliphatic polyol. In some embodiments, the aliphatic polyol of the polyol glycidylether product can comprise, consist essentially of, or consist of, ethylene glycol, diethylene glycol, triethylene glycol, tetraethylene glycol, tripropylene glycol, polyethylene glycols with a molecular weight of from 106 to 8500, polyethylene glycols with a molecular weight of from 400 to 2000, 1,2-propanediol, 1,3-propanediol, 1,2-butanediol, 1,3-butanediol, 1,4-butanediol, 1,5-pentanediol, neopentyl glycol, 1,2-hexanediol, 1,6-hexanediol, 1,2-octanediol, 1,8-octanediol, 1,2-decanediol, 1,10-decanediol, glycerol, 2,2-dimethylolpropane, trimethylolethane, trimethylolpropane, pentaerythritol, dipentaerythritol, sorbitol, 1,2,4-butanetriol, 2,2,4-trimethyl-1,3-pentanediol, or combinations thereof. In some embodiments, the aliphatic polyol of the polyol glycidylether product can comprise, consist essentially of, or consist of, ethylene glycol, diethylene glycol, triethylene glycol, tetraethylene glycol; alternatively, tripropylene glycol; alternatively, ethylene glycol; alternatively, diethylene glycol; alternatively, triethylene glycol; alternatively, tetraethylene glycol; alternatively, polyethylene glycols with a molecular weight of from 106 to 8500; alternatively, polyethylene glycols with a molecular weight of from 400 to 2000; alternatively, 1,2-propanediol, 1,3-propanediol, or mixtures thereof; alternatively, 1,2-butanediol, 1,3-butanediol, 1,4-butanediol, or mixtures thereof; alternatively, 1,5-pentanediol, neopentyl glycol, or mixtures, thereof; alternatively, 1,2-hexanediol, or 1,6-hexanediol; alternatively, 1,2-octanediol, or 1,8-octanediol; alternatively, 1,2-decanediol, or 1,10-decanediol; alternatively, glycerol; alternatively, 2,2-dimethylolpropane; alternatively, trimethylolethane; alternatively, trimethylolpropane; alternatively, pentaerythritol; alternatively, dipentaerythritol; alternatively, sorbitol; alternatively, 1,2,4-butanetriol; or alternatively, 2,2,4-trimethyl-1,3-pentanediol. In other embodiments, the aliphatic polyol can comprise, consist essentially of, or consist of, an ethoxylate, a propoxylate, or a mixed ethoxylate/propoxylate of an aliphatic polyol or mixture of aliphatic polyols. In yet other embodiments, the polyol comprises a polyol ethoxylate product containing from 2 to 400 mol of ethylene oxide per mole of polyol.

In an aspect, the polyol of the polyol glycidylether product can be a cyclic aliphatic polyol. In embodiments, the cyclic aliphatic polyol of the polyol glycidylether product can comprise, consist essentially of, or consist of, 1,2-cyclopentanediol, 1,3-cyclopentanediol, 1,2-cyclohexanediol, 1,3-cyclohexanediol, 1,4-cyclohexanediol, 1,2-cyclohexanedimethanol, 1,4-cyclohexanedimethanol, bis(4-hydroxycyclohexyl)methane, 2,2-bis(4-hydroxycyclohexyl)propane, or any combination thereof. In some embodiments, the cyclic polyol of the polyol glycidylether product can comprise 1,2-cyclopentanediol, 1,3-cyclopentanediol, or mixtures thereof; alternatively, 1,2-cyclohexanediol, 1,3-cyclohexanediol, 1,4-cyclohexanediol, or mixtures thereof; alternatively, 1,2-cyclopentanediol; alternatively, 1,3-cyclopentanediol; alternatively, 1,2-cyclohexanediol; alternatively, 1,3-cyclohexanediol; alternatively, 1,4-cyclohexanediol; alternatively, 1,2-cyclohexanedimethanol; or alternatively, 1,4-cyclohexanedimethanol; or alternatively, bis(4-hydroxycyclohexyl)methane; or alternatively, 2,2-bis(4-hydroxy-cyclohexyl)propane.

In an aspect, the polyol of the polyol glycidylether product can be an aralkyl polyol. In embodiments, the aralkyl polyol of the polyol glycidylether product can comprise, consist essentially of, or consist of, 1-phenyl-1,2-ethanediol, 1,2-benzenedimethanol, 1,3-benzene-di-methanol, 1,4-benzenedimethanol, or mixtures thereof. In some embodiments, the aromatic polyol of the polyol glycidylether product can comprise, consist essentially of, or consist of, 1-phenyl-1,2-ethanediol; alternatively, 1,2-benzenedimethanol; alternatively, 1,3-benzene-di-methanol; or alternatively, 1,4-benzenedimethanol.

In an aspect, the polyol of the polyol glycidylether product can be an aromatic polyol. In embodiments, the aromatic polyol of the polyol glycidylether product can comprise, consist essentially of, or consist of, 1,2-benzenediol (pyrocatechol), 1,3-benzenediol (resorcinol), 1,4-benzenediol, methyl catechol, methyl resorcinol, 1,2,4-benzenetriol, 2-hydroxybenzylalcohol, 3-hydroxybenzylalcohol, 4-hydroxybenzylalcohol, 3,5-dihydroxybenzylalcohol, 2-(2-hydroxyphenyl)ethanol, 2-(3-hydroxy-phenyl)-ethanol, 2-(4-hydroxyphenyl)-ethanol, 2-phenyl-1,2-propanediol or mixtures thereof. In some embodiments, the aromatic polyol of the polyol glycidylether product can comprise, consist essentially of, or consist of, 1,2-benzenediol (catechol, pyrocatechol); alternatively, 1,3-benzenediol (resorcinol); alternatively, 1,4-benzenediol; alternatively, methyl catechol; alternatively, methyl resorcinol; alternatively, 1,2,4-benzenetriol; alternatively, 2-hydroxybenzylalcohol; alternatively, 3-hydroxybenzylalcohol; alternatively, 4-hydroxybenzylalcohol; alternatively, 3,5-dihydroxybenzylalcohol; alternatively, 2-(2-hydroxyphenyl)ethanol; alternatively, 2-(3-hydroxy-phenyl)ethanol; alternatively, 2-(4-hydroxyphenyl)ethanol; or alternatively, 2-phenyl-1,2-propanediol.

In an aspect, the aromatic polyol of the polyol glycidylether product can comprise, consist essentially of, or consist of, a bisphenol. In embodiments, the bisphenol can comprise, consist essentially of, or consist of, bisphenol A (2,2-di(4-hydroxy-phenyl)propane), bisphenol AP (4,4'-(1-phenyl-ethylidene)bisphenol), bisphenol F (bis(4-hydroxyphenyl)methane), bisphenol M (4,4'-(1,3-phenylidene-diisopropylidene)bisphenol), bisphenol P (4,4'-(1,4-phenylidene-diiso-propylidene)bisphenol), bisphenol S (4,4'-dihydroxydiphenylsulfone), bisphenol Z (4,4'-cyclohexylidene-bisphenol), or any combination thereof. In some embodiments, the bisphenol can comprise, consist essentially of, or consist of, bisphenol A; alternatively, bisphenol AP; alternatively, bisphenol F; alternatively, bisphenol M; alternatively, bisphenol P; alternatively, bisphenol S; or alternatively, bisphenol Z.

In an aspect, the aromatic polyol of the polyol glycidylether product can be a novolak resin. Novolak resins are a broad class of resins that are produced by the condensation reaction of a phenolic compound with an aldehyde. Novolak resins are manufactured using a wide range of phenolic compounds and aldehyde combinations and can be produced in a wide range of molecular weights. Within this specification, the term "novolak resin" generally refers to the oligomerized or polymerized product of the aldehyde and phenolic compound and does not connote any indication of the degree of oligomerization, molecular weight, and/or the physical form (e.g. solid, liquid etc. . . . ) of the novolak resin.

In an embodiment, the aldehyde used to produce the novolak resin can be formaldehyde. In embodiments, the phenolic compound used to produce the novolak resin can be any phenolic compound capable of undergoing a condensation reaction with an aldehyde. In some non-limiting embodiments, the phenolic compound can comprise, consist essentially of, or consist of, phenol, a substituted phenol, catechol (pyrocatechol), a substituted catechol, resorcinol, a substituted resorcinol, 1,4-benzenediol, a substituted 1,4-benzenediol, 1,2,4-benzenetriol, bisphenol A, Bisphenol AP, bisphenol F, bisphenol M, bisphenol P, bisphenol S, bisphenol Z, or any combination thereof. In yet other embodiments, the phenolic compound can comprise consist essentially of, or consist of, bisphenol A, Bisphenol AP, bisphenol F, bisphenol M, bisphenol P, bisphenol S, bisphenol Z, or any combination thereof; alternatively, phenol; alternatively, a substituted phenol; alternatively, catechol; alternatively, a substituted catechol; alternatively, resorcinol; alternatively, a substituted resorcinol; alternatively, 1,4-benzenediol; alternatively, a substituted 1,4-benzenediol; alternatively, 1,2,4-benzenetriol; alternatively, bisphenol A; alternatively, bisphenol AP; alternatively, bisphenol F; alternatively, bisphenol M; alternatively, bisphenol P; alternatively, bisphenol S; or alternatively, bisphenol Z.

Within the substituted phenolic compound portion of the novolak resin, the substituent(s) can be organyl group, a hydrocarbyl group, a halide atom, or any combination thereof. Organyl group, hydrocarbyl groups, and halides have been previously described herein and can be utilized, without limitation, to further describe phenolic compound portion of the novolak resin.

Generally, a particular novolak resin can be indicated by prefacing the novolak resin with the aldehyde and/or phenolic compound utilized to produce the novolak resin. Thus, in embodiments, the novolak resin of the polyol glycidylether product can comprise consist essentially of, or consist of, a formaldehyde-phenol novolak resin, a formaldehyde-substituted phenol novolak resin, a formaldehyde-catechol novolak resin, a formaldehyde-substituted catechol novolak resin, a formaldehyde-resorcinol novolak resin, a formaldehyde-substituted resorcinol novolak resin, a formaldehyde-1,4-benzenediol novolak resin, a formaldehyde-substituted 1,4-benzenediol novolak resin, a formaldehyde-1,2,4-benzenetriol novolak resin, a formaldehyde-bisphenol A novolak resin, a formaldehyde-bisphenol AP novolak resin, a formaldehyde-bisphenol F novolak resin, a formaldehyde-bisphenol M novolak resin, a formaldehyde-bisphenol P novolak resin, a formaldehyde-bisphenol S novolak resin, a formaldehyde-bisphenol Z novolak resin, or any combination thereof. In other embodiments, the novolak resin of the polyol glycidylether product can comprise, consist essentially of, or consist of, a formaldehyde-bisphenol AP novolak resin, a formaldehyde-bisphenol F novolak resin, a formaldehyde-bisphenol M novolak resin, a formaldehyde-bisphenol P novolak resin, a formaldehyde-bisphenol S novolak resin, a formaldehyde-bisphenol Z novolak resin, or any combination thereof; alternatively, a formaldehyde-phenol novolak resin; alternatively, a formaldehyde-substituted phenol novolak resin; alternatively, formaldehyde-catechol novolak resin; alternatively, a formaldehyde-substituted catechol novolak resin; alternatively, a formaldehyde-resorcinol novolak resin; alternatively, a formaldehyde-substituted resorcinol novolak resin; alternatively, a formaldehyde-1,4-benzenediol novolak resin; alternatively, a formaldehyde-substituted 1,4-benzene diol novolak resin; alternatively, a formaldehyde-1,2,4-benzenetriol novolak resin; alternatively, a formaldehyde-bisphenol A novolak resin; alternatively, a formaldehyde-bisphenol AP novolak resin; alternatively, a formaldehyde-bisphenol F novolak resin; alternatively, a formaldehyde-bisphenol M novolak resin; alternatively, a formaldehyde-bisphenol P novolak resin; alternatively, a formaldehyde-bisphenol S novolak resin; or alternatively, a formaldehyde-bisphenol Z novolak resin.

In embodiments, aliphatic polyol glycidyl ethers that can be utilized within the epoxide composition can comprise, consist essentially of, or consist of, ethylene glycol diglycidyl ether, diethylene glycol diglycidyl ether, triethylene glycol diglycidyl ether, tetraethylene glycol diglycidyl ether, tripropylene glycol diglycidyl ether, diglycidyl ethers of polyethylene glycols with a molecular weight of from 106 to 8500, diglycidyl ethers of polyethylene glycols with a molecular weight of from 400 to 2000, 1,2-propanediol diglycidyl ether, 1,3-propanediol diglycidyl ether, 1,2-butanediol diglycidyl ether, 1,3-butanediol diglycidyl ether, 1,4-butanediol diglycidyl ether, 1,5-pentanediol diglycidyl ether, neopentyl glycol diglycidyl ether, 1,2-hexanediol diglycidyl ether, 1,6-hexanediol diglycidyl ether, 1,2-cyclohexanediol diglycidyl ether, 1,4-cyclohexanediol diglycidyl ether, 1,2-octanediol diglycidyl ether, 1,8-octanediol diglycidyl ether, 1,2-decanediol diglycidyl ether, 1,10-decanediol diglycidyl ether, glycerol triglycidyl ether, 2,2-dimethylolpropane diglycidyl ether, trimethylolethane triglycidyl ether, trimethylolpropane diglycidyl ether, pentaerythritol tetraglycidyl ether, dipentaerythritol tetraglycidyl ether, dipentaerythritol hexaglycidyl ether, sorbitol tetraglycidyl ether, sorbitol hexaglycidyl ether, 1,2,4-butanetriol triglycidyl ether, 2,2,4-trimethyl-1,3-pentanediol triglycidyl ether, or any combination thereof. In some embodiments, aliphatic polyol glycidyl ethers that can be utilized within the epoxide composition can comprise, consist essentially of, or consist of, ethylene glycol diglycidyl ether, diethylene glycol diglycidyl ether, triethylene glycol diglycidyl ether, tetraethylene glycol diglycidyl ether, or any combination thereof; alternatively, tripropylene glycol diglycidyl ether; alternatively, ethylene glycol diglycidyl ether; alternatively, diethylene glycol diglycidyl ether; alternatively, triethylene glycol diglycidyl ether; alternatively, tetraethylene glycol diglycidyl ether; alternatively, diglycidyl ethers of polyethylene glycols with a molecular weight of from 106 to 8500; alternatively, diglycidyl ethers of polyethylene glycols with a molecular weight of from 400 to 2000; alternatively, 1,2-propanediol diglycidyl ether, 1,3-propanediol diglycidyl ether, or any combination thereof; alternatively, 1,2-butanediol diglycidyl ether, 1,3-butanediol diglycidyl ether, 1,4-butanediol diglycidyl ether, or mixtures thereof; alternatively, 1,5-pentanediol diglycidyl ether, neopentyl glycol diglycidyl ether, or mixtures, thereof; alternatively, 1,2-butanediol diglycidyl ether; alternatively, 1,3-butanediol diglycidyl ether; alternatively, 1,4-butanediol diglycidyl ether; alternatively, 1,2-cyclohexanediol diglycidyl ether, 1,4-cyclohexanediol diglycidyl ether, or any combination thereof; alternatively, 1,2-cyclohexanediol diglycidyl ether; alternatively, 1,4-cyclohexanediol diglycidyl ether; alternatively, 1,2-hexanediol diglycidyl ether, 1,6-hexanediol diglycidyl ether, or any combination thereof; alternatively, 1,2-hexanediol diglycidyl ether; alternatively, 1,6-hexanediol diglycidyl ether alternatively, 1,2-octanediol diglycidyl ether, 1,8-octanediol diglycidyl ether, or any combination thereof; alternatively, 1,2-octanediol diglycidyl ether; alternatively, 1,8-octanediol diglycidyl ether; alternatively, 1,2-decanediol diglycidyl ether, 1,10-decanediol diglycidyl ether, or any combination thereof; alternatively, 1,2-decanediol diglycidyl ether; alternatively, 1,10-decanediol diglycidyl ether; alternatively, glycerol triglycidyl ether; alternatively, 2,2-dimethylolpropane diglycidyl ether; alternatively, trimethylolethane triglycidyl ether; alternatively, trimethylolpropane triglycidyl ether; alternatively, pentaerythritol tetraglycidyl ether; alternatively, dipentaerythritol hexaglycidyl; alternatively, dipentaerythritol tetraglycidyl ether; alternatively, sorbitol tetraglycidyl ether; sorbitol hexaglycidyl ether; alternatively, 1,2,4-butanetriol triglycidyl ether; or alternatively, 2,2,4-trimethyl-1,3-pentanediol diglycidyl ether. In other embodiments, aliphatic polyol glycidyl ethers that can be utilized within the epoxide composition can comprise, consist essentially of, or consist of, a polyglycidyl ether of an ethoxylate, a propoxylate, or a polyglycidyl ether of a mixed ethoxylate/propoxylate of a polyol or mixture of a polyols. In yet other embodiments, aliphatic polyol glycidyl ethers that can be utilized within the epoxide composition can comprise, consist essentially of, or consist of, a polyglycidyl ether of a polyol ethoxylate product containing from 2 to 400 mol of ethylene oxide per mole of polyol.

In embodiments, cyclic polyol glycidyl ethers that can be utilized within the epoxide composition can comprise, consist essentially of, or consist of, 1,2-cyclopentanediol diglycidyl ether, 1,3-cyclopentanediol diglycidyl ether, 1,2-cyclohexanediol diglycidyl ether, 1,3-cyclohexanediol diglycidyl ether, 1,4-cyclohexanediol diglycidyl ether, 1,2-cyclohexanedimethanol diglycidyl ether, 1,4-cyclohexanedimethanol diglycidyl ether, bis(4-hydroxycyclohexyl)methane diglycidyl ether, 2,2-bis(4-hydroxy-cyclo-hexyl)-propane diglycidyl ether, or any combination thereof. In some embodiments, aliphatic polyol glycidyl ethers that can be utilized within the epoxide composition can comprise, consist essentially of, or consist of, 1,2-cyclopentanediol diglycidyl ether, 1,3-cyclopentanediol diglycidyl ether, or mixtures thereof; alternatively, 1,2-cyclohexanediol diglycidyl ether, 1,3-cyclohexanediol diglycidyl ether, 1,4-cyclohexanediol diglycidyl ether, or any combination thereof; alternatively, 1,2-cyclopentanediol diglycidyl ether; alternatively, 1,3-cyclopentanediol diglycidyl ether; alternatively, 1,2-cyclohexanediol diglycidyl ether; alternatively, 1,3-cyclohexanediol diglycidyl ether; alternatively, 1,4-cyclohexanediol diglycidyl ether; alternatively, 1,2-cyclohexanedimethanol diglycidyl ether; alternatively, 1,4-cyclohexanedimethanol diglycidyl ether; alternatively, bis(4-hydroxycyclohexyl)methane diglycidyl ether; or alternatively, 2,2-bis(4-hydroxy-cyclo-hexyl)-propane diglycidyl ether.

In embodiments, aromatic polyol glycidyl ethers that can be utilized within the epoxide composition can comprise, consist essentially of, or consist of, 1-phenyl-1,2-ethanediol diglycidyl ether, 1,2-benzenediol diglycidyl ether (pyrocatechol diglycidyl ether), 1,3-benzenediol diglycidyl ether (resorcinol diglycidyl ether), 1,4-benzenediol diglycidyl ether, methyl catechol diglycidyl ether, methyl resorcinol diglycidyl ether, 1,2,4-benzenetriol triglycidyl ether, 2-hydroxybenzylalcohol diglycidyl ether, 3-hydroxybenzylalcohol diglycidyl ether, 4-hydroxybenzylalcohol diglycidyl ether, 3,5-dihydroxybenzylalcohol diglycidyl ether, 1,2-benzenedimethanol diglycidyl ether, 1,3-benzenedimethanol diglycidyl ether, 1,4-benzene-dimethanol diglycidyl ether, 2-(2-hydroxyphenyl)ethanol diglycidyl ether, 2-(3-hydroxy-phenyl)-ethanol diglycidyl ether, 2-(4-hydroxy-phenyl)ethanol diglycidyl ether, 2-phenyl-1,2-propanediol diglycidyl ether, or any combination thereof. In embodiments, aromatic polyol glycidyl ethers that can be utilized within the epoxide composition can comprise, consist essentially of, or consist of, 1-phenyl-1,2-ethanediol diglycidyl ether; alternatively, 1,2-benzenediol diglycidyl ether; alternatively, 1,3-benzenediol diglycidyl ether; alternatively, 1,4-benzenediol diglycidyl ether; alternatively, methyl catechol diglycidyl ether; alternatively, methyl resorcinol diglycidyl ether; alternatively, 1,2,4-benzenetriol triglycidyl ether; alternatively, 2-hydroxybenzylalcohol diglycidyl ether; alternatively, 3-hydroxybenzylalcohol diglycidyl ether; alternatively, 4-hydroxybenzylalcohol diglycidyl ether; alternatively, 3,5-dihydroxybenzylalcohol diglycidyl ether; alternatively, 1,2-benzenedimethanol diglycidyl ether; alternatively, 1,3-benzenedimethanol diglycidyl ether; alternatively, 1,4-benzenedimethanol diglycidyl ether; alternatively, 2-(2-hydroxyphenyl)ethanol diglycidyl ether; alternatively, 2-(3-hydroxy-phenyl)ethanol diglycidyl ether; alternatively, 2-(4-hydroxyphenyl)ethanol diglycidyl ether; or alternatively, 2-phenyl-1,2-propanediol diglycidyl ether.

In embodiments, the glycidyl ether that can be utilized within the epoxide composition can comprise, consist essentially of, or consist of, a novolak polyglycidyl ether (a glycidylether product of a novolak resin). In embodiments, the novolak polyglycidyl ethers that can be utilized within the epoxide composition can comprise, consist essentially of, or consist of, a formaldehyde-phenol novolak polyglycidyl ether, a formaldehyde-substituted phenol novolak polyglycidyl ether, a formaldehyde-catechol novolak polyglycidyl ether, a formaldehyde-substituted catechol novolak polyglycidyl ether, a formaldehyde-resorcinol novolak polyglycidyl ether, a formaldehyde-substituted resorcinol novolak polyglycidyl ether, a formaldehyde-1,4-benzenediol novolak polyglycidyl ether, a formaldehyde-substituted 1,4-benzene diol novolak polyglycidyl ether, a formaldehyde-1,2,4-benzenetriol novolak polyglycidyl ether, a formaldehyde-bisphenol A novolak polyglycidyl ether, a formaldehyde-bisphenol AP novolak polyglycidyl ether, a formaldehyde-bisphenol F novolak polyglycidyl ether, a formaldehyde-bisphenol M novolak polyglycidyl ether, a formaldehyde-bisphenol P novolak polyglycidyl ether, a formaldehyde-bisphenol S novolak polyglycidyl ether, a formaldehyde-bisphenol Z novolak polyglycidyl ether, or any combination thereof. In other embodiments, the novolak polyglycidyl ether of the polyol glycidylether product can comprise consist essentially of, or consist of, a formaldehyde-bisphenol A novolak polyglycidyl ether, a formaldehyde-bisphenol AP novolak polyglycidyl ether, a formaldehyde-bisphenol F novolak polyglycidyl ether, a formaldehyde-bisphenol M novolak polyglycidyl ether, a formaldehyde-bisphenol P novolak polyglycidyl ether, a formaldehyde-bisphenol S novolak polyglycidyl ether, a formaldehyde-bisphenol Z novolak polyglycidyl ether, or any combination thereof; alternatively, a formaldehyde-phenol novolak polyglycidyl ether; alternatively, a formaldehyde-substituted phenol novolak polyglycidyl ether; alternatively, formaldehyde-catechol novolak polyglycidyl ether; alternatively, a formaldehyde-substituted catechol novolak polyglycidyl ether; alternatively, a formaldehyde-resorcinol novolak polyglycidyl ether; alternatively, a formaldehyde-substituted resorcinol novolak polyglycidyl ether; alternatively, a formaldehyde-1,4-benzenediol novolak polyglycidyl ether; alternatively, a formaldehyde-substituted 1,4-benzene diol novolak polyglycidyl ether; alternatively, a formaldehyde-1,2,4-benzenetriol novolak polyglycidyl ether; alternatively, a formaldehyde-bisphenol A novolak polyglycidyl ether; alternatively, a formaldehyde-bisphenol AP novolak polyglycidyl ether; alternatively, a formaldehyde-bisphenol F novolak polyglycidyl ether; alternatively, a formaldehyde-bisphenol M novolak polyglycidyl ether; alternatively, a formaldehyde-bisphenol P novolak polyglycidyl ether; alternatively, a formaldehyde-bisphenol S novolak polyglycidyl ether; or alternatively, a formaldehyde-bisphenol Z novolak polyglycidyl ether.

In an embodiment, Component C comprises a compound comprising a cyclocarbonate group Generally, Component C comprises a cyclocarbonate having at least one cyclocarbonate group. In embodiments, Component C is comprised of molecules having multiple cyclocarbonate groups. In some embodiments, Component C comprises a mixture of cyclocarbonate molecules.

In embodiments, the aliphatic cyclocarbonates of Component C comprise ethylene carbonate, trimethylene carbonate, dimethyl trimethylene carbonate, 3-ethyl-3-hydroxymethyl trimethylene carbonate, propylene carbonate, trimethylolpropane monocarbonate, 4,6-dimethyl-1,3-propylene carbonate, 2,2-dimethyl trimethylene carbonate, and 1,3-dioxepan-2-one, or combinations thereof; alternatively, ethylene carbonate; alternatively, trimethylene carbonate; alternatively, dimethyl trimethylene carbonate; alternatively, 3-ethyl-3-hydroxymethyl trimethylene carbonate; alternatively, propylene carbonate; alternatively, trimethylolpropane monocarbonate; alternatively, 4,6-dimethyl-1,3-propylene carbonate; or alternatively, 2,2-dimethyl trimethylene carbonate, and 1,3-dioxepan-2-one.

In an embodiment, Component C can comprise, consist essentially of, or consist of, a compound having a double bond selected from an α,β-unsaturated ester, an α,β-unsaturated amide a conjugated diene, a conjugated diene oligomer, a conjugated polymer, or any combination thereof. In some embodiments, Component C can comprise, consist essentially of, or consist of, an α,β-unsaturated ester, an α,β-unsaturated amide, or any combination thereof; alternatively, a conjugated diene, a conjugated diene oligomer, a conjugated diene polymer, or any combination thereof; alternatively, an α,β-unsaturated ester; alternatively, an α,β-unsaturated amide; alternatively, a conjugated diene; alternatively, a conjugated diene oligomer; or alternatively, a conjugated diene polymer.

In an embodiment, Component C can comprise, consist essentially of, or consist of, an α,β-unsaturated ester or an α,β-unsaturated amide; alternatively, an α,β-unsaturated ester; or alternatively, an α,β-unsaturated amide. In an embodiment, the α,β-unsaturated ester or an α,β-unsaturated amide can have at least one ester group or amide group attached to the carbon-carbon double bond; alternatively, at least two ester groups or amide groups attached to the carbon-carbon double bond. In some embodiments, the α,β-unsaturated ester or α,β-unsaturated amide has only one ester group or amide group attached to the carbon-carbon double bond; alternatively, has only two ester groups or amide groups attached to the carbon-carbon double bond.

When the α,β-unsaturated ester has only one ester group attached to the carbon-carbon double bond, the compound can be an acrylate. In some embodiments, the α,β-unsaturated ester compound can comprise a group having Structure A1:

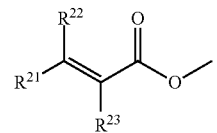

A1 where the undesignated valency represent the remainder of the Structure A1. In an aspect, $R^{21}$, $R^{22}$, and $R^{23}$ of the group A1 can be H, an organyl group, or a hydrocarbyl group; alternatively, H or an organyl group; or alternatively, H or a hydrocarbyl group. Organyl and hydrocarbyl group have been previously described herein and can be utilized, without limitation, to further describe $R^{21}$, $R^{22}$, and $R^{23}$ of the α,β-unsaturated ester comprising Structure A1 which can be present in the α,β-unsaturated ester compounds which can be utilized as Component C. In some particular non-limiting embodiments, $R^{21}$, $R^{22}$, and $R^{23}$ are H (an acrylate), $R^{21}$ and $R^{22}$ are H and $R^{23}$ is a methyl group (a methacrylate), or a combination thereof; alternatively, $R^{21}$, $R^{22}$, and $R^{23}$ are H (an acrylate); or alternatively, $R^{21}$ and $R^{22}$ are H and $R^{23}$ is a methyl group (a methacrylate). When an α,β-unsaturated ester molecule comprises two or more A1 groups, the additional A1 groups can be located within $R^{21}$, $R^{22}$, $R^{23}$, or the undesignated oxygen valency. In some particular embodiments, when the α,β-unsaturated ester molecule comprises two or more A1 groups, the additional A1 groups can be located within the undesignated oxygen valency.

In an embodiment, the α,β-unsaturated ester composition can comprise, consist essentially of, or consist of, an α,β-unsaturated ester having at least 2 α,β-unsaturated ester groups having structure A1. In some embodiments, the α,β-unsaturated ester composition can comprise, consist essentially of, or consist of, an α,β-unsaturated ester having at least 3 α,β-unsaturated ester groups having structure A1. In some embodiments, the α,β-unsaturated ester composition can comprise, consist essentially of, or consist of, a mixture of α,β-unsaturated ester molecules having structure A1. When the α,β-unsaturated ester composition comprises, consists essentially of, or consists of, a mixture of α,β-unsaturated ester molecules, the α,β-unsaturated ester molecules can have an average of at least 1.5 α,β-unsaturated ester groups having structure A1 per α,β-unsaturated ester molecule; alternatively, an average of at least 2 α,β-unsaturated ester groups having structure A1 per α,β-unsaturated ester molecule; alternatively, an average of at least 2.5 α,β-unsaturated ester groups having structure A1 per α,β-unsaturated ester molecule; or alternatively, an average of at least 3 α,β-unsaturated ester groups having structure A1 per α,β-unsaturated ester molecule. In some embodiments, the α,β-unsaturated ester molecules can have an average of from 1.5 to 12 α,β-unsaturated ester groups having structure A1 per α,β-unsaturated ester molecule; alternatively, an average of from 1.5 to 9 α,β-unsaturated ester groups having structure A1 per α,β-unsaturated ester molecule; alternatively, an average of from 2 to 7 α,β-unsaturated ester groups having structure A1 per α,β-unsaturated ester molecule; alternatively, an average of from 2 to 5 α,β-unsaturated ester groups having structure A1 per α,β-unsaturated ester molecule; or alternatively, an average of from 2 to 4 α,β-unsaturated ester groups having structure A1 per α,β-unsaturated ester molecule.

The α,β-unsaturated ester(s) comprising the α,β-unsaturated ester composition can be described as an ester of a polyhydric alcohol (or polyol) and an α,β-unsaturated carboxylic acid. While this description appears to imply that the unsaturated ester is prepared by contacting a polyol with an α,β-unsaturated carboxylic acid, one skilled in the art will recognize that the α,β-unsaturated ester can be prepared by a multitude of methods including reaction of a polyol with an α,β-unsaturated carboxylic acid, reaction of a polyol with an α,β-unsaturated carboxylic acid anhydride, transesterification of a simple α,β-unsaturated ester with a polyol, or reaction of a polyol with an α,β-unsaturated carboxylic acid halide, among other methods. Thus, the manner in which the α,β-unsaturated ester is described does not limit the method(s) by which the α,β-unsaturated ester can be produced. The polyol component can comprise, consist essentially of, or consist of, any aliphatic, cycloaliphatic, or aromatic polyol. The α,β-unsaturated portion of the α,β-unsaturated ester component can be derived from any α,β-unsaturated acid or acid derivative having the structure A1 wherein the undesignated valency can be hydrogen, —OR''' group, or a halide atom.

In an embodiment, the polyol of the α,β-unsaturated ester composition described as an ester of a polyol and an α,β-unsaturated carboxylic acid can comprise at least 2 alcohol groups; alternatively, at least 3 alcohol groups; or alternatively, at least 4 alcohol groups. In some embodiments, the polyol can comprise, consist essentially of, or consist of, a mixture of alcohols having an average of at least 1.5 alcohol groups per alcohol molecule; alternatively, an average of at least 2 alcohol groups per alcohol molecule; alternatively, an average of at least 2.5 alcohol groups per alcohol molecule; alternatively, an average of at least 3 alcohol groups per alcohol molecule; alternatively, an average of from 1.5 to 12 alcohol groups per alcohol molecule; alternatively, an average of from 1.5 to 9 alcohol groups per alcohol molecule; alternatively, an average of from 2 to 7 alcohol groups per alcohol molecule; alternatively, an average of from 2 to 5 alcohol groups per alcohol molecule; or alternatively, an average of from 2 to 4 alcohol groups per alcohol molecule.

In an embodiment, the polyol of the α,β-unsaturated ester composition described as an ester of a polyol and an α,β-unsaturated acid can comprise, consist essentially of, or consist of, ethylene glycol, diethylene glycol, triethylene glycol, tetraethylene glycol, tripropylene glycol, polyethylene glycols with a molecular weight of from 106 to 8500, polyethylene glycols with a molecular weight of from 400 to 2000, 1,2-propanediol, 1,3-propanediol, 1,2-butanediol, 1,3-butanediol, 1,4-butanediol, 1,5-pentanediol, neopentyl glycol, 1,2-hexanediol, 1,6-hexanediol, 1,2-cyclohexanediol, 1,4-cyclohexanediol, 1,2-octanediol, 1,8-octanediol, 1,2-decanediol, 1,10-decanediol, glycerol, 2,2-dimethylolpropane, trimethylolethane, trimethylolpropane, pentaerythritol, dipentaerythritol, sorbitol, 1,2,4-butanediol, 2,2,4-trimethyl-1,3-pentanediol, 1-phenyl-1,2-ethanediol, 1,2-benzenediol (pyrocatechol), 1,3-benzenediol (resorcinol), 1,4-benzenediol, methyl catechol, methyl resorcinol, 1,2,4-benzenetriol, 2-hydroxybenzylalcohol, 3-hydroxybenzylalcohol, 4-hydroxybenzylalcohol, 3,5-dihydroxybenzylalcohol, 1,2-benzenedimethanol, 1,3-benzenedimethanol, 1,4-benzenedimethanol, 2-(2-hydroxyphenyl)ethanol, 2-(3-hydroxyphenyl)ethanol, 2-(4-hydroxyphenyl)ethanol, 2-phenyl-1,2-propanediol, bisphenol A (2,2-di(4-hydroxyphenyl)propane), bisphenol F (bis(4-hydroxyphenyl)methane), bisphenol S (4,4'-dihydroxydiphenylsulfone), bisphenol Z (4,4'-cyclohexylidenebisphenol), bis(2-hydroxyphenyl)methane, or any combination thereof. In some embodiments, the polyol can comprise, consist essentially of, or consist of, an ethoxylate, propoxylate, or a mixed ethoxylate/propoxylate of a polyol or mixture of a polyols. In other embodiments, the polyol comprises a polyol ethoxylate product containing from 2 to 400 mol of ethylene oxide per mole of polyol.

In an embodiment, the α,β-unsaturated carboxylic acid of the α,β-unsaturated ester composition described as an ester of a polyol and an α,β-unsaturated carboxylic acid can comprise, consist essentially of, or consist of, acrylic acid, methacrylic acid, crotonoic acid, isocrotonoic acid, itaconic acid, 2-pentenoic acid, tiglic acid, angelic acid, citraconic acid, mesaconic acid, maleic acid, fumaric acid, or any combination thereof. In some embodiments, the α,β-unsaturated acid can comprise, consist essentially of, or consist of, acrylic acid, methacrylic acid, cotonoic acid, isorotonic acid, itoconic acid, maleic acid, or any combination thereof; alternatively, acrylic acid, methacrylic acid, or any combination thereof; alternatively, acrylic acid; alternatively; methacrylic acid; or alternatively, maleic acid. Those skilled in the art will recognize that when the α,β-unsaturated ester composition described as an ester of a polyol and an α,β-unsaturated carboxylic acid is not prepared by contacting an α,β-unsaturated acid and a polyol, the appropriate α,β-unsaturated carboxylic acid derivative of the disclosed carboxylic acids can be utilized in the preparation of the α,β-unsaturated ester;

e.g. a carboxylic acid anhydride, a simple carboxylic acid ester, or a carboxylic acid halide.

Two general classes of α,β-unsaturated esters that can be used within the α,β-unsaturated ester composition are acrylate compounds and methacrylate compounds. Thus, in embodiments, the α,β-unsaturated ester composition can comprise, consist essentially of, or consist of, an acrylate composition, a methacrylate composition, or a composition comprising acrylates and methacrylates. In some embodiments, the α,β-unsaturated ester composition can comprise, consist essentially of, or consist of, an acrylate composition; alternatively, a methacrylate composition; or alternatively, a composition comprising, consisting essentially of, or consisting of, a mixture of acrylates and methacrylates. Generally, the acrylate/methacrylate composition utilized to form a poly (β-thioether ester) of the present invention can have the same quantity of acrylate and/or methacrylate groups per acrylate/methacrylate molecule as α,β-unsaturated ester groups per α,β-unsaturated ester molecule described herein. In some embodiments, the acrylate composition can comprise, consist essentially of, or consist of, a diacrylate, a triacrylate, a tetraacrylate, or mixtures thereof. In other embodiments, the methacrylate composition can comprise, consist essentially of, or consist of, a dimethacrylate, a trimethacrylate, a tetramethacrylate, or mixtures thereof. In yet other embodiments, the composition comprising a mixture of acrylates and methacrylates can comprise a combination of at least one diacrylate, triacrylate, or tetraacrylate and at least one dimethacrylate, trimethacrylate, or tetramethacrylate.

In an embodiment, acrylates that can be utilized within the acrylate composition can comprise, consist essentially of, or consist of, ethylene glycol diacrylate, diethylene glycol diacrylate, triethylene glycol diacrylate, tetraethylene glycol diacrylate, tripropylene glycol diacrylate, 1,2-propanediol diacrylate, 1,3-propanediol diacrylate, 1,2-butanediol diacrylate, 1,3-butanediol diacrylate, 1,4-butanediol diacrylate, 1,5-pentanediol diacrylate, neopentyl glycol diacrylate, 1,2-hexanediol diacrylate, 1,6-hexanediol diacrylate, 1,2-cyclohexanediol diacrylate, 1,4-cyclohexanediol diacrylate, 1,2-octanediol diacrylate, 1,8-octanediol diacrylate, 1,2-decanediol diacrylate, 1,10-decanediol diacrylate, 2-hydroxypropyl-1,3-diacrylate, glycerol diacrylate, glycerol 1,3-diacrylate, glycerol triacrylate, 2,2-dimethylolpropane diacrylate, trimethylolethane triacrylate, trimethylolpropane triacrylate, pentaerythritol diacrylate, pentaerythritol triacrylate, pentaerythritol tetraacrylate, dipentaerythritol diacrylate, dipentaerythritol hexaacrylate, sorbitol diacrylate, sorbitol triacrylate, sorbitol tetraacrylate, sorbitol pentaacrylate, sorbitol hexaacrylate, 1,2,4-butanediol triacrylate, 2,2,4-trimethyl-1,3-pentanediol diacrylate, 1-phenylethylene-1,2-diacrylate, 1,4-benzenediol diacrylate, or any combination thereof. In some embodiments, acrylates that can be utilized within the acrylate composition can comprise, consist essentially of, or consist of, bisphenol A diacrylate (2,2-di(4-hydroxyphenyl)propane diacrylate), bisphenol F diacrylate (bis (4-hydroxyphenyl)methane diacrylate), bisphenol S diacrylate (4,4'-dihydroxydiphenylsulfone diacrylate), bisphenol Z diacrylate (4,4'-cyclohexylidenebisphenol diacrylate), bis(2-hydroxyphenyl)methane diacrylate, bisphenol A ethoxylate diacrylate, bisphenol A propoxylate diacrylate, bisphenol A glycerolate diacrylate, bisphenol A propoxylate/ethoxylate diacrylate, bisphenol A ethoxylate glycerolate diacrylate, bisphenol A propoxylate glycerolate diacrylate, bisphenol F ethoxylate diacrylate, bisphenol F propoxylate diacrylate, bisphenol F glycerolate diacrylate, bisphenol F propoxylate/ethoxylate diacrylate, bisphenol F ethoxylate glycerolate diacrylate, bisphenol F propoxylate glycerolate diacrylate, bisphenol S ethoxylate diacrylate, bisphenol S propoxylate diacrylate, bisphenol S glycerolate diacrylate, bisphenol S propoxylate/ethoxylate diacrylate, bisphenol S ethoxylate glycerolate diacrylate, bisphenol S propoxylate glycerolate diacrylate, bisphenol Z ethoxylate diacrylate, bisphenol Z propoxylate diacrylate, bisphenol Z glycerolate diacrylate, bisphenol Z propoxylate/ethoxylate diacrylate, bisphenol Z ethoxylate glycerolate diacrylate, bisphenol Z propoxylate glycerolate diacrylate, bis(2-hydroxyphenyl) methane ethoxylate diacrylate, bis(2-hydroxyphenyl)methane propoxylate diacrylate, bis(2-hydroxyphenyl)methane glycerolate diacrylate, bis(2-hydroxyphenyl)methane propoxylate/ethoxylate diacrylate, bis(2-hydroxyphenyl)methane ethoxylate glycerolate diacrylate, bis(2-hydroxyphenyl) methane propoxylate glycerolate diacrylate, or any combination thereof.

In an embodiment, the methacrylates that can be utilized within the methacrylate composition can comprise, consist essentially of, or consist of, ethylene glycol dimethacrylate, diethylene glycol dimethacrylate, triethylene glycol dimethacrylate, tetraethylene glycol dimethacrylate, tripropylene glycol dimethacrylate, 1,2-propanediol dimethacrylate, 1,3-propanediol dimethacrylate, 1,2-butanediol dimethacrylate, 1,3-butanediol dimethacrylate, 1,4-butanediol dimethacrylate, 1,5-pentanediol dimethacrylate, neopentyl glycol dimethacrylate, 1,2-hexanediol dimethacrylate, 1,6-hexanediol dimethacrylate, 1,2-cyclohexanediol dimethacrylate, 1,4-cyclohexanediol dimethacrylate, 1,2-octanediol dimethacrylate, 1,8-octanediol dimethacrylate, 1,2-decanediol dimethacrylate, 1,10-decanediol dimethacrylate, 2-hydroxypropyl-1,3-dimethacrylate, glycerol dimethacrylate, glycerol 1,3-dimethacrylate, glycerol trimethacrylate, 2,2-dimethylolpropane dimethacrylate, trimethylolethane trimethacrylate, trimethylolpropane trimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol dimethacrylate, sorbitol trimethacrylate, sorbitol tetramethacrylate, sorbitol pentamethacrylate, sorbitol hexamethacrylate, 1,2,4-butanediol trimethacrylate, 2,2,4-trimethyl-1,3-pentanediol dimethacrylate, 1-phenylethylene-1,2-dimethacrylate, 1,4-benzenediol dimethacrylate, or any combination thereof. In some embodiments, the methacrylates that can be utilized within the methacrylate composition can comprise, consist essentially of, or consist of, bisphenol A dimethacrylate (2,2-di(4-hydroxyphenyl)propane dimethacrylate), bisphenol F dimethacrylate (bis(4-hydroxyphenyl)methane dimethacrylate), bisphenol Z dimethacrylate (4,4'-cyclohexylidenebisphenol dimethacrylate), bis(2-hydroxyphenyl)methane dimethacrylate, bisphenol A ethoxylate dimethacrylate, bisphenol A propoxylate dimethacrylate, bisphenol A glycerolate dimethacrylate, bisphenol A propoxylate/ethoxylate dimethacrylate, bisphenol A ethoxylate glycerolate dimethacrylate, bisphenol A propoxylate glycerolate dimethacrylate, bisphenol F ethoxylate dimethacrylate, bisphenol F propoxylate dimethacrylate, bisphenol F glycerolate dimethacrylate, bisphenol F propoxylate/ethoxylate dimethacrylate, bisphenol F ethoxylate glycerolate dimethacrylate, bisphenol F propoxylate glycerolate dimethacrylate, bisphenol Z ethoxylate dimethacrylate, bisphenol Z propoxylate dimethacrylate, bisphenol Z glycerolate dimethacrylate, bisphenol Z propoxylate/ethoxylate dimethacrylate, bisphenol Z ethoxylate glycerolate dimethacrylate, bisphenol Z propoxylate glycerolate dimethacrylate, bis(2-hydroxyphenyl)methane ethoxylate dimethacrylate, bis(2-hydroxyphenyl)methane propoxylate dimethacrylate, bis(2-hydroxyphenyl)methane glycerolate dimethacrylate, bis(2-hydroxyphenyl)methane propoxylate/ ethoxylate dimethacrylate, bis(2-hydroxyphenyl)methane ethoxylate glycerolate dimethacrylate, bis(2-hydroxyphenyl) methane propoxylate glycerolate dimethacrylate, or any combination thereof.

When the α,β-unsaturated amide has only one ester group attached to the carbon-carbon double bond, the compound can be an acrylamide. In some embodiments, the α,β-unsaturated amide can comprise a group having Structure A2:

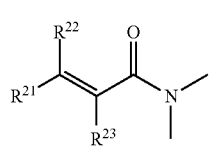

where the undesignated valencies represent the remainder of the Structure A1. In an aspect, $R^{31}$, $R^{32}$, and $R^{33}$ of the group A2 can be H, an organyl group, or a hydrocarbyl group; alternatively, H or an organyl group; or alternatively, H or a hydrocarbyl group. Organyl and hydrocarbyl group have been previously described herein and can be utilized, without limitation, to further describe $R^{31}$, $R^{32}$, and $R^{33}$ of the α,β-unsaturated amide comprising Structure A2 which can be present in the α,β-unsaturated amide compounds which can be utilized as Component C. In some particular non-limiting embodiments, $R^{31}$, $R^{32}$, and $R^{33}$ are H (an acrylamide), or $R^{31}$ and $R^{32}$ are H and $R^{33}$ is a methyl group (a methacrylamide), or a combination thereof; alternatively, $R^{31}$, $R^{32}$, and $R^{33}$ are H (an acrylamide); or alternatively, $R^{31}$ and $R^{32}$ are H and $R^{33}$ is a methyl group (a methacrylamide). When an α,β-unsaturated amide molecule comprises two or more A2 groups, the additional A2 groups can be located within $R^1$, $R^2$, $R^3$ and/or one of the undesignated nitrogen valencies. In some particular embodiments, when the α,β-unsaturated amide comprises two or more A2 groups, the additional A2 groups can be located within the undesignated nitrogen valencies.

In an embodiment, the α,β-unsaturated amide composition can comprise, consist essentially of, or consist of, an α,β-unsaturated amide having at least 2 α,β-unsaturated amide groups having structure A2. In some embodiments, the α,β-unsaturated amide composition can comprise, consist essentially of, or consist of, an α,β-unsaturated amide having at least 3 α,β-unsaturated amide groups having structure A2. In other embodiments, the α,β-unsaturated amide composition can comprise, consist essentially of, or consist of, a mixture of α,β-unsaturated amide molecules having structure A2. When the α,β-unsaturated amide composition comprises, consists essentially of, or consists of, a mixture of α,β-unsaturated amide molecules, the α,β-unsaturated amide molecules can have an average of at least 1.5 α,β-unsaturated amide groups having structure A2 per α,β-unsaturated amide molecule; alternatively, an average of at least 2 α,β-unsaturated amide groups having structure A2 per α,β-unsaturated amide molecule; alternatively, an average of at least 2.5 α,β-unsaturated amide groups having structure A2 per α,β-unsaturated amide molecule; or alternatively, an average of at least 3 α,β-unsaturated amide groups having structure A2 per α,β-unsaturated amide molecule. In yet other embodiments, the α,β-unsaturated amide molecules can have an average of from 1.5 to 12 α,β-unsaturated amide groups having structure A2 per α,β-unsaturated amide molecule; alternatively, an average of from 1.5 to 9 α,β-unsaturated amide groups having structure A2 per α,β-unsaturated amide molecule; alternatively, an average of from 2 to 7 α,β-unsaturated amide groups having structure A2 per α,β-unsaturated amide molecule; alternatively, an average of from 2 to 5 α,β-unsaturated amide groups having structure A2 per α,β-unsaturated amide molecule; or alternatively, an average of from 2 to 4 α,β-unsaturated amide groups having structure A2 per α,β-unsaturated amide molecule.

The α,β-unsaturated amide(s) comprising the α,β-unsaturated amide composition can be described as an amide of a polyamine and an α,β-unsaturated carboxylic acid. While this description appears to imply that the unsaturated amide is prepared by contacting a polyamine with an α,β-unsaturated carboxylic acid, one skilled in the art will recognize that the α,β-unsaturated amide can be prepared by a multitude of methods including reaction of a polyamine with an α,β-unsaturated carboxylic acid, reaction of a polyamine with an α,β-unsaturated carboxylic acid anhydride, reaction of a simple α,β-unsaturated carboxylic acid ester with a polyamine, or reaction of a polyamine with a α,β-unsaturated carboxylic acid halide among other methods. Thus, the manner in which the α,β-unsaturated amide is described does not limit the method(s) by which the α,β-unsaturated amide can be produced. The polyamine component can comprise, consist essentially of, or consist of, any aliphatic, cycloaliphatic, or aromatic polyamine. The α,β-unsaturated portion of the α,β-unsaturated amide component can be derived from any α,β-unsaturated carboxylic acid or acid derivative having the structure A2 wherein the undesignated valency can be hydrogen, —OR''' group, or a halide atom.

In an embodiment, the polyamine of the α,β-unsaturated amide described as an amide of a polyamine and an α,β-unsaturated acid can be derived from a polyamine can comprise at least 2 primary or secondary amine groups; alternatively, at least 3 primary or secondary amine groups; or alternatively, at least 4 primary or secondary amine groups. In embodiments, the polyamine can comprise, consist essentially of, or consist of, a mixture of amines having an average of at least 1.5 primary or secondary amine groups per amine molecule; alternatively, an average of at least 2 primary or secondary amine groups per amine molecule; alternatively, an average of at least 2.5 primary or secondary amine groups per amine molecule; alternatively, an average of at least 3 primary or secondary amine groups per amine molecule; alternatively, an average of from 1.5 to 12 primary or secondary amine groups per amine molecule; alternatively, an average of from 1.5 to 9 primary or secondary amine groups per amine molecule; alternatively, an average of from 2 to 7 primary or secondary amine groups per amine molecule; alternatively, an average of from 2 to 5 primary or secondary amine groups per amine molecule; or alternatively, an average of from 2 to 4 primary or secondary amine groups per amine molecule.

In an embodiment, the polyamine of the α,β-unsaturated amide described as an amide of a polyamine and an α,β-unsaturated carboxylic acid can comprise, consist essentially of, or consist of, methylenediamine, ethylenediamine, diethylenetriamine (N-(2-aminoethyl)-1,2-ethanediamine), triethylenetetramine (1,2-ethanediamine,N,N'-bis(2-aminoethyl), N-(2-aminoethyl)-1,3-propanediamine, N,N'-1,2-ethanediylbis-1,3-propanediamine, tetraethylene pentamine, pentaethylene hexamine, 1,2-propanediamine, 1,3-propanediamine, dipropylene triamine, tributylene tetramine, trimethylhexamethylene diamine, hexamethylene triamine, tetramethylpropylenediamine, tetrabutylenepentamine, 1,2-butanediamine, 1,3-butanediamine, 1,4-butylenediamine, 1,5-pentanediamine, 1,6-hexanediamine, 1,7-heptanediamine, octanediamine, decanediamine, dodecanediamine, 1,2-diaminocyclohexane 1,4-diaminocyclohexane, 1,3-bisaminocyclohexylamine, 4,4'-methylenebiscyclohexanamine, isophoronediamine, o-xylylenediamine, m-xylylenediamine, p-xylylenediamine, methylene diamine dianilene, diaminodiphenylmethane, bisphenylenediamine, diaminodiphenylsulfone, N-aminoethyl piperazine, or any combination thereof. In some embodiments, the polyamine can comprise polyalkylenepolyamines, polyethyleneamines, or mixtures thereof. In other embodiments, the polyamine can comprise, consist essentially of, or consist of, polyalkylenepolyamines; or alternatively, polyethyleneamines.

In an embodiment, the α,β-unsaturated acid of the α,β-unsaturated amide composition described as an amide of a polyamine and an α,β-unsaturated carboxylic acid can comprise, consist essentially of, or consist of, acrylic acid, methacrylic acid, crotonoic acid, isocrotonoic acid, itaconic acid, 2-pentenoic acid, tiglic acid, angelic acid, citraconic acid, mesaconic acid, maleic acid, fumaric acid, or mixtures thereof. In some embodiments, the α,β-unsaturated carboxylic acid can comprise, consist essentially of, or consist of, acrylic acid, methacrylic acid, cotonoic acid, isorotonic acid, itoconic acid, maleic acid, or any combination thereof; alternatively, acrylic acid, methacrylic acid, or any combination thereof; alternatively, acrylic acid; alternatively; methacrylic acid; or alternatively, maleic acid. Those skilled in the art will recognize that when the α,β-unsaturated amide composition described as an ester of a polyamine and an α,β-unsaturated carboxylic acid is not prepared by contacting an α,β-unsaturated acid and a polyamine, the appropriate α,β-unsaturated carboxylic acid derivative of the disclosed carboxylic acids can be utilized in the preparation of the α,β-unsaturated ester e.g. a carboxylic acid anhydride, a simple carboxylic acid ester, or a carboxylic acid halide.

Two general classes of α,β-unsaturated amides that can be used within the α,β-unsaturated amide composition are acrylamide compounds and methacrylamide compounds. Thus, in some embodiments, the α,β-unsaturated amide composition can be an acrylamide composition, a methacrylamide composition, or a composition comprising acrylamides and methacrylamides. In some embodiments, the α,β-unsaturated amide composition can comprise, consist essentially of, or consist of, an acrylamide composition; alternatively, a methacrylamide composition; or alternatively, composition comprising a mixture of acrylamides and methacrylamides. Generally, the acrylamide/methacrylamide composition utilized to form a poly(β-thioether ester) of the present disclosure can have the same quantity of acrylamide and/or methacrylamide groups per acrylamide/methacrylamide molecule as α,β-unsaturated amide groups per α,β-unsaturated amide molecule described herein. In some embodiments, the acrylamide composition can comprise, consist essentially of, or consist of, a diacrylamide, a triacrylamide, a tetraacrylamide, or mixtures thereof. In other embodiments, the methacrylamide composition can comprise a dimethacrylamide, a trimethacrylamide, a tetramethacrylamide, or mixtures thereof. In yet other embodiments, the composition comprising a mixture of acrylamides and methacrylamides can comprise, consist essentially of, or consist of, a combination of at least one diacrylamide, triacrylamide, or tetraacrylamide and at least one dimethacrylamide, trimethacrylamide, or tetramethacrylamide.

In an embodiment, acrylamides that can be utilized within the acrylamide composition can comprise, consist essentially of, or consist of, methane diacrylamide, ethylene diacrylamide, 1,6-hexane diacrylamide, propyl diacrylamide, 1,4-cyclohexane diacrylamide, bis(4-aminocyclohexyl)methane diacrylamide, diethylene triamine trisacrylamide, methane diacrylamide, ethane diacrylamide, triethylenetetramine diacrylamide, 1,2-propane diacrylamide, 1,3-propane diacrylamide, 1,2-butane diacrylamide, 1,3-butane diacrylamide, 1,4-butane diacrylamide, 1,5-pentane diacrylamide, 1,6-hexane diacrylamide, 1,7-heptane diacrylamide, octane diacrylamide, decane diacrylamide, dodecane diacrylamide, cyclohexane 1,2-diacrylamide, cyclohexane 1,4-diacrylamide, 1,3-bisacrylamidocyclohexane, isophorone diacrylamide, o-xylylene diacrylamide, m-xylylene diacrylamide, p-xylylene diacrylamide, methylene diacrylamide dianilene, diacrylamidodiphenylmethane, bisphenylenediacrylamide, diacrylomidodiphenylsulfone, N-acrylamidoethyl piperazine, or any combination thereof.

In an embodiment, the methacrylamides that can be utilized within the methacrylamide composition can comprise, consist essentially of, or consist of, methane dimethacrylamide, ethane dimethacrylamide, 1,6-hexane dimethacrylamide, propyl dimethacrylamide, 1,4-cyclohexane dimethacrylamide, bis(4-aminocyclohexyl)methane dimethacrylamide, diethylene triamine trismethacrylamide, methane dimethacrylamide, ethane dimethacrylamide, triethylenetetramine dimethacrylamide, 1,2-propane dimethacrylamide, 1,3-propane dimethacrylamide, 1,2-butane dimethacrylamide, 1,3-butane dimethacrylamide, 1,4-butane dimethacrylamide, 1,5-pentane dimethacrylamide, 1,6-hexane dimethacrylamide, 1,7-heptane dimethacrylamide, octane dimethacrylamide, decane dimethacrylamide, dodecane dimethacrylamide, cyclohexane 1,2-dimethacrylamide, cyclohexane 1,4-dimethacrylamide, 1,3-bismethacrylamidocyclohexane, isophorone dimethacrylamide, o-xylylene dimethacrylamide, m-xylylene dimethacrylamide, p-xylylene dimethacrylamide, methylene dimethacrylamide dianilene, dimeth-acryl-amido-diphenyl-methane, bisphenylenedimethacrylamide, dimethacrylomidodiphenylsulfone, or N-meth-acryl-amido-ethyl piperazine.

When the α,β-unsaturated ester has only two ester groups, or the α,β-unsaturated amide has only two amide groups attached to the carbon-carbon double bond, the compound can have Structure U1, U2, U3, or U4; alternatively, U1; alternatively, U2; alternatively U3; alternatively U4.

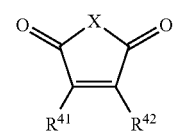

U1

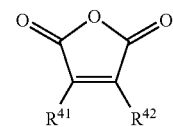

U2

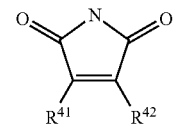

U3

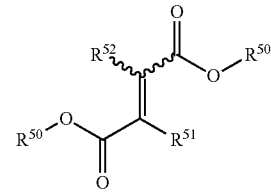

U4

In Structure U1, X, and $R^{41}$ and $R^{42}$ are independent elements of the α,β-unsaturated ester having Structure U1 and the α,β-unsaturated ester having Structure U1 can be described using any combination of X described herein and $R^{41}$ and $R^{42}$ described herein. In Structures U2 and U3, $R^{41}$ and $R^{42}$ are independent elements of the α,β-unsaturated ester and the α,β-unsaturated amide having Structure U2 or U3, respectively, and the α,β-unsaturated ester and the α,β-unsaturated amide having Structure U2 or U3, respectively, can be described using any combination $R^{41}$ and $R^{42}$ described herein. In Structure U4, $R^{50}$, $R^{51}$ and $R^{52}$ are independent elements of the α,β-unsaturated ester having Structure U4 and the α,β-unsaturated ester having Structure U4 can be described using any combination $R^{50}$, $R^{51}$ and $R^{52}$ described herein.

In an aspect, $R^{50}$ can be a hydrocarbyl group. Hydrocarbyl groups are described herein and these hydrocarbyl groups can be utilized without limitation to further describe the α,β-unsaturated ester having Structure U4. In an aspect, $R^{51}$ and $R^{52}$ can independently be H, an organyl group, or a hydrocarbyl; alternatively, H or an organyl group; alternatively, H or a hydrocarbyl; alternatively, H; alternatively, an organyl group; or alternatively, a hydrocarbyl group. Organyl group and hydrocarbyl groups are described herein and these organyl and hydrocarbyl groups can be utilized without limitation to further describe $R^{41}$, $R^{42}$, $R^{50}$, $R^{51}$ and $R^{52}$ of the compounds having Structure U1, U2, or U3 or U4. In an aspect, X can be O, N, or S; alternatively, O; alternatively, N; or alternatively, S. In some particular non-limiting embodiments, $R^{41}$ and $R^{42}$ are H. In some particular non-limiting embodiments, $R^{51}$ and $R^{52}$ are H.

In some embodiments, the α,β-unsaturated ester moiety can be incorporated into the compound having the polysulfide moiety. In such an instance, moiety U5, can replace any or all of the moieties having Structure U6 within any polysulfide compound disclosed herein. One having ordinary skill in the art will recognize that when moiety U6 is provided in a polysulfide showing repeating structures, it can appear as moiety U7.

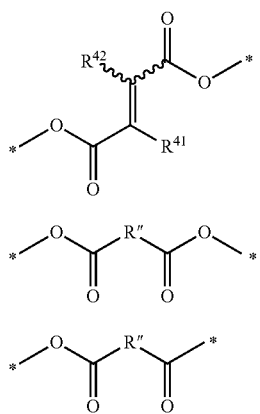

In an aspect, Component C can comprise, consist essentially of, or consist of, a compound having a conjugated diene group, a conjugated diene oligomer, a conjugated diene polymer, or any mixture thereof. In some embodiments, Component C can comprise, consist essentially of, or consist of, compound having a conjugated diene group; alternatively, a conjugated diene oligomer; or alternatively, a conjugated diene polymer. Conjugated dienes are disclosed herein and these conjugated dienes can be utilized without limitation to further describe the conjugated diene oligomer, or conjugated diene polymer which can be utilized as Component C. In some particular not limiting examples, the conjugated diene, can comprise, consist essentially of, or consist of, 1,3-butadiene, 1,2-butadiene, terpenes, isoprene, or any combination thereof; alternatively, 1,3-butadiene; alternatively, 1,2-butadiene; alternatively, terpenes, or alternatively, isoprene. In some particular non-limiting examples, Component C can comprise, consist essentially of, or consist of, 1,3-butadiene, a 1,3-butadiene oligomer, a 1,3-butadiene polymer, or any combination thereof; alternatively, 1,2-butadiene, a 1,2-butadiene oligomer, a 1,2-butadiene polymer, or any combination thereof; alternatively, isoprene, an isoprene oligomer, an isoprene polymer, or any combination thereof.

In an embodiment, Component C can comprise, consist essentially of, or consist of, a conjugated diene. In an embodiment, the conjugated diene can comprise, consist essentially of, or consist of; a $C_4$ to $C_{12}$ conjugated diene. In some embodiment, the conjugated diene can comprise, consist essentially of, or consist of, a $C_4$ to $C_{10}$ conjugated diene; alternatively, a $C_4$ to $C_{18}$ conjugated diene; alternatively, a $C_4$ to $C_6$ conjugated diene.

In an embodiment, Component C (or the conjugated diene of oligomers or polymers which can be utilized as Component C) can comprise, consist essentially of, or consist of, 1,3-butadiene, 1,2-butadiene, 1,3-pentadiene, 2-methyl-1,3-butadiene (isoprene), 1,3-hexadiene, 2,4-hexadiene, 1,3,5-hexatriene, 2,3-dimethyl-1,3-butadiene, 3-methyl-1,3-pentadiene, 1,3-heptadiene, 2,4-heptadiene, 1,3,5-heptatriene, 1,3-octadiene, 2,4-octadiene, 3,5-octadiene, 1,3,5-octatriene, 2,4,6-octatriene, 1,3,5,7-octatetriene, 1,3-nonadiene, 2,4-nonadiene, 3,5-nonadiene, 1,3,5-nonatriene, 2,4,6-nonatriene, 1,3,5,7-nonatetraene-1,3-decadiene, 2,4-decadiene, 3,5-decadiene, 4,6-decadiene, 1,3,5-decatriene, 2,4,6-decatriene, 3,5,7-decatriene, 1,3,5,7-decatetraene, 2,4,6,8-decatetraene, 1,3,5,7,9-decapentaene, geraniol, limonene, terpineol, farnesenes, farnesol, cafestol, kahweol, cembrene, taxadiene, retinol, retinal, phytol, or any combinations thereof. In some particular non-limiting examples, suitable conjugated dienes for use as Component C (or the conjugated diene of oligomers or polymers which can be utilized as Component C) can comprise, consist essentially of, or consist of, 1,3-butadiene, 1,2-butadiene, 2-methyl-1,3-butadiene (isoprene), or any combination thereof; alternatively, 1,3-butadiene, 2-methyl-1,3-butadiene (isoprene), or any combination thereof; alternatively, 1,3-butadiene; alternatively, 1,2-butadiene; alternatively, 2-methyl-1,3-butadiene (isoprene); alternatively, geraniol, limonene, terpineol, farnesenes, farnesol, cafestol, kahweol, cembrene, taxadiene, retinol, retinal, phytol, or any combination thereof; alternatively, geraniol; alternatively, limonene; alternatively, terpineol; alternatively, farnesenes; alternatively, farnesol; alternatively, cafestol; alternatively, kahweol; alternatively, cembrene; alternatively, taxadiene; alternatively, retinol; alternatively, retinal; or alternatively, phytol. Commercially available compounds that can provide the functionality of the component C include, can comprise, consist essentially of, or consist of, CR-504 produced by Sartomer, a derivative of CR-504, POLYOIL 130 polybutadiene produced by Evonik Degussa Industries, a derivative of POLYOIL 130, POLY BD® R45HTLO resin produced by Sartomer, a derivative of POLY BD R45HTLO, or any combination thereof.

In an embodiment, the relative amounts of Components in the PEF can be adjusted to meet some user and/or process desired need. As such it is contemplated that any amount of the components can be combined to form a PEF of the type described herein. Component B to Component C can be 1:3 to 3:1; alternatively 1:2 to 2:1; or alternatively, about 1:1.

In an embodiment, two of the three functionalities or moieties provided by the components described previously herein can reside on a single molecule or compound. Hereinafter a single molecule/compound comprising Component A and Component C, alternatively Component B and Component C is designated Component X. In an embodiment, a reaction mixture comprises Component X and a third material which provides the functionality not present in Component X but described previously herein.

Nonlimiting examples of compounds that are suitable for use as Component X include

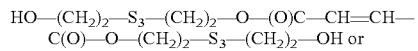

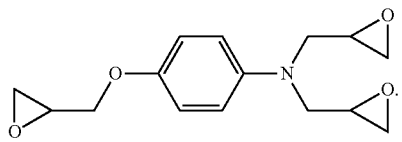 [SMILES: c1cc(N(CC2CO2)CC2CO2)ccc1OCC1CO1]

In an embodiment, Component X can be present in the reaction mixture for preparation of a PEF in an amount that provides quantities of its constituent components (i.e., A and C, A and B, or B and C) suitable to meet some user and/or process desired need.

In an embodiment, the components disclosed herein (e.g., Component A, Component B, Component C, Component X) can be contacted under conditions suitable for formation of a PEF of the type disclosed herein. It is to be understood that the individual components of the PEF can be in any state (e.g., liquid) and the resulting PEF can be in any state. In an embodiment, a PEF of the type described herein can form a solid. In some embodiments, the PEF can be cured. In other embodiments, the PEF can be subjected to additional conditions (e.g., heat, pressure) to facilitate the curing of the material. In an embodiment, the PEF is used without further processing; alternatively the PEF can be subjected to additional processing such as curing.

It should be noted that, though some forms of the Component B can be reactive with some forms of the Component C when Component A is absent, the addition of the Component A changes the characteristics of the of reactions between the other two components, as well as changes the properties of the products of these reactions.

In an embodiment, a PEF of the type described herein can be used to create plastics, composites, adhesives, sealants, caulks, coatings and other polymeric materials with enhanced properties.

In an embodiment, a PEF of the type described herein can be contacted with one or more materials to form an enhanced polymer composition (EPC). Nonlimiting examples of materials suitable for contacting with the PEF include glass and carbon fiber, polyalphaolefins, polyaryletherketones, polybutenes, nylons or polyamides, polycarbonates, thermoplastic polyesters (e.g polybutylene terephthalate and polyethylene terephthalate), polyphenylene sulphide, polyvinyl chloride, styrenic copolymers (e.g. acrylonitrile butadiene styrene, styrene acrylonitrile and acrylonitrile styrene acrylate), polypropylene, thermoplastic elastomers, aromatic polyamides, cellulosics, ethylene vinyl acetate, fluoroplastics, polyacetals, polyethylenes (e.g. high-density polyethylene, low-density polyethylene, and linear low-density polyethylene)polymethylpentene, polyphenylene oxide, polystyrene (e.g. general purpose polystyrene and high impact polystyrene), or any combination thereof. The PEF and other materials can be contacted using any suitable methodology and under any suitable conditions for preparation of an EPC of the type described herein. Without wishing to be limited by theory the resulting EPC can be described as a composite formed by contacting of the PEF with materials of the type described herein.

In an embodiment, an EPC of the type described herein displays improved physical and/or tensile properties when compared to an otherwise similar composition lacking a PEF. For example, an EPC of the type described herein can display an improved chemical resistance, improved modulus of elasticity (Young's modulus), tensile strength, and/or elongation at break.

In an embodiment, the EPC displays an improved chemical resistance when compared to an otherwise similar composition lacking a PEF. Herein chemical resistance refers to the ability of the material to resist degradation when exposed to a degradative agent. Chemical resistance is measured herein as the percentage weight gain (or uptake of the degradative agent) of a polymeric material over time when exposed to a degradative agent. In an embodiment, the degradative agent comprises water, acids, bases, organic solvents, or combinations thereof.

In an embodiment, an EPC of the type disclosed herein has a Young's modulus that differs from a composition lacking a PEF by greater than about 1%; alternatively, greater than about 5%; alternatively, greater than about 10%; alternatively, greater than about 15%; alternatively, greater than about 20%; alternatively, greater than about 25%; alternatively, greater than about 30%; alternatively, greater than about 35%; alternatively, greater than about 40%; alternatively, greater than about 45%; or alternatively, greater than about 50%. Young's modulus is a measure of the stiffness of a material and is defined as the ratio of the rate of change of stress with strain. Young's modulus can be determined experimentally from the slope of a stress-strain curve created during tensile tests conducted on a sample of a material, as determined in accordance with ASTM D882.

In an embodiment, the EPC has a tensile strength that differs from a composition lacking a PEF by greater than about 1%, alternatively, greater than about 5%; alternatively, greater than about 10%; alternatively, greater than about 20%; alternatively, greater than about 30%; alternatively, greater than about 40%; alternatively, greater than about 50%; alternatively, greater than about 60%; alternatively, greater than about 70%; alternatively, greater than about 80%; alternatively, greater than about 90%; alternatively, greater than about 100%; alternatively, greater than about 125%; alternatively, greater than about 150%; alternatively, greater than about 175%; alternatively, greater than about 200%; alternatively, greater than about 225%; alternatively, greater than about 250%; alternatively, greater than about 275%; or alternatively, greater than about 300%. Herein the tensile strength refers to the resistance of a material to longitudinal stress (tension) and can be determined in accordance with ASTM D882.

In an embodiment, the EPC can exhibit an elongation at break that differs from a composition lacking a PEF by greater than about 1%; alternatively, greater than about 5%; alternatively, greater than about 10%; alternatively, greater than about 20%; alternatively, greater than about 30%; alternatively, greater than about 40%; alternatively, greater than about 50%; alternatively, greater than about 60%; alternatively, greater than about 70%; alternatively, greater than about 80%; alternatively, greater than about 90%; alternatively, greater than about 100%; alternatively, greater than about 125%; alternatively, greater than about 150%; alternatively, greater than about 175%; alternatively, greater than about 200%; alternatively, greater than about 225%; alternatively, greater than about 250%; alternatively, greater than about 275%; or alternatively, greater than about 300%. The elongation at break refers to the elongation which corresponds to the tensile breaking strength and can be determined in accordance with ASTM E2092.

It is to be understood that an EPC of the type described herein can have alterations in any number of physical and/or mechanical properties which are not limited to those disclosed herein. Such alterations can beneficially impact the ability of the material for use in a particular application. In an embodiment, the EPC displays alterations in Young's modulus within the disclosed ranges; alternatively the EPC displays alterations in tensile strength within the disclosed ranges; alternatively the EPC displays alterations in elongation at break within the disclosed ranges. In an embodiment, an EPC can display alterations in at least two properties selected from the group consisting of Young's modulus, tensile strength and elongation at break wherein the properties are altered within the disclosed ranges. In an embodiment, an EPC of the type described herein displays alterations in Young's modulus, tensile strength and elongation at break within the disclosed ranges. Further it is contemplated that the PEFs disclosed herein can be formulated so as to provide one or more user desired improvements to a material (e.g., polymer).

EXAMPLES

Example 1

PEFs of the type described herein were prepared by contacting a bis-phenol A-based epoxy resin ARALDITE® GY 6010 unmodified liquid epoxy resin commercially available from Huntsman Corp., ANCAMINE® 2049 curing agent in a 1:1 epoxy group/amine hydrogen equivalent ratio, i.e. 32 mass parts of ANCAMINE® 2049 curing agent per 100 mass parts of ARALDITE® GY 6010 unmodified liquid epoxy resin (32 PHR of ANCAMINE® 2049 curing agent. and one of the following polysulfide containing compounds: di(hydroxyethyl)disulfide industrial (DiHEDS-2.03, produced by Chevron Phillips Chemicals LP) with the chemical formula:

$$HO—(CH_2)_2—S_{2.03}—(CH_2)_2—OH$$

di(hydroxyethyl)polysulfides (DiHEPS-3, produced by Chevron Phillips Chemicals LP) with the chemical formula:

$$HO—(CH_2)_2—S_3—(CH_2)_2—OH$$

di(hydroxyethyl)polysulfides (DiHEPS-4, produced by Chevron Phillips Chemicals LP) with the chemical formula:

$$HO—(CH_2)_2—S_4—(CH_2)_2—OH$$

dimers of DiHEDS-2.03 with the chemical formula:

$$HO—(CH_2)_2—S_{2.03}—(CH_2)_2—O—(CH_2)_2—S_{2.03}—(CH_2)_2—OH$$

dimers of DiHEDS-3 with the chemical formula:

$$HO—(CH_2)_2—S_3—(CH_2)_2—O—(CH_2)_2—S_3—(CH_2)_2—OH$$

esters of DiHEDS-2.03 and adipic acid (DiHEDS-2.03—adipic acid ester 8-16-2.03) with the chemical formula:

$$HO—(CH_2)_2—S_{2.03}—(CH_2)_2—O—C(O)—(CH_2)_4—C(O)—O—(CH_2)_2—S_{2.03}—(CH_2)_2—OH$$

esters of DiHEPS-3 and adipic acid (DiHEDS-3—adipic acid ester 8-16-3) with the chemical formula:

$$HO—(CH_2)_2—S_3—(CH_2)_2—O—C(O)—(CH_2)_4—C(O)—O—(CH_2)_2—S_3—(CH_2)_2—OH$$

esters of DiHEPS-4 and adipic acid (DiHEDS-4—adipic acid ester 8-16-4) with the chemical formula:

$$HO—(CH_2)_2—S_4—(CH_2)_2—O—C(O)—(CH_2)_4—C(O)—O—(CH_2)_2—S_4—(CH_2)_2—OH$$

esters of DiHEDS-2.03 and adipic acid (DiHEDS-2.03—adipic acid ester 8-33-2.03) with the chemical formula:

$$HO—((CH_2)_2—S_{2.03}—(CH_2)_2—O—C(O)—(CH_2)_4—C(O)—O)_6—(CH_2)_2—S_{2.03}—(CH_2)_2—OH$$

esters of DiHEPS-3 and adipic acid (DiHEDS-3—adipic acid ester 8-33-3) with the chemical formula:

$$HO—((CH_2)_2—S_3—(CH_2)_2—O—C(O)—(CH_2)_4—C(O)—O)_6—(CH_2)_2—S_3—(CH_2)_2—OH,$$

Comparative samples were prepared which contained 32% by mass of the following materials: diethylene glycol (DEG) with the chemical formula:

$$HO—(CH_2)_2—O—(CH_2)_2—OH;$$

dibutyl disulfide (DBDS-2) with the chemical formula:

$$CH_3—(CH_2)_3—S_2—(CH_2)_3—CH_3;$$

dibutyl trisulfide (DBTS-3) with the chemical formula:

$$CH_3—(CH_2)_3—S_3—(CH_2)_3—CH_3;$$

di(hydroxypropyl)disulfide (DiHPDS-2) with the chemical formula:

$$HO—(CH_2)_3—S_2—(CH_2)_3—OH;$$

di(hydroxypropyl)trisulfide (DiHPTS-3) with the chemical formula:

$$HO—(CH_2)_3—S_3—(CH_2)_3—OH;$$

di(hydroxyethyl)monosulfide (DiHEMS-1) with the chemical formula:

$$HO—(CH_2)_2—S—(CH_2)_2—OH;$$

di(hydroxyethyl)disulfide pure (DiHEDS-2) with the chemical formula:

$$HO—(CH_2)_2—S_2—(CH_2)_2—OH.$$

The formulations were cast in dogbone-shaped molds (as per ASTM D-638). Specimens were cured for 24 hours at room temperature, post-cured for 2 hours at 80° C. and tested on a tensile tester according to the ASTM D-638. The results of the tensile testing (Modulus of Elasticity, Tensile Strength and Elongation at Break) are shown in Table 1.

TABLE 1

| SAMPLE | Modulus of Elasticity (psi) | Tensile Strength (psi) | Elongation at Break |
|---|---|---|---|
| None | 494,000 | 6,909 | 1.61% |
| DEG | 354,000 | 6,470 | 6.31% |
| DiHEMS-1 | 380,000 | 8,082 | 4.87% |
| DBDS(2) | 369,000 | 6,981 | 4.21% |
| DiHPDS-2 | 359,000 | 8,152 | 4.62% |
| DiHEDS-2, pure | 360,000 | 7,783 | 5.28% |
| DiHEDS-2.03, industr. | 438,000 | 8,951 | 6.01% |
| DiHEDS-2.03, Dimer | 521,000 | 11,468 | 5.44% |
| DiHEDS-2.03-adipic acid ester 8-16-2.03 | 390,000 | 9,348 | 4.44% |
| DiHEDS-2.03-adipic acid ester 8-33-2.03 | 500,000 | 10,778 | 3.64% |
| DiHEPS-3 | 528,000 | 9,967 | 4.44% |
| DBTS(3) | 338,000 | 6,596 | 2.62% |
| DiHPTS-3 | 375,000 | 8,787 | 7.25% |

TABLE 1-continued

| SAMPLE | Modulus of Elasticity (psi) | Tensile Strength (psi) | Elongation at Break |
|---|---|---|---|
| DiHEDS-3-adipic acid ester 8-16-3 | 514,000 | 12,321 | 4.35% |
| DiHEDS-3-adipic acid ester 8-33-3 | 542,000 | 12,272 | 3.89% |
| DiHEPS-3 Dimer | 576,000 | 12,788 | 4.22% |
| DiHEPS-4-) | 559,000 | 10,405 | 5.18% |
| DiHEDS-4-adipic acid ester 8-16-4 | 553,000 | 11,626 | 3.91% |

The results of these tests demonstrate that the samples without a PEF of the type disclosed herein display characteristics attributable to the inclusion of diluents and/or plasticizers. In contrast, samples containing PEFs of the type described herein display improvements in tensile properties. It should also be noted that the presence of the PEF's accelerated the curing times by about 20-30%, as compared to the same formulations that either did not contain any additives, or that lacked a PEF.

Further, the results demonstrate an interaction between a reactive bi-functional amine (2,2'-Dimethyl-4,4'-methylenebis(cyclohexylamine)) as a representative of the component B, bis-phenol A-based epoxy resin as a representative of the component C, and various products with and without a polysulfide-containing compound. The results indicate that the addition of substances with moieties that comprise a polysulfide-containing compound of the type described herein (i.e., Component A) result in formulations of matter with enhanced physical and/or chemical properties that may not be explained by the effects of dilution and/or plasticizing.

The samples were used to prepare specimens that were tested for resistance to chemical absorption in a variety of solvents. Samples were tested for weight gain after submersion in water, 10% sodium hydroxide (NaOH), 30% sulfuric acid ($H_2SO_4$), 5% acetic acid ($CH_3COOH$), methanol ($CH_3OH$) and toluene ($C_7H_8$) for the indicated time periods. The results of these tests are shown at Table 2.

TABLE 2

| | One Month In | | | | One Week in | |
|---|---|---|---|---|---|---|
| Sample | Water | 10% NaOH | 30% Sulfuric Acid | 5% Acetic Acid | Methanol | Toluene |
| None | 1.26% | 0.94% | 1.74% | 1.33% | 1.84% | 0.16% |
| DEG | 4.68% | 2.76% | 20.99% | 8.96% | Destroyed | 5.84% |
| DiHEMS-1 | 2.72% | 1.62% | 16.87% | 8.96% | Destroyed | 1.93% |
| DiHEDS-2.03, industr. | 2.00% | 1.51% | 6.23% | 5.09% | 11.97% | 0.77% |
| DiHEDS-2.03-adipic acid ester 8-33-2.03 | 1.22% | 0.92% | 2.01% | 2.88% | 9.89% | 5.03% |
| DiHEDS-2.03 Dimer | 1.11% | 1.00% | 2.17% | 2.78% | 12.23% | 1.00% |
| DiHEPS-3 | 1.49% | 1.20% | 3.95% | 3.94% | 11.71% | 0.89% |
| DiHEPS-3 Dimer | 0.47% | 0.75% | 3.58% | 2.10% | 9.23% | 0.76% |
| DiHEDS-3-adipic acid ester 8-16-3 | 0.57% | 0.47% | 0.54% | 1.75% | 8.64% | 2.24% |
| DiHEDS-3-adipic acid ester 8-33-3 | 0.73% | 0.48% | 1.47% | 1.47% | 8.04% | 1.50% |
| DiHEDS-4-adipic acid ester 8-16-4 | 0.69% | 0.80% | 1.28% | 1.82% | 9.33% | 3.18% |
| DiHEPS-4 | 1.36% | 0.98% | 2.79% | 3.14% | 13.17% | 0.45% |

The data indicate that the samples without (or with less than about 5% of) of a polysulfide containing compound experienced greater weight-gain in these media (e.g. reduced resistance to absorption or uptake of the solvent) in comparison with formulations containing the PEFs of the present disclosure.

Example 2

A PEF comprising 8-16-3, dibutylamine (DBA—a monofunctional secondary amine), and ARALDITE® GY 6010 unmodified liquid epoxy resin was prepared. Specifically, 17.6 grams of ARALDITE GY® 6010 unmodified liquid epoxy resin were mixed 6 grams of DBA. This mixture was split in two halves, and placed in two aluminum weighing dishes. Next, 3.8 grams of DiHEDS-3—adipic acid ester 8-16-3 were added to one of the dishes and thoroughly mixed. Both dishes were placed in a 60° C. oven. After one hour in the oven the sample without DiHEDS-3-adipic acid ester 8-16-3 remained a clear liquid, while the sample with DiHEDS-3—adipic acid ester 8-16-3 became a hard, solid, amber-colored polymeric material. The results demonstrate a reaction product (i.e., a PEF) that differs visually from the starting reagents is formed by contacting components of the type previously described herein under the aforementioned conditions.

Example 3

A reaction mixture comprising DiHEDS-3—adipic acid ester 8-16-3, dimethybenzylamine (DMBA—a monofunctional tertiary amine), and ARALDITE® GY 6010 unmodified liquid epoxy resin was prepared. Specifically, 7.6 grams of ARALDITE® GY 6010 unmodified liquid epoxy resin were mixed 0.24 grams of DMBA. This mixture was split in two halves, and placed in two aluminum weighing dishes. Next, 4.9 grams of DiHEDS-3—adipic acid ester 8-16-3 were added to one of the dishes and thoroughly mixed. Both dishes were placed in a 60° C. oven. After one hour in the oven the sample without 8-16-3 remained clear liquid, while the sample with DiHEDS-3—adipic acid ester 8-16-3 became hard, solid, amber-colored polymeric material. The results demonstrate a reaction product (i.e., a PEF) that differs visually from the starting reagents is formed by contacting components of the type previously described herein under the aforementioned conditions.

Example 4

Reaction mixtures comprising DIHEDS-3 or product 8-16-3, ETHACURE® 300 curing agent, and ARALDITE® GY 6010 unmodified liquid epoxy resin were prepared. Specifically, 15 grams of ARALDITE GY 6010 were mixed with 6 grams of ETHACURE® 300 curing agent. This mixture was split in three, and the parts were placed in three aluminum weighing dishes. Next, 5 grams of DiHEDS-3—adipic acid ester 8-16-3 were added to one of the dishes and 5 grams of DiHEPS-3 were added to another. The content of the dishes was thoroughly mixed and the dishes were placed in 140° C. oven for one hour. The contents of the samples containing DiHEDS-3-adipic acid ester 8-16-3 and DiHEDS-3 became solid, while samples without the polysulfide-containing materials remained liquid. The results demonstrate a reaction product (i.e., a PEF) that differs visually from the starting reagents is formed by contacting components of the type previously described herein under the aforementioned conditions.

Example 5

Reaction mixtures comprising either DiHEPS-3 or product DiHEDS-3—adipic acid ester 8-16-3, ANCAMINE® TEPA curing agent and diglycidyl ether of 1,4-buthanediol (HELOXY™ Modifier 67, produced by Hexion were prepared. Specifically, 12.5 grams of HELOXY™ Modifier 67 were mixed with 3.1 grams of ANCAMINE® 2049 TEPA curing agent. This mixture was split in three, and placed in three aluminum weight dishes. 1.5 grams of DiHEDS-3—adipic acid ester 8-16-3 were added to one of the dishes and 1.5 grams of DiHEPS-3 were added to another. The content of dishes was thoroughly mixed and left at the room temperature. The samples with DiHEDS-3 solidified after 2.5 hours, the samples with DiHEDS-3—adipic acid ester 8-16-3 solidified after 3 hours, while samples without polysulfide-containing compounds remained liquid after 6 hours. The results demonstrate a reaction product (i.e., a PEF) that differs visually from the starting reagents is formed by contacting components of the type previously described herein under the aforementioned conditions.

Example 6

Reaction mixtures comprising either DiHEPS-3 or product DiHEDS-3—adipic acid ester 8-16-3, Dynasilane AMMO, and ARALDITE® GY 6010 unmodified liquid epoxy resin were prepared. Specifically, 15.2 grams of ARALDITE® GY 6010 unmodified liquid epoxy resin were mixed with 3.48 grams of Dynasilane AMMO. This mixture was split in two parts, which were placed in two aluminum weighing dishes. Next, 4.9 grams of DiHEDS-3—adipic acid ester 8-16-3 were added to one of the dishes and thoroughly mixed and both dishes placed in an oven at 80° C. for 30 min. The sample containing DiHEDS-3—adipic acid ester 8-16-3 was transformed into a solid elastic material, while the sample without any of the polysulfide-containing compound remained liquid. The results demonstrate a reaction product (i.e., a PEF) that differs visually from the starting reagents is formed by contacting components of the type previously described herein under the aforementioned conditions.

Example 7

Reaction mixtures comprising dihydroxyethylpolysulfides (DiHEPS-2.03, or industrial DiHEDS), DiHEPS-3, or product DiHEDS-3—adipic acid ester 8-16-3); AMICURE® DBU-E curing agent, and ARALDITE® GY 6010 unmodified liquid epoxy resin was prepared. Specifically, 10 grams of ARALDITE® GY 6010 unmodified liquid epoxy resin were mixed with 0.5 grams of AMICURE® DBU-E curing agent. This mixture was split in four parts, which were placed in four aluminum weighing dishes. 1.56 grams of DiHEPS-2.03 was added to one of the dishes, 1.92 grams of DiHEPS-3 were added to another, 4.9 grams of DiHEDS-3—adipic acid ester 8-16-3 were added to the third dish and the fourth dish was left as a control. The contents of the dishes were thoroughly mixed and the dishes were placed in an 80° C. oven for one hour. The contents of the dishes with the polysulfide-containing compounds (DiHEDS-3—adipic acid ester 8-16-3 and DiHEDS-3) solidified, while the viscosity of the liquid in the dish with DiHEPS-2.03 increased, while the contents of the control dish without any polysulfide-containing compounds remained a low-viscosity liquid. The results demonstrate a reaction product (i.e., a PEF) that differs visually from the starting reagents is formed by contacting components of the type previously described herein under the aforementioned conditions. It is of note that, as one of skill in the art may know, AMICURE® DBU-E curing agent is not known to cause homopolymerization of epoxies—mixtures of AMICURE® DBU-E curing agent and aromatic epoxies are typically known to remain in contact for prolonged periods of time, without noticeable reaction or changes.

Example 8

A reaction mixture comprising a compound designated Component X-1 and AMICURE® DBU-E curing agent was prepared. Component X-1 has the general formula HO—$(CH_2)_2$—$S_3$—$(CH_2)_2$—O—(O)C—CH=CH—C(O)—O—$(CH_2)_2$—$S_3$—$(CH_2)_2$—OH and was prepared via reaction of (DiHEPS) and maleic acid. Component X-1 has both a polysulfide moiety and a reactive double bond-moiety that is reactive to active hydrogen and thus provides both Components A and C in a single compound. 10 grams of Component X-1 were mixed with 0.2 grams of AMICURE® DBU-E curing agent. Immediately the color of the mixture changed from yellow to dark brown. A significant exothermic effect was observed, and the viscosity of the mixture increased. The mixture was placed in an 80° C. oven for 1 hour. Two control samples containing either 10 grams of Component X-1 or 10 grams of 8-33-3 mixed with 0.2 grams of AMICURE® DBU-E curing agent were also placed in an 80° C. oven for 1 hour. After 1 hour at 80° C., samples containing AMICURE® DBU-E curing agent solidified, while the samples without AMICURE® DBU-E curing agent remained liquid with the viscosity unchanged. The viscosity of the sample with product DiHEPS-3—adipic acid ester 8-33-3 and AMICURE DBU-E, but without a compound having a moiety that was reactive to active hydrogen was reduced by about 40%.

Example 9

A reaction mixture comprising DiHEPS-3, AMICURE® DBU-E curing agent, and POLYOIL 130 was prepared. Specifically, 10 grams of POLYOIL 130 were mixed with 1 gram of DiHEPS-3 and 0.2 grams of AMICURE® DBU-E curing agent in an aluminum weighing dish. In another aluminum weighing dish, 10 grams of POLYOIL 130 were mixed with 1 gram of diethylene glycol and 0.2 grams of AMICURE® DBU-E curing agent. The contents of dishes were thoroughly mixed and the dishes were placed in 130° C. oven. After forty minutes exposure in the oven, 2 grams of TOLONATE® HDB-LV low viscosity produced by Perstorp) were added to both dishes. The sample containing DiHEPS-3 solidified into a rubber-like substance, while the contents of the sample containing diethylene glycol remained unchanged liquid. This result suggests that POLYOIL 130 in the presence of the DiHEPS-3 and AMICURE® DBU-E curing agent may become converted into a reactive oligomer that reacts with polyisocyanate. It is of note that the main difference between product (8) and product (42) is the presence of two reactive maleic double bonds in product (8), which allow attributing it to the component C. Thus the sample that contained only product (42) and AMICURE® DBU-E curing agent contained only the components A, B, but, in contrast to the sample that did not contain any structural elements attributable to the component C.

What is claimed is:

1. A composition comprising a reaction product of reactants comprising:
   (a) a compound comprising (i) a polysulfide moiety and (ii) an oxygen atom in a β-position to a sulfur link having the formula:

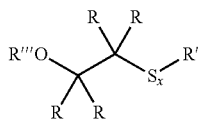

where each R is independently selected from H or a $C_1$ to $C_{20}$ organyl group, R' is independently selected from a $C_1$ to $C_{20}$ organyl group, R''' is independently selected from H or a $C_1$ to $C_{20}$ hydrocarbyl group, and x has an average of from 2.5 to less than 4.5;
   (b) a compound comprising a nucleophilic moiety, wherein the compound is an amine; and
   (c) a compound comprising a moiety reactive to active hydrogen, wherein the moiety reactive to active hydrogen is an epoxy group; and
   wherein each reactant is a separate compound and the reaction product is formed from the simultaneous contacting of the reactants.

2. The composition of claim 1, wherein the compound comprising (i) a polysulfide moiety and (ii) an oxygen atom in a β-position to a sulfur link has the formula:

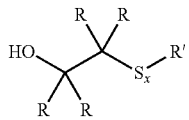

where each R is independently selected from H or a $C_1$ to $C_{20}$ organyl group, R' is independently selected from a $C_1$ to $C_{20}$ organyl group, and x has an average of from 2.5 to less than 4.5.

3. The composition of claim 1, wherein the compound comprising (i) a polysulfide moiety and (ii) an oxygen atom in a β-position to a sulfur link b) has the formula:

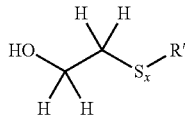

where R' is selected from a $C_1$ to $C_{20}$ organyl group, and x has an average of from 2.5 to less than 4.5.

4. The composition of claim 1, wherein x has an average of from 2.5 to 3.5.

5. The composition of claim 1, wherein the compound comprising a nucleophilic moiety is a primary amine, a secondary amine, a tertiary amine, any derivative thereof, or any combination thereof.

6. The composition of claim 1, wherein each x independently has an average of about 4.

7. The composition of claim 1, wherein R''' is independently selected from the group consisting of an alkyl group, a substituted alkyl group, a cycloalkyl group, a substituted cycloalkyl group, an aryl group, and a substituted aryl group.

8. The composition of claim 1, wherein R''' is independently selected from the group consisting of a methyl group, an ethyl group, a propyl group, a butyl group, a pentyl group, a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, an octadecyl group, a nonadecyl group, a cyclobutyl group, a substituted cyclobutyl group, a cyclopentyl group, a substituted cyclopentyl group, a cyclohexyl group, a substituted cyclohexyl group, a cycloheptyl group, a substituted cycloheptyl group, a cyclooctyl group, and a substituted cyclooctyl group.

9. A composition comprising a reaction product of reactants comprising:
   (a) a compound comprising (i) a polysulfide moiety and (ii) an oxygen atom in a β-position to a sulfur link having the formula:

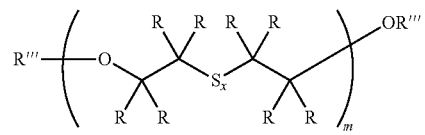

where each R is independently selected from H or a $C_1$ to $C_{20}$ organyl group, R''' is independently selected from H or a $C_1$ to $C_{20}$ hydrocarbyl group, x has an average of from 2.5 to less than 4.5, and m is greater than or equal to one;
   (b) a compound comprising a nucleophilic moiety, wherein the compound is an amine; and
   (c) a compound comprising a moiety reactive to active hydrogen, wherein the moiety reactive to active hydrogen is an epoxy group; and
   wherein each reactant is a separate compound and the reaction product is formed from the simultaneous contacting of the reactants.

10. The composition of claim 9, wherein the compound comprising (i) a polysulfide moiety and (ii) an oxygen atom in a β-position to a sulfur link has the formula:

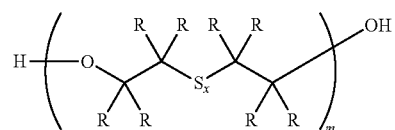

where each R is independently selected from H or a $C_1$ to $C_{20}$ organyl group, x has an average of from 2.5 to less than 4.5, and m is greater than or equal to one.

11. The composition of claim 9, wherein the compound comprising (i) a polysulfide moiety and (ii) an oxygen atom in a β-position to a sulfur link has the formula:

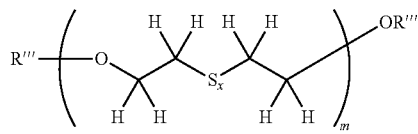

where R''' is independently selected from H or a $C_1$ to $C_{20}$ organyl hydrocarbyl group, x has an average of from 2.5 to less than 4.5, and m is greater than or equal to one.

12. The composition of claim 9, wherein the compound comprising (i) a polysulfide moiety and (ii) an oxygen atom in a β-position to a sulfur link has the formula:

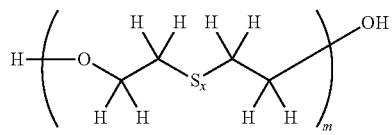

where x has an average of from 2.5 to less than 4.5, and m is greater than or equal to one.

13. The composition of claim 9, wherein the compound comprising (i) a polysulfide moiety and (ii) an oxygen atom in a β-position to a sulfur link has the formula:

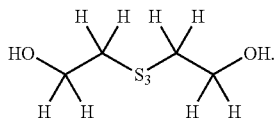

14. The composition of claim 9, wherein m has an average value ranging from 1 to 3.

15. The composition of claim 9, wherein each x independently has an average of from 2.5 to 3.5.

16. The composition of claim 9, wherein the compound comprising a nucleophilic moiety is a primary amine, a secondary amine, a tertiary amine, any derivative thereof, or any combination thereof.

17. The composition of claim 9, wherein each x independently has an average of about 4.

18. The composition of claim 9, wherein R''' is independently selected from the group consisting of an alkyl group, a substituted alkyl group, a cycloalkyl group, a substituted cycloalkyl group, an aryl group, and a substituted aryl group.

* * * * *